United States Patent

[11] 3,564,149

[72] Inventors Charles J. Funk
Columbus;
Paul R. Miller, Gahanna, Ohio; Philip J. Moylan, Holmdel, N.J.

[21] Appl. No. 784,615
[22] Filed Dec. 18, 1968
[45] Patented Feb. 16, 1971
[73] Assignee Bell Telephone Laboratories, Incorporated Murray Hill, N.J.
a corporation of New York

[54] TOLL TELEPHONE SYSTEM HAVING AN ELECTRONIC DATA PROCESSOR
18 Claims, 40 Drawing Figs.

[52] U.S. Cl. 179/18
[51] Int. Cl. H04q 3/54
[50] Field of Search 179/18.211, 185P

[56] References Cited

UNITED STATES PATENTS 3,336,442 8/1967 Casterline et al. 179/18(SP)

*Primary Examiner*—Kathleen H. Claffy
*Assistant Examiner*—Thomas W. Brown
*Attorneys*—R. J. Guenther and James Warren Falk

ABSTRACT: A toll telephone switching system is disclosed having an electronic data processor for performing many control functions including route translation. The electronic data processor cooperates with other units of control equipment, e.g., markers, to translate digital information received over incoming trunks into directive information which is used in processing calls. The processor can pretest certain outgoing trunk routes before distributing directive information to the markers that select and establish connections to idle outgoing trunks. The processor keeps an inventory of what information was distributed for each call and monitors marker disposition of the call.

INVENTORS C. J. FUNK
P. R. MILLER
P. J. MOYLAN

BY Charles H Davis

ATTORNEY

TOLL TELEPHONE SYSTEM HAVING AN ELECTRONIC DATA PROCESSOR

BACKGROUND OF THE INVENTION

This invention relates to telephone systems, and, particularly, to automatic telephone systems for establishing connections in a large communications network.

In a more particular aspect, this invention relates to telephone switching systems and improvements thereof for controlling the interconnection of trunks in a toll network.

Typically, a large toll network comprises a plurality of switching offices interconnected by trunk routes. The switching offices are designated as local offices and toll offices, depending on the function they perform. Although local offices are capable of handling transit traffic, most of the calls handled by a local office originate or terminate at that office. On the other hand, the majority of calls that are handled by toll offices are transit calls; that is, calls which originate at some local office and are routed via a toll office to gain access to trunk routes extending to a more remotely-located, local office.

Each customer station in the network is generally assigned a seven-digit telephone number. The first three digits identify the customer's local office and the remaining digits are used to identify the particular station in that office. In a large toll network, the number of local offices far exceed the number of available three-digit office codes so the network is divided into numbering areas which are identified by a three-digit area code.

Thus, with this numbering plan, the switching equipment at a toll center is called upon to translate many three-digit and six-digit codes in order to route a call to the proper destination office.

Since the primary function of a toll switching office is establishing trunk-to-trunk connections, a great many intertoll trunk routes are terminated at each toll office. The toll switching equipment, therefore, must be capable of determining the class of service of a large plurality of incoming trunks in addition to testing and selecting available trunks from large groups of outgoing trunks. In addition, the equipment must be able to initiate alternate-routing procedures in the event that a call cannot be forwarded over a selected trunk route.

Typical of the prior art toll switching systems is the system disclosed in U.S. Pat. No. 2,868,884, issued to J. W. Gooderham et al., of Jan. 13, 1959. In that system, the toll trunks were terminated on incoming and outgoing link frames composed of crossbar switches, and connections between the trunks were established under the direction of a plurality of control equipments, such as senders, decoders, translators, markers, et cetera.

Due to the complexity of that system, each different type of control equipment had a specific function and many control equipments were utilized for each call. For example, senders were provided to receive digital information in the form of incoming pulses from a distant office and to retransmit outgoing pulses in order to forward the call to its destination. For translating the digital information into directive information necessary to select an outgoing trunk, a plurality of decoders with associated translators were used. The directive information derived from the decoders and translators was used by a marker for selecting a channel between the incoming trunk requesting connection through the office and the selected outgoing trunk.

In the Gooderham et al. disclosure, each decoder has a home area translator and a foreign area translator associated therewith and a plurality of other translators common to all decoders. The translators used in the Gooderham et al. switching system are of the electromechanical type with the information stored on a plurality of perforated metal sheets called cards. The card translator is also shown in more detail in U.S. Pat. No. 2,774,821 to C. B. Brown et al. of Dec. 18, 1956. Along one edge of the card are tabs which are used for selecting one card from a stack of cards. Thus, in accordance with the digits to be translated and the incoming trunk class information, a card is selected by the aforesaid tabs and moved into position to be read. The reading is accomplished in the card translator by optical-scanning means.

While the above decoder-card translator arrangement is wholly suitable for its intended purpose, it has certain limitations which we have sought to overcome with the present invention. For example, each of the aforesaid translators has capacity for about one thousand to twelve hundred cards and each card can store only a limited amount of information. With more and more new services being offered to customers, the amount of storage capacity in a card translator becomes a problem.

In addition, the aforesaid card translator is essentially an electromechanical device and, as such, operates at a relatively slow speed and is subject to wear from repeated use.

On certain calls the decoder-card translator furnishes routing information to a marker not knowing whether trunks are available in the selected route. The decoder-card translator, therefore, must be held available for these calls in the event that the marker cannot find an idle trunk and additional routing information must be furnished to the marker. Of course, while held busy, the decoder-card translator cannot serve other calls.

On all calls the decoder-card translator is called in after the first three digits are received. A card is selected using the three digits but on many calls the first three digits are insufficient to determine the routing of the call. The decoder and translator are released until sufficient digits (such as six digits) have been received. After sufficient digits are received, a new decoder is seized. It calls in its home area translator and selects the three-digit card which tells the decoder where the proper six-digit card is located. If the six-digit card is in another translator, the decoder releases its home area translator to give access to one of the other translators.

Thus, because of their inherent slowness of operation, long-holding time, and the fact that different card translators may be used on each call, many duplicate card translators must be provided in an office carrying heavy traffic.

In the aforementioned Gooderham et al. toll system, each of the incoming trunks requesting service was connected to a sender via a sender link. Trunk class information derived in the trunk was forwarded through crosspoints in the sender link to the sender. The sender, in turn, passed this information to the decoder which used the class information along with the area code and office code digits received for selecting a card in the card translator. While economy measures were realized in the prior art toll system by transmitting more than one class indication over a common class lead, the amount of class information that could be forwarded to the decoder was limited. In addition, by forwarding this information from trunk to sender, from sender to decoder, and from decoder to card translator, the possibility of error being introduced was greatly increased.

SUMMARY OF THE INVENTION

In accordance with one illustrative embodiment of the invention, an electronic data processor is incorporated in a toll switching system to assist in processing calls. The data processor cooperates with other units of control equipment to translate the digital information received from a calling office into directive information for forwarding the call to a destination office. The data processor also determines the trunk class information for each call and monitors the disposition of calls by other units of control equipment.

The electronic data processor operating autonomously receives data from and distributes data to the other control equipments. Since data may be erroneously distributed due to transient troubles, et cetera, arrangements have been provided for requesting a redistribution of data without attempting to record a momentary failure that cannot be reproduced.

In accordance with a feature of the invention, the electronic data processor can pretest certain outgoing trunk routes to determine the idle status of trunks before distributing directive information to other control units which select and establish connections to the outgoing trunks. In the event a route can not be pretested, the processor will distribute a first set of information to a control unit and keep an inventory as to what information was distributed so that additional information can be distributed if the control unit is unable to select an outgoing trunk.

BRIEF DESCRIPTION OF THE DRAWING

A better understanding of the arrangement contemplated will be had by the following description made with reference to the drawing, in which.

Figure 1A:
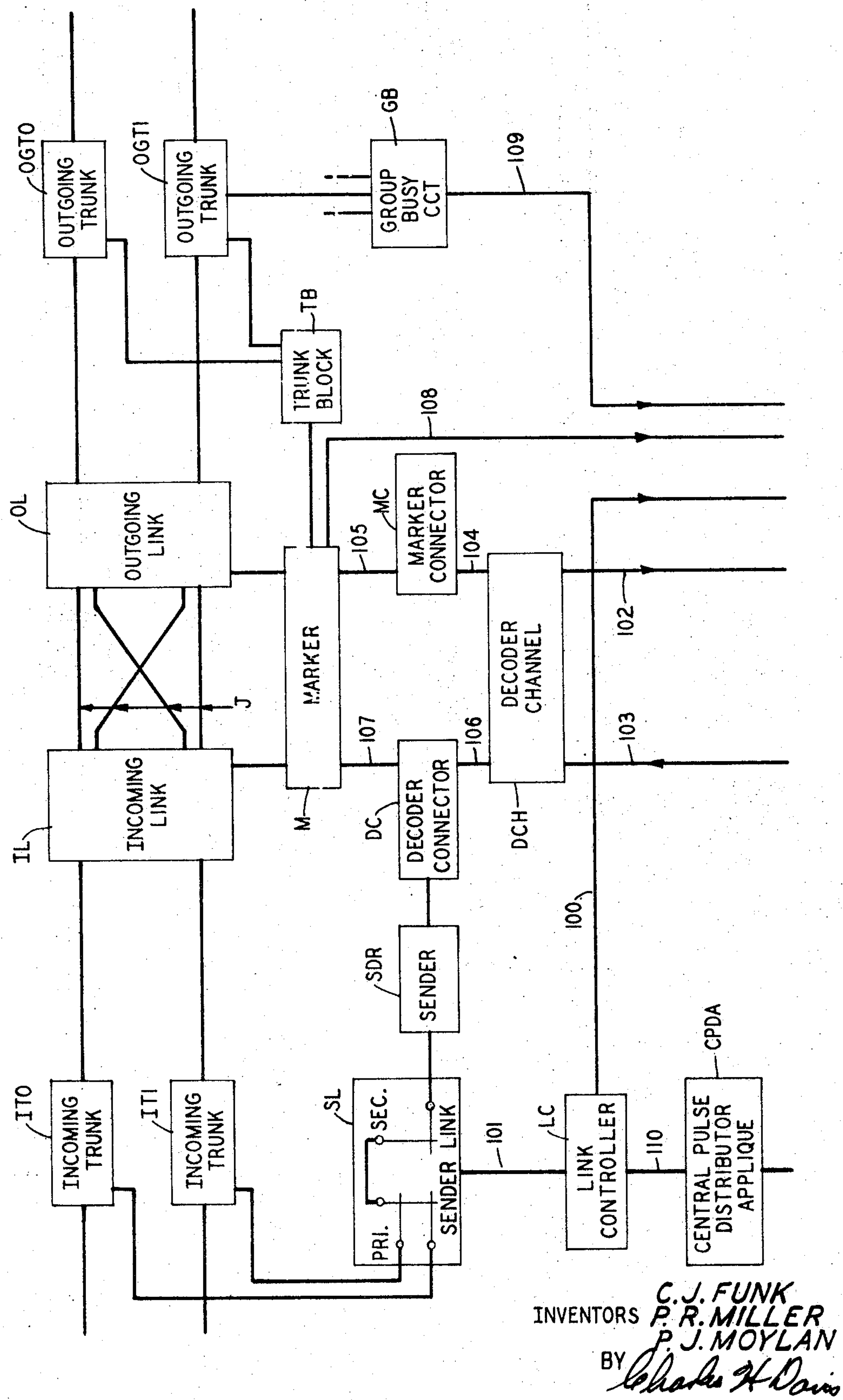
FIGS. 1A and 1B, when arranged in accordance with FIG. 1C, show a block diagram of a toll switching system incorporating the invention.

Whenever possible, the first digit or the first two digits of a reference designation denote the FIG. of the drawing in which the equipment is located.

BRIEF DESCRIPTION OF OPERATION

Figures 1B, 1C:
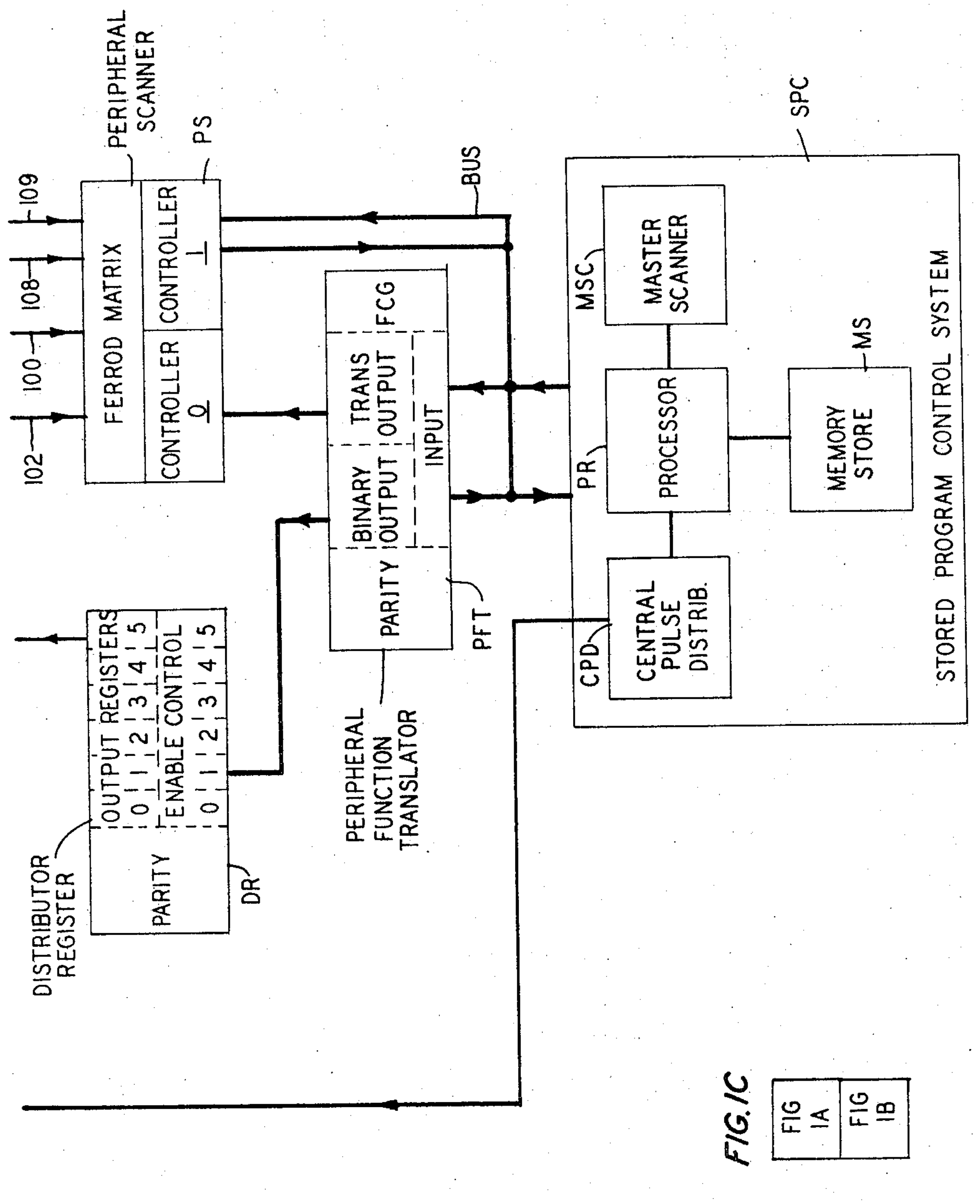

Before describing the invention in detail, a brief description of the arrangement will be given with respect to the block diagram representation of the arrangement shown in FIGS. 1A and 1B of the drawing.

Calls are switched through the toll switching system by means of two sets of crossbar switch frames called incoming and outgoing links. The incoming links IL and the outgoing links OL are interconnected by junctors J in accordance with traffic requirements. In small toll switching systems, traffic is handled over the same link frames but in larger switching offices, a second switch train is added to increase the office capacity. Incoming trunks appear on the incoming links of both trains and the trains are designated "intertoll" and "toll-completing."

Calls incoming to the office are received over incoming trunks, such as ITO and IT1, which are terminated on incoming links IL while calls are forwarded to distant offices over outgoing trunks, such as OGTO and OGT1, which are terminated on the outgoing links OL. In a two-train office, incoming trunks appear on incoming links in both switch trains and, of course, two-way trunks will have terminations on both incoming and outgoing links and can be used for incoming and outgoing traffic.

When a trunk is seized at its originating end, the incoming trunk circuit, such as ITO, energizes a start lead to a sender link SL which, in turn, seizes a link controller LC to establish a connection between the incoming trunk and a sender.

The trunks associated with the sender link are divided into groups. Link controller LC identifies the calling trunk group and locks in all groups having trunks requesting service. Having identified the trunk groups, link controller LC then examines the individual trunks requesting service within the preferred trunk group. Link controller LC then selects an idle sender, such as sender SDR. Idle linkage on sender link SL is selected, and the primary-switch select magnet associated with the incoming trunk and a secondary-switch select magnet associated with the idle sender are operated in preparation for connecting the incoming trunk with the selected sender. At this point, link controller LC bids over conductors 100 for the service of the stored program control system SPC via the peripheral scanner PS.

The stored program control system SPC is a high-speed, data-processing facility which is time-shared among the various other units of common equipment in the switching system. The SPC can be divided functionally into a processor PR, a memory store MS, a master scanner MSC, a central pulse distributor CPD, and a maintenance control center (not shown). For reliability, these units are duplicated and interunit busing permits switching of units within the SPC system. The various equipment units are interconnected by multiconductor transmission cables called buses. These buses are capable of transmitting a large amount of digital information at high speed. A more complete description of a typical bus system can be found in Volume XLIII, Number 5, Part 1 of The Bell System Technical Journal, Sept. 1964.

The processor PR contains most of the logic and control circuitry for the SPC system. It controls the operation of the SPC system by executing a sequence of instructions which are stored in the memory store MS. In addition to carrying out arithmetic operations, such as adding and subtracting, the processor PR can shift, rotate, and perform many logical operations, such as AND, OR, EXCLUSIVE-OR, et cetera.

Memory store MS is an electrically alterable memory having nondestructive readout capabilities. In addition to being used as a permanent storage facility for programs, it is also used for temporarily storing call processing data.

The master scanner MS functions to provide the processor PR with information as to the status and condition of other SPC units and will not be described in detail herein. To execute the processor output commands, the central pulse distributor CPD is used. The processor PR sends an address to the central pulse distributor CPD which causes an enable pulse to be transmitted from one of the central pulse distributor's outputs and over a dedicated pair to the particular peripheral unit being addressed. The peripheral unit being addressed returns a verify pulse over the same dedicated bus.

The specific details of the stored program control system SPC have not been disclosed herein and it will be assumed that any suitable data processing machine can be used in our invention. One example of such a stored program control system is disclosed in a copending application of R. W. Downing et al., Ser. No. 334,875, filed Dec. 31, 1963 and in Volume XLIII, Number 5, of the Bell System Technical Journal, Sept. 1964.

For interconnecting the high-speed, electronic SPC system and the slower speed, electromechanical control units, buffer circuits are provided. The input buffers to the SPC system are the peripheral scanners, such as scanner PS. Each scanner PS comprises a ferrod matrix and controllers which are provided in duplicate for reliability. The ferrod matrix comprises 64 rows, each having 20 ferrod sensors. The ferrod sensor is a current-sensitive device which is used to monitor scanning leads from various circuits, such as link controller LC, marker M, decoder channel DCH, group busy circuit GB, and test equipment (not shown). The ferrod sensors are further disclosed in U.S. Pat. No. 3,175,042 to J. A. Baldwin—H. F. May of Mar. 23, 1965.

Periodically, selected rows of ferrods in peripheral scanner PS are addressed and it is over these scanning leads that the SPC recognizes bids for service and receives input data from the other control units in the system. A similar scanner also using the ferrod sensor is disclosed and described in the U.S. Pat. No. 3,254,157 to A. N. Guercio et al. of May 31, 1966.

Distributor registers, such as DR, are the output buffers of the SPC system and are used to transmit directive information from the SPC system to the various electromechanical control circuits, such as decoder channels, markers, et cetera. Each distributor register comprises six enable-control circuits with associated output registers, each having twenty distribution points. A parity checking circuit is also provided and each parity circuit can function with up to three distributor registers.

Interposed between the SPC system and the peripheral units, such as the distributor registers and peripheral scanners, is a peripheral function translator PFT. The peripheral function translator PFT receives information in binary code from the processor PR, makes a parity check, and forwards translated information over an address bus to the peripheral scanners and untranslated binary information to the distributor registers. The central pulse distributor CPD, under instructions from processor PR, selects a particular peripheral scanner or the appropriate output register of a distributor register by transmitting an enable signal over busses individual to each peripheral unit.

Returning now to the description of a typical call, it will be remembered that the link controller LC had transmitted a bid signal over conductors 100 to peripheral scanner PS. When the processor PR executes its controller monitor program, it causes scanner PS to periodically scan the bid ferrods looking for service requests from link controllers, such as link controller LC. Upon recognizing a service request, as indicated by the change of state of a bid ferrod sensor, the processor transfers control from its monitor program to a trunk identification program. In executing the trunk identification program, the processor stores in memory store MS the identity of the trunk requesting service and the identity of the sender that was selected to serve the call. This data is obtained by scanning appropriate ferrods in peripheral scanner PS which are connected over conductors 100 to link controller LC.

Having registered the trunk and sender identities, processor PR addresses central pulse distributor CPD which transmits an execute signal over the dedicated pair to the central pulse distributor applique CPDA.

The central pulse distributor applique circuit CPDA, in turn, signals over conductors 110 informing link controller LC to proceed with establishing the linkage between the incoming trunk ITO and sender SDR. Once the execute signal is registered in the link controller, processor PR is informed via a scan point in peripheral scanner PS, and the processor PR addresses central pulse distributor CPD to restore the central pulse distributor applique CPDA to normal. Link controller LC can then release and is available to serve other trunks requesting service.

At this point in the call, the incoming trunk ITO is connected to sender SDR and a start dial signal is sent from the sender to the distant office for the sender thereat to begin outpulsing. After sufficient digits have been registered in sender SDR, the sender requests decoder connector DC to connect the sender to an idle decoder channel, such as decoder channel DCH.

Decoder channels, such as DCH, provide the sender with access to the SPC system for translating the digital information received over the incoming trunk into directive information which is used for selecting an idle outgoing trunk in the proper trunk route for forwarding the call to the destination office. The decoder channel DCH waits until all decoder connector relays are actuated to ensure the availability of the entire sender input and then signals over conductors 102 to scanner PS to saturate an "initial translation request" ferrod which is associated with decoder channel DCH.

Recognizing a request for route translation, processor PR directs scanner PS to another scanner location associated with decoder channel DCH to read the information received from sender SDR. Part of the input information contains the identify of sender SDR which permits processor PR to recover from memory MS the identify of the incoming trunk ITO being used on the call. With the trunk identity, the processor PR can obtain the trunk class from data stored in memory for each trunk. The remaining input information contains the area code and office code digits and other pertinent information necessary for performing a route translation.

With the trunk class information and the called office code, processor PR can perform a route translation function which comprises interrogating numerous tables in memory store MS to ascertain the proper outgoing trunk route over which the call can be forwarded. The toll system being described is arranged to select trunks from many routes, each having a large number of trunks. Since marker M only has a capacity for testing a limited number of trunks, arrangements are provided for preselecting from a large trunk group only those subgroups of trunks which have idle trunks and presenting this information to the marker M.

Many of the large groups are connected to group-busy circuits, such as circuit GB. The group-busy circuit comprises a plurality of bistable devices, each capable of monitoring a subgroup of trunks. The bistable device indicates whether or not there is at least one idle trunk in the subgroup and forwards this information over conductors 109 to scanner PS. When the processor PR undertakes a route translation, it scans the ferrods in scanner PS associated with trunk group-busy circuits to determine which of the subgroups of trunks in a large trunk group have idle trunks.

Upon completion of route translation, the SPC system sends the routing information via peripheral function translator PFT to a distributor register DR associated with decoder channel DCH. Distributor register DR stores the information on relays and remains set until decoder channel DCH releases from the call. Acting on part of the routing information stored in the distributor register DR the decoder channel DCH now signals over conductors 104 causing marker connector MC to select the proper type marker, such as marker M, in accordance with the instructions from distributor register DR. Marker connector MC identifies the selected marker to decoder channel DCH which forwards the marker identity to the SPC system via scanner PS. A connection between sender SDR and marker M is established through decoder connector DC and the routing information stored in distributor register DR is transmitted to the marker over conductors 103, 104, and 105. Marker M checks the routing information for validity and returns a registration check signal to decoder channel DCH. Decoder channel DCH now removes the bid signal from the initial translation request ferrod in scanner PS, thereby signaling processor PR to reset distributor register DR. At this point, the marker M assumes control of the call and decoder channel DCH and the marker connector MC are released.

The marker continues the processing of the call and, using the location information of the selected trunk group, seizes the trunk block TB. Each trunk block has access to ten groups of forty trunks each and it is through trunk block TB that the marker can test the individual trunks in a subgroup to determine which trunks are idle.

Assuming that outgoing trunk OGT1 is idle, the trunk is seized by marker M and made busy to other calls. Marker M then proceeds to select and establish a channel between the incoming trunk ITO and outgoing trunk OGT1 on the incoming and outgoing links IL and OL. Outpulsing information is transmitted to sender SDR and the SPC system scans ferrods associated with marker M to determine the marker's disposition of the call.

If a trunk group is not equipped with a group-busy circuit, processor PR cannot preselect a subgroup having idle trunks and the marker must sequentially test each subgroup in order to find an available trunk. In accordance with one feature of our invention, under these circumstances, processor PR makes a route translation and distributes the first set of directive information to the marker relating to the first subgroup of trunks to be tested. The processor also distributes a "hold-routing" instruction to decoder channel DCH so the decoder channel does not release from the call. Since processor PR may be called upon to provide the marker with the location of additional trunks, the processor also places in memory an indication as to what information already has been distributed for each particular call.

Using the trunk location information of the first subgroup of trunks, marker M seizes a trunk block, such as TB, to test for an idle trunk in that subgroup. Upon testing the trunks in the first subgroup, the marker returns a "trunk-selected" or an "all-trunks-busy" signal to decoder channel DCH. If a trunk-selected signal is returned to decoder channel DCH, the decoder channel can release by deactivating its initial translation request ferrod in scanner PS. The SPC system recognizes this change of state in the initial translation request ferrod and resets distributor register DR.

Should marker M detect all trunks busy, it signals decoder channel DCH which actuates an all-trunks-busy ferrod in scanner PS. Processor PR recognizes the change of state of the all-trunks-busy ferrod on the next scan cycle and interprets this as a request to present information to the marker concerning the next subgroup of trunks to be tested. Without making a complete route translation processor PR consults its memory MS to determine the last set of directive information that was distributed on this call and continues processing the call from this point. Since an all-trunks-busy condition was encountered by the marker, the processor now distributes to distributor register DR the trunk location information for the next subgroup of trunks to be tested. Processor PR will continue to distribute new trunk location information to decoder channel DCH until an idle trunk is found. Of course, if no trunks are idle in any of the available routes, the call will be routed to an overflow trunk.

In accordance with another feature of our invention, if an initial translation request bid or an all-trunks-busy bid for the SPC system is not answered within a given interval or if an invalid or incomplete output is received by distributor register DR, the decoder channel DCH will request a retrial. The decoder channel does this by saturating a retrial request ferrod in scanner PS which causes the SPC system to scan retrial information ferrods to determine the type of retrial requested by first requesting a retrial from the SPC system, and attempt to record a momentary trouble caused by transients or an SPC error is eliminated.

STORED PROGRAM CONTROL (SPC) SYSTEM

The SPC system shown in FIGS. 2A—2E is a word organized, electronic data processing system employing an electrically alterable memory for storing both program and call-processing data. Many well-known general purpose computers can perform the functions performed by the SPC system referred to herein, therefore, a detailed description of the SPC system need not be given for a full understanding of our invention. Instead, certain parameters of the SPC system will be described generally to give the reader an appreciation of how a typical data processor would be employed in the embodiment of the invention. It is to be understood, however, that our invention is not limited to the data processor being described and that other data processors can be employed in the system without departing from the spirit and scope of the invention.

It will be noted from the above general description of a call being processed by the telephone system that the call can be separated into three stages. First, there is the link controller stage wherein an incoming trunk requesting service is coupled to a sender and the trunk and sender identities are forwarded to the SPC system for subsequent trunk class translation. Secondly, there is the decoder channel stage wherein digital information received over the incoming trunk by the sender is translated by the SPC system into directive information for selecting the proper routes to forward the call. And, finally, there is the marker stage wherein an outgoing trunk is selected and a connection established between the incoming and outgoing trunks and the SPC is informed of the disposition of the call.

While the SPC system is a high-speed machine, it must function with many slower units such as link controllers, decoder channels, and markers and serve them in "real time." In other words, it must quickly respond to requests for service when they are made by the other equipment units. If the SPC system is not fast enough to handle each stage of every call, the SPC system will slow down the processing of calls by the link controllers, decoder channels, and markers and seriously degrade service. For example, if a decoder channel is delayed, it will request special attention through a retrial request. Also, if a sender is not attached to an incoming trunk by a link controller, the sender at the originating end of the trunk will timeout and return a reorder signal to the calling customer who must initiate another call. Besides responding to the various units of control equipment mentioned above, the SPC system must perform routine diagnostic tests on its various subsystems and receive and transmit data to a maintenance control center.

Program Organization

To perform its many functions, the processor is under control of an executive-control program. The executive-control program transforms the SPC system into a multiprogram system by scheduling the execution of other programs, such as task programs and task dispenser programs. Task dispenser programs are used to "call in" various task programs to perform the actual work after which control is returned to the task dispenser program. The task dispenser programs are divided into six base level classes referred to as Interject, A, B, C, D, and E. The executive control program delivers control to the A through E base level class of task dispenser programs in a descending order of frequency. In other words, those programs designated class A are examined most frequently, class B is next most often, et cetera. Thus, the task programs are assigned a base level class that will give the desired frequency of execution for each type of work to be performed.

A check is made after each A through E class program is executed for the existence of interject work which must be performed immediately. Control is then relinquished to the next task program.

The processor is also equipped with an interrupt mechanism which seizes control of the system when a manual maintenance or clocked signal interrupt is received. The interrupt causes the system to stop the program task being executed at the time, store the address at which the program was interrupted, and save any data that was being processed. Control is then transferred to the appropriate fault recognition program or a clock control, input/output program and, upon completion of the interrupt program, control is returned to the task program that was interrupted. The interrupt programs are arranged in a hierarchy scheme having nine levels and an interrupt program assigned to any one level can only interrupt programs of lower levels. Base level programs, on the other hand, are usually subject to interruption by any interrupt program.

While the entire collection of programs which control the SPC system can be thought of as a single program, it is useful for purposes of discussion to divide the program into a plurality of base level programs, each having its individual functions. A description of certain of the programs will be given now without attempting to classify them in any base level class.

MONITORS PROGRAMS

The SPC system must periodically scan bid ferrods in the peripheral scanner looking for requests for service from other control units of equipment in the system. To accomplish this, the decoder channel monitor program and the link controller monitor program are executed at frequent intervals.

During the execution of each program, the appropriate row or rows of bid ferrods in the peripheral scanner are read and compared with information obtained from a prior scan to determine if any ferrods have changed state indicating a request for service. If a service request is detected, the appropriate task program is selected to control the SPC system.

INCOMING TRUNK IDENTIFICATION PROGRAM

The controller monitor program calls in the incoming trunk identification program to identify the incoming trunk and sender being used on the call. Using the input presented to the peripheral scanner by the link controller, the processor can identify the incoming trunk in terms of its position in the link controller group and the sender in terms of its decoder connector appearance.

This information is stored in a temporary memory associated with each sender and is used later for determining the trunk class information during route translation.

CODE-GROUPING PROGRAM

The code-grouping program permits the processor to group together all calls which require the same routing treatment. A routing pattern is selected on the basis of the incoming trunk class and information which is received from the sender, such as the called office code. The program uses a sender identity received from a decoder channel to retrieve the identity of the incoming trunk from a temporary storage table associated with each sender. With the trunk's identity, the appropriate table can be consulted to determine the incoming trunk's class.

CALL-ROUTING PROGRAM

Using the routing pattern determined from a code-grouping program, the call-routing program selects a trunk group and presents information to the marker to direct the marker to the selected trunk group for testing the trunks. If the trunk group is equipped with a group-busy circuit, the processor can determine which trunk groups have idle trunks before directing the marker to test the individual trunks. The call-routing program also determines other information, such as code conversion information and transmits this information to the distributor register for distribution to other units of common control equipment.

In addition to the above-mentioned programs, there are programs provided for inserting changes and verifying data stored in memory, for incrementing traffic registers and compiling traffic measurement data, for recording troubles which occur during different stages of the call, and for testing the various functions and components of the system.

DATA TABLES

The Processor performs the logical functions for completing a telephone call in accordance with the program instructions stored in memory. The memory also contains specific area called data tables. A data table is two or more memory locations which have been assigned a specific designation. The tables can be broadly categorized as parameter tables and temporary tables. Parameter tables show the office size and arrangement of equipment while temporary tables are used to store information pertaining to calls in progress.

In order to illustrate the arrangement of some of the data tables, a description of incoming trunk translation and route translation will be given now.

When the processor is under control of the controller monitor program it directs the peripheral scanner to scan the rows of ferrods containing the bid ferrods for link controllers. The information read out of the scanner is compared with information stored in a last-look table in memory. The last-look table provides the processor with the status of link controller and decoder channel bid ferrods as they appeared on the last scan.

Figure 2A:
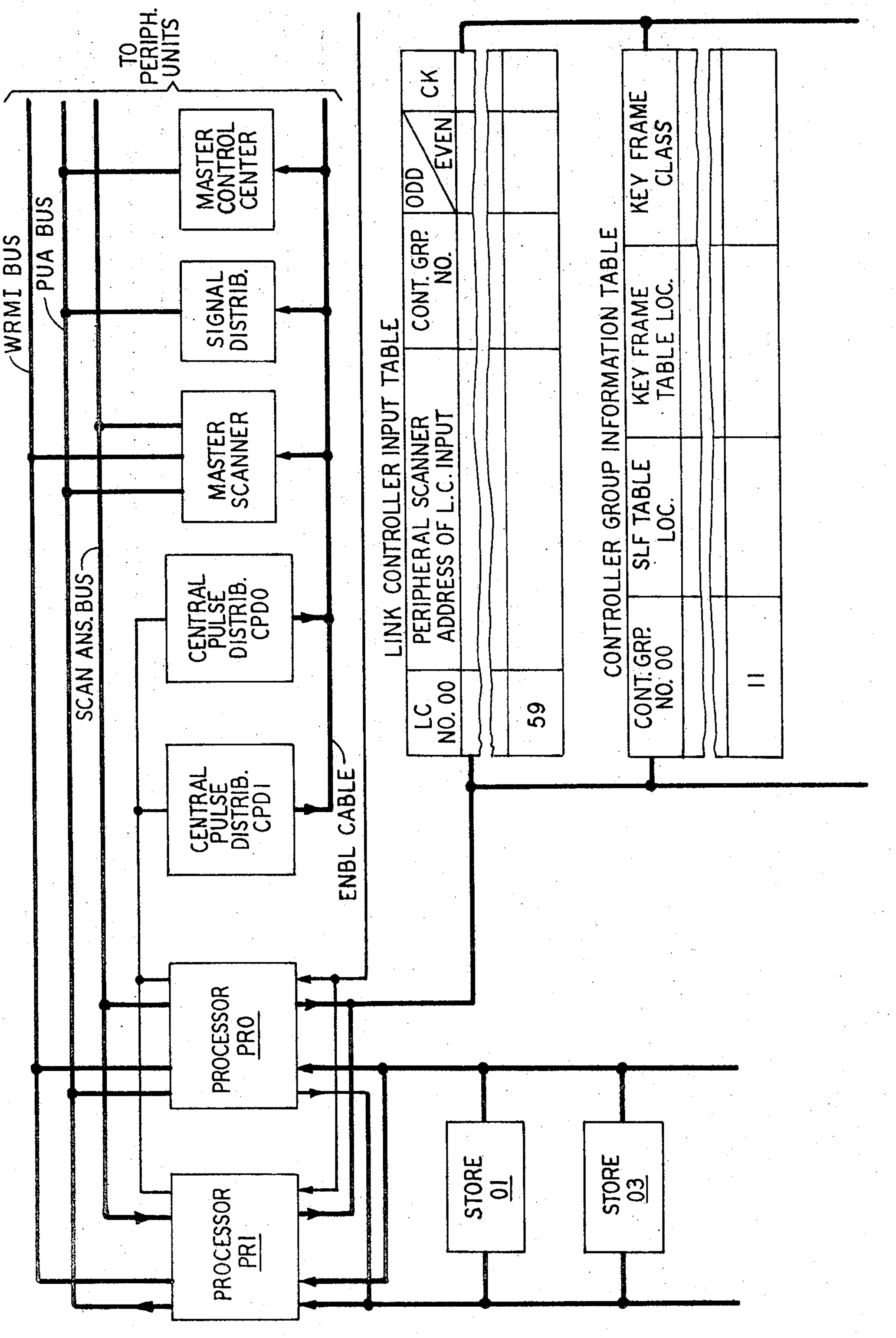
FIGS. 2A—2E when arranged in accordance with FIG. 2F, show a stored program-controlled data processor used in the toll switching system.
Figures 2B, 2F:
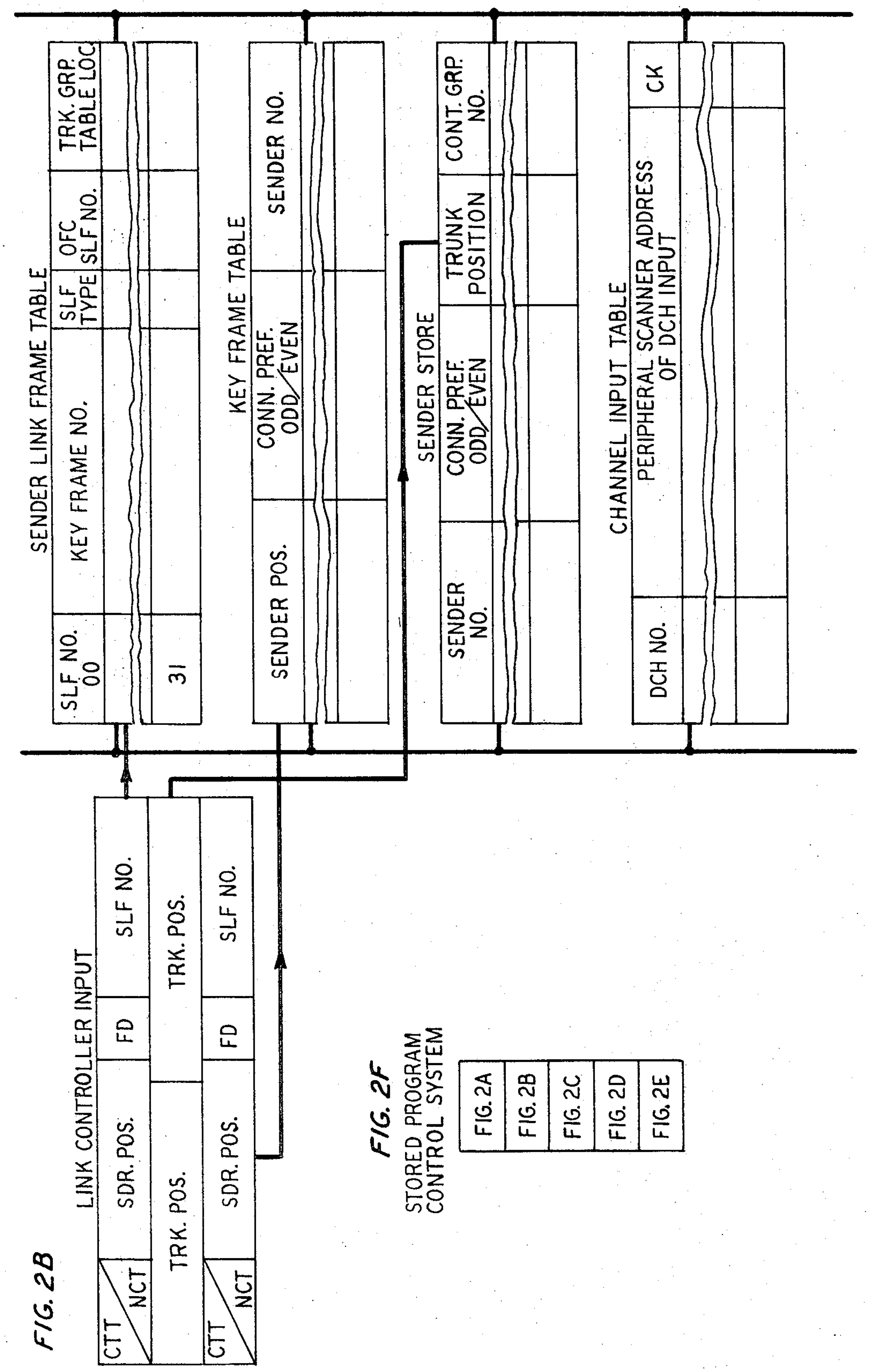

Referring now to FIGS. 2A and 2B, when a service request by a link controller is detected, the processor ascertains from a link controller input table the scanner location of the link controller's input information, the controller's group number, and how the controller's inputs are arranged. Using the controller's group number, the processor is directed to a controller group information table which contains information common to all sender link frames and senders in a link controller group. From the controller group information table, the processor is directed to a sender link frame table and a key frame table. The sender link frame and key frame tables describe how senders are arranged on the sender link frames.

Using the scanner location of the input information for the link controller, the processor reads these ferrods and obtains the link controller's input information which comprises the sender link frame number, the sender position, and the trunk position. The processor than places in a storage table associated with the sender the sender preference, the incoming trunk number, the sender link frame number, and the controller group number. When this information is stored, the processor returns a check signal to the link controller which closes the crosspoints on the sender link frame. The information will be retrieved from the sender storage table during the decoder channel portion of the call.

As described above, the call then proceeds until the sender has received sufficient digits for translation and connects itself to an idle decoder channel which saturates its bid ferrod in the peripheral scanner. The decoder channel's bid for service is recognized when the processor is under control of the decoder channel monitor program. During the decoder channel monitor program, bid ferrods associated with a decoder channel are read and compared with information stored in the last-look table.

Figure 2C:
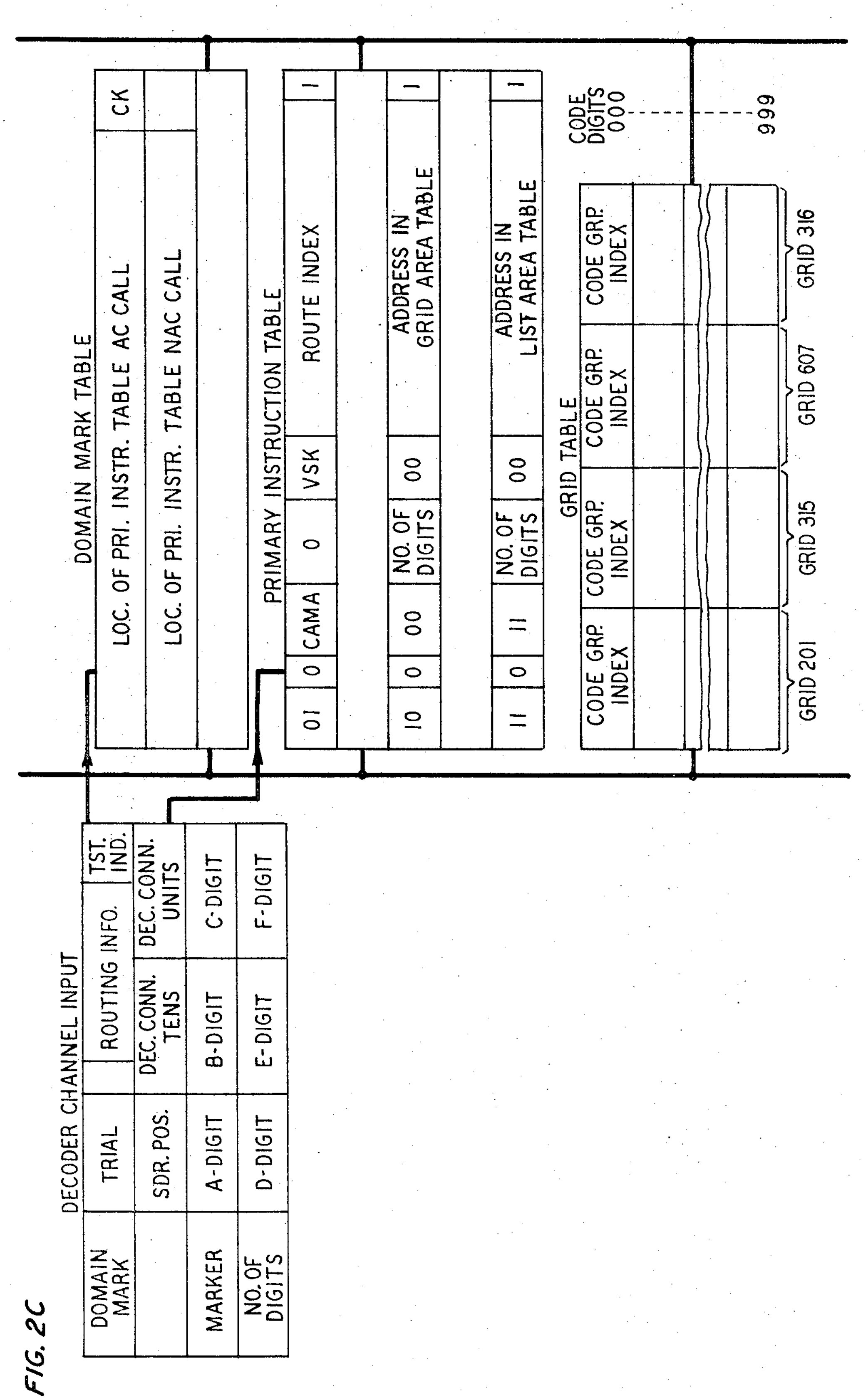

The decoder channel is identified and the processor goes to its channel input table to ascertain the scanner location of the decoder channel's input information. Typical decoder channel input information is shown in FIG. 2C and will be described briefly.

The decoder channel transmits information to the processor referred to as a domain mark. This information determines how the digits received over the incoming trunk shall be translated; that is, whether the digits represent an office code, an area code, or whether the call is an overseas originating call or an overseas transit call. The processor also receives an indication as to whether this is a first or a second trial call since calls making a second attempt to complete are processed in a different manner. Different routing instructions are also forwarded to the processor to inform the processor to translate the digits or to route the call to a special trunk, such as an announcement trunk. As part of the input information from the decoder channel, the processor also receives an indication if this is a test call and which test circuit originated the call. The input from a decoder channel also includes the sender's identity in terms of its assignment to a decoder connector and its position in a decoder connector. This enables the processor to recover from the sender storage table the incoming trunk identity which was previously stored therein during the link controller stage of the call. In addition to receiving from the decoder channel the digits A through F that were pulsed over the incoming trunk, a digit mark indicating the number of digits received by the sender is also transmitted to the processor.

Using the decoder connector identity and the position of the sender in the decoder connector, the processor is directed to the decoder connector table (not shown) which gives the processor the proper section in the sender storage table assigned to the decoder channel. Within this section the processor reads the memory assigned to the sender where the incoming trunk identity was previously stored.

From the sender storage table, the processor recaptures the controller group number, the sender link frame number, and the trunk number which directs the processor to the controller group information table, sender link frame table, trunk group table (not shown) and trunk group information table (not shown), respectively.

The trunk group tables identify the trunk group number for each incoming trunk. Each trunk group table is associated with a sender link frame and has an entry for each trunk on the sender link frame. The trunk group information table, on the other hand, translates the trunk group number into information which will be used during route translation, such as the screening class, area of origin, which switch train the trunk appears in, et cetera.

CALL-ROUTING TABLES

There are essentially two tables (FIGS. 2D and 2E) concerned with call routing; namely, the route pattern and trunk group tables. The route pattern table is a link list describing the routing pattern of the offices, the code conversion codes that are to be used and a pointer indicating the trunk group table where the outgoing trunk group is described. The trunk group table contains a detailed equipment description of each outgoing trunk group and the location of its group-busy leads in the peripheral scanner.

CODE-GROUPING TABLES

Figure 2D:
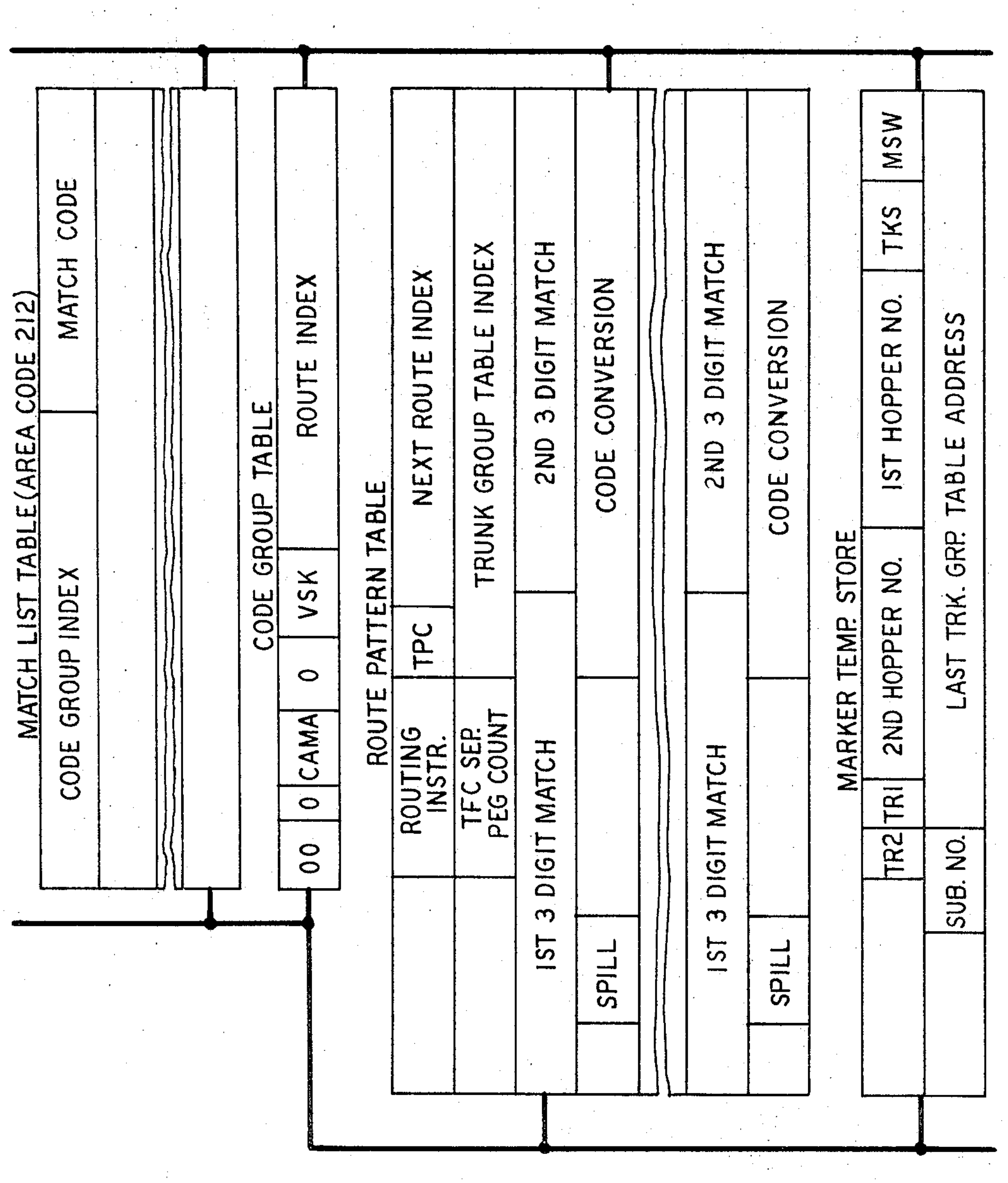

A typical example of a code-grouping table is shown in FIG. 2D. These tables are accessed by the code group index obtained from the grid area or list area tables and contain the office parameters for translating for steering the processor to the appropriate route pattern table. A code group entry without screening steers the processor directly to the proper route pattern table.

Six-digit codes can be translated by a match-list method or a grid method, depending upon the amount of traffic to the area and the number of available routes. The match-list method is generally used where there is a low volume of traffic to a few office codes because it involves a hunting procedure which takes more processor time than the grid method. If the primary instruction table indicates the six-digit code is to be translated on a match-list basis, the processor is directed to a list area table (not shown). The list area table provides the location of the match-list table (FIG. 2D) for the particular area code being translated. The processor then goes to the designated match-list table and hunts through the table using a linear search technique comparing the code to be translated with each entry in the table until a match is found. The entries in a match-list table comprise all working codes in the designated area. When a match is found, the information read out of memory will direct the processor to the proper entry within the area's code group table as located by the list area table. The code group table then provides the route index, centralized automatic message accounting information, spill information, and whether or not class screening is required.

When the grid method of translation is used, the primary instruction table directs the processor to the grid area table (not shown) which provides the location of a code-grouping table and a grid table (FIG. 2C). The grid table is used for translating the second three-digits the six-digit codes received over an incoming trunk into directive information for selecting an outgoing trunk. Code group words for three-digit codes are contained in the primary instruction or code screening tables.

It will be recalled that part of the information received from the decoder channel is a domain mark. The processor looks at the domain mark table (FIG. 2C) to verify that the domain mark is legitimate and determines the location in memory of the primary instruction table associated with a particular domain mark. The purpose of the domain mark is to distinguish for the SPC what might otherwise be a conflicting three-digit code. An example of a conflicting code might be where a particular three-digit code is used interchangeably as either an area code or a local office code.

Using the domain mark and the first three-digits dialed, the primary instruction table (FIG. 2C) is interrogated. From the primary instruction table, the processor gets one of four possible replies as follows: (1) a code group word where three digits are sufficient for translation; (2) a code group-screening word where three-digit translation is required and the incoming trunk class will influence the routing; (3) a grid primary instruction where a six-digit translation is required and a table look-up technique is used; or (4) a list primary instruction where a six-digit translation is required and a hunting technique is used.

A code group-screening entry in a primary instruction table causes the processor to interrogate the screening table (not shown) to determine the effect of the incoming trunk's class on code grouping. This table provides the spill information as well as a route index of a six-digit code using a table look-up technique. The grid table, therefore, is one thousand entries long but, since it does not take up the full width of memory, several grids can be superimposed upon each other in the same portion of the memory. The information from the grid table and grid area table directs the processor to a code group table entry in a manner similar to the match-list method described above.

While some of the tables have been described above, it will be realized that other tables are used by the system to indicate office parameters or for temporary storage.

As mentioned above, the SPC system communicates with other control equipment units of the switching system through buffer circuits. A description will now be given of these buffer circuits followed by a description of the processing of typical calls.

PERIPHERAL FUNCTION TRANSLATOR

The peripheral function translator circuit (SPC) is an interface between the stored program control system and the peripheral units, such as distributor registers and peripheral scanners. The peripheral function translator receives information in binary form from the processor, checks it for odd parity, and registers the information for timing reasons. Information is then passed untranslated, that is, in binary form, to the distributor registers or in translated form to the peripheral scanners as address information. Two peripheral function translators are provided in the system. Each is coupled to the SPC system over an associated bus system and each peripheral function translator is capable of transmitting information from the SPC system to any peripheral unit.

Figures 15A, 15F:
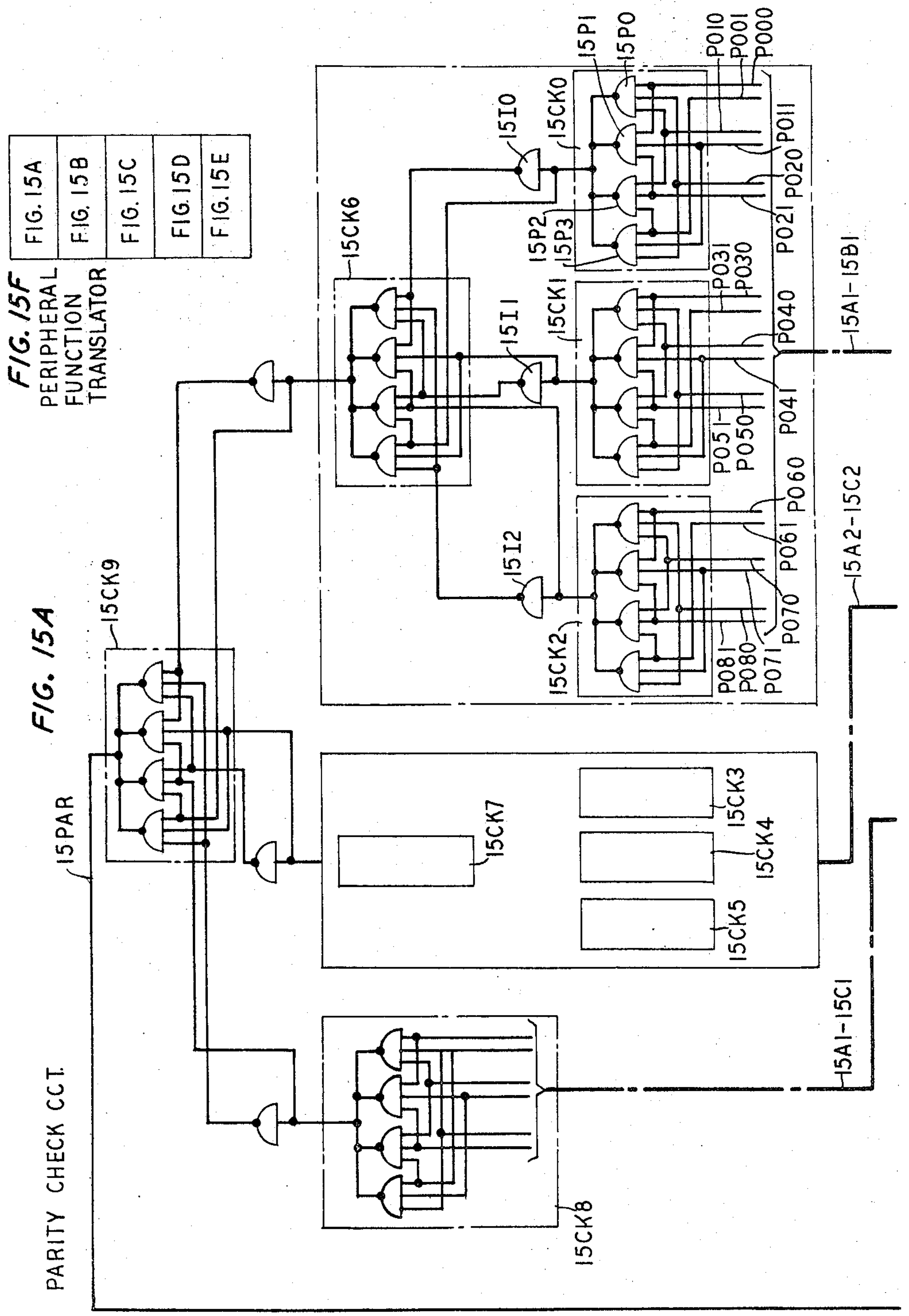
FIGS. 15A—15E, when arranged according to FIG. 15F, show a peripheral function translator.
Figure 15B:
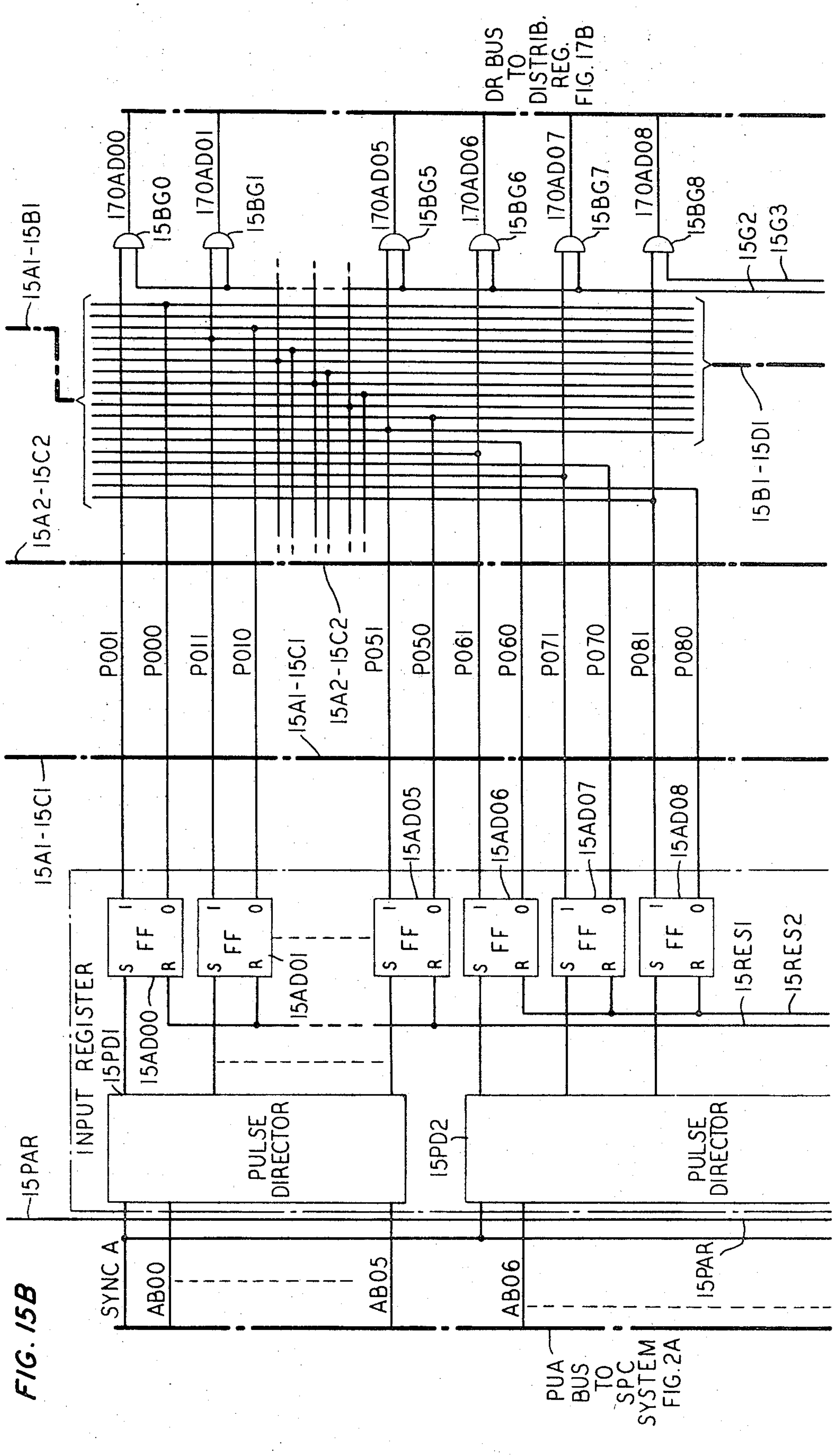
Figure 15C:
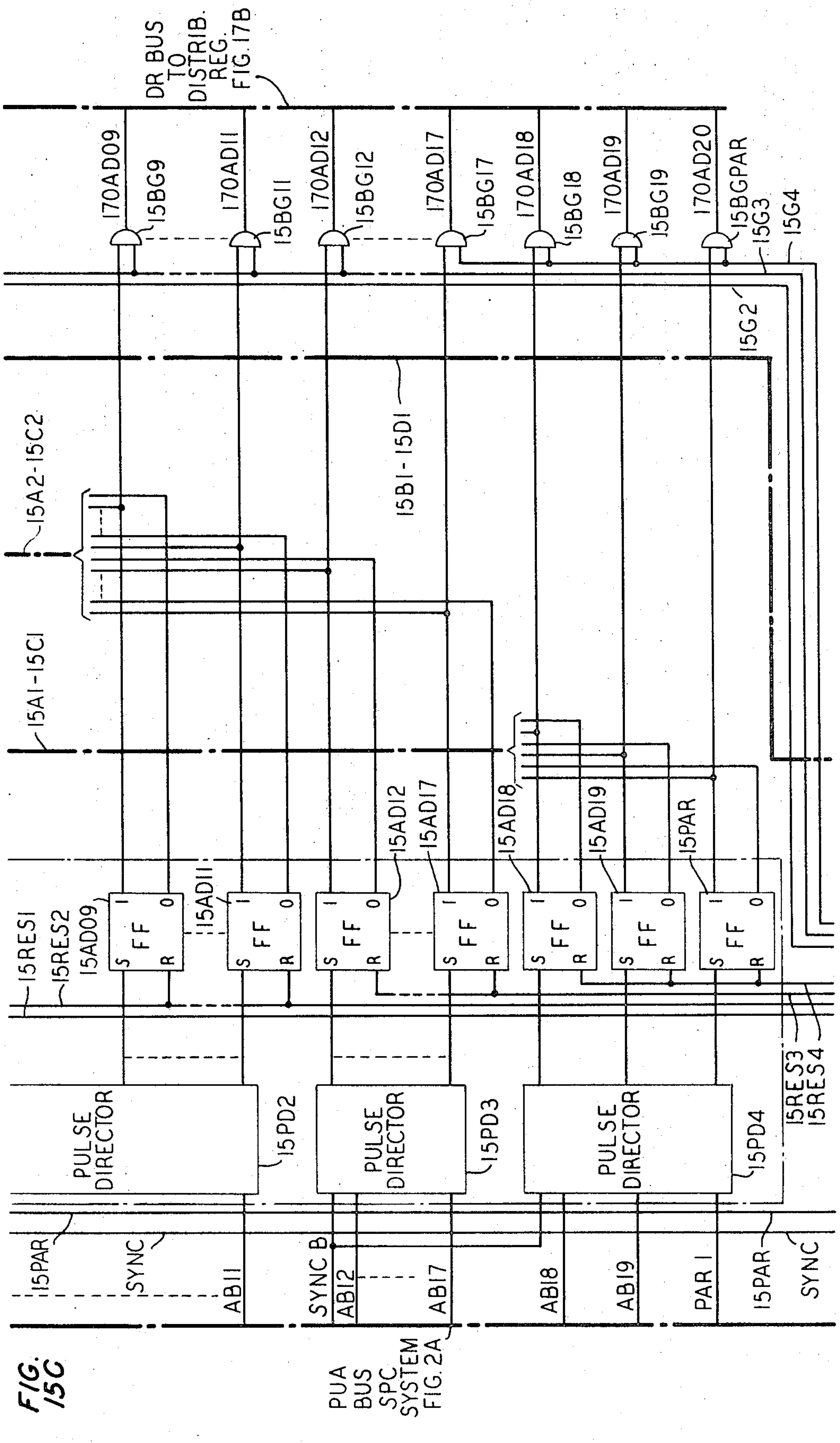
Figure 15D:
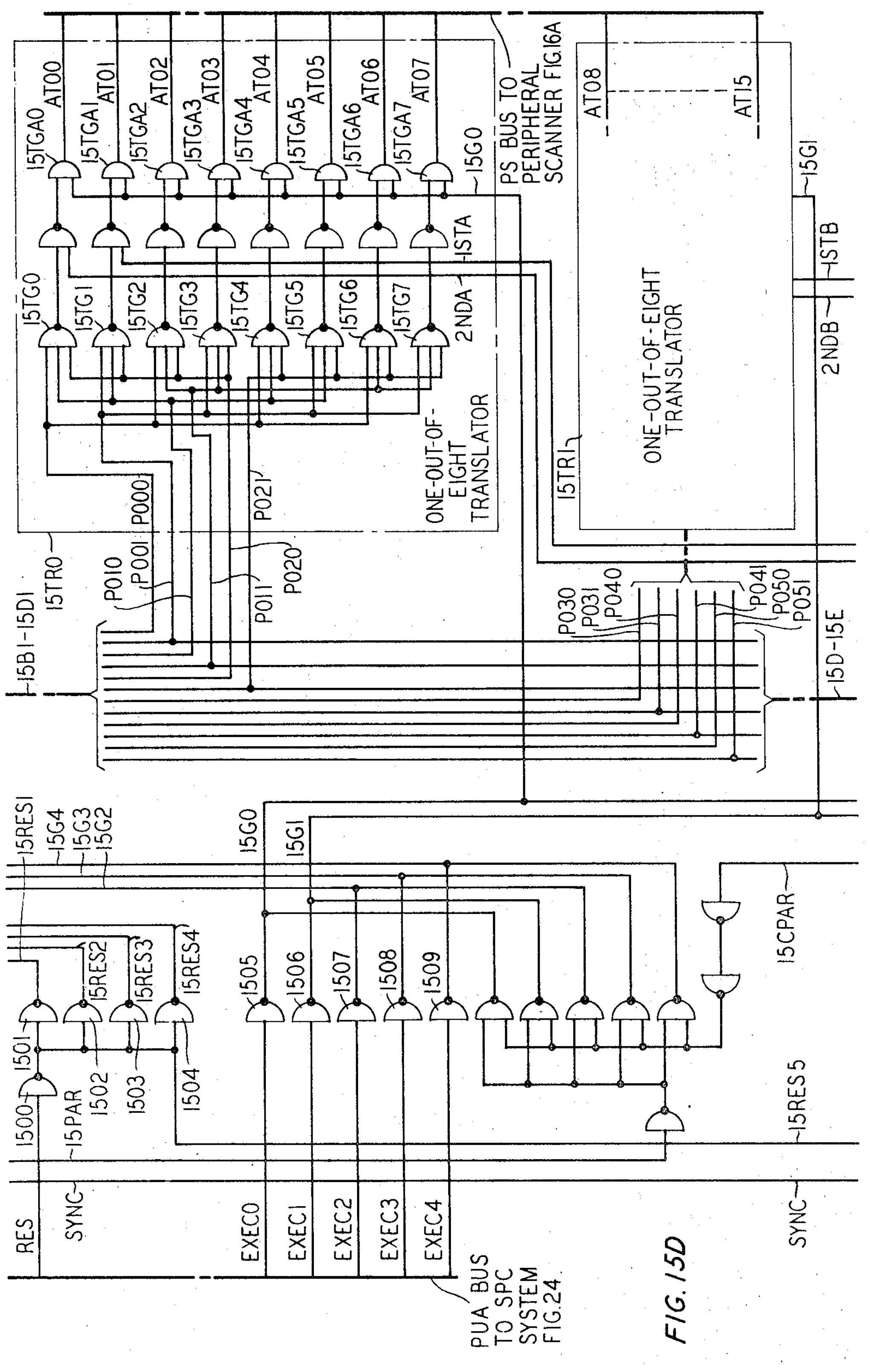
Figure 15E:
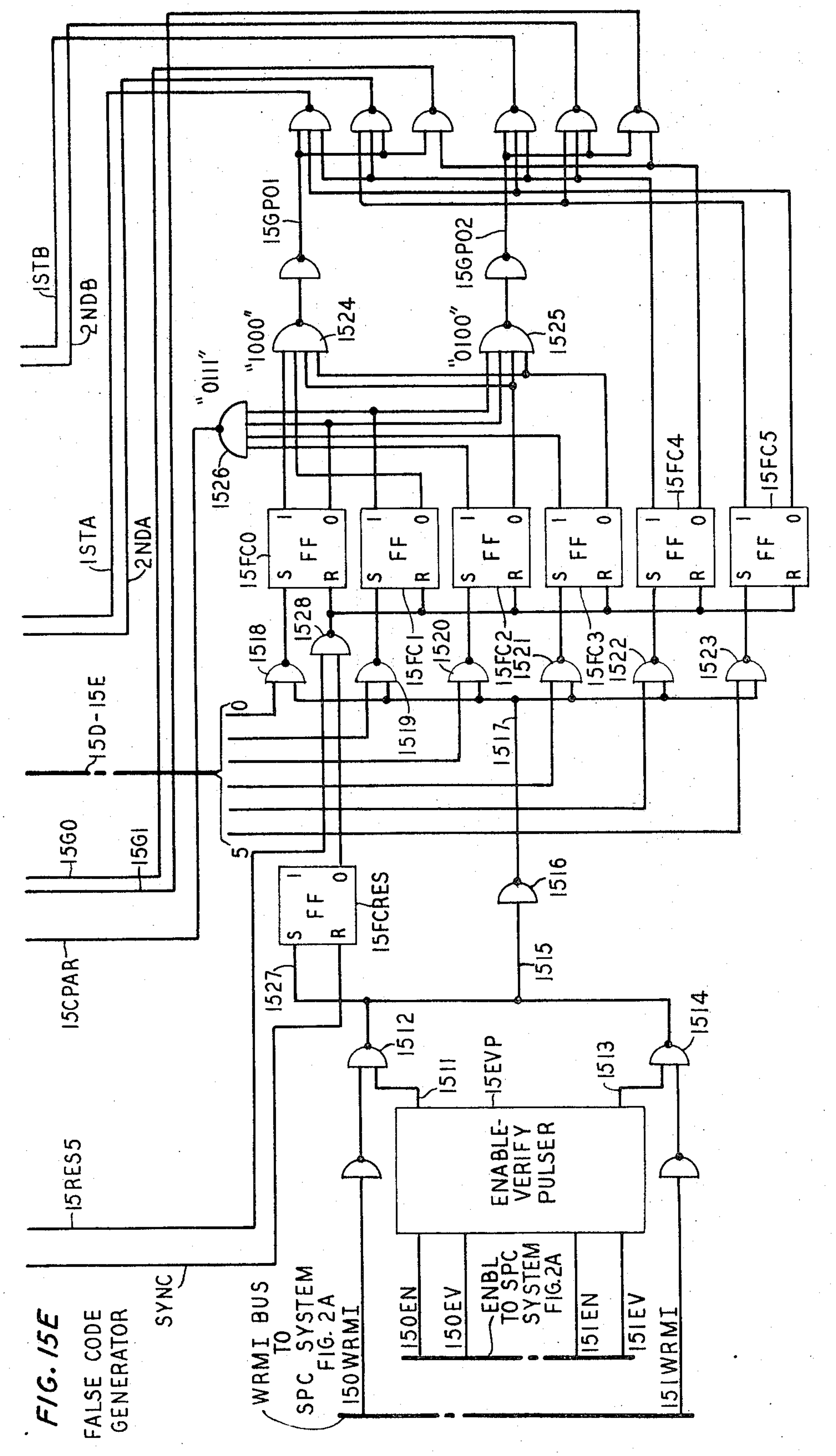

The peripheral function translator is shown in FIGS. 15A through 15E, when arranged in accordance with FIG. 15F, and comprises an input register and binary output gates (FIGS. 15B and 15C), binary information one out of eight translators (FIG. 15D), a parity check circuit (FIG. 15A), and a false code generator (FIG. 15E). The input register comprises pulse directors 15PD1—15PD4 and flip-flop 15PAR and 15AD00—15AD19. The input register receives and stores from the stored program control system twenty bits of information and a parity bit which are gated through the pulse directors 15PD1—15PD4 by a synchronous pulse on leads SYNCA and SYNCB. The synchronous pulse is sent from the stored program control system along with the address information.

The outputs of the pulse directors are coupled to the "set" terminals of input register flip-flops 15PAR and 15AD00—15AD19. Prior to sending the address information a pulse received on reset lead RES is inverted by inverter 1500, extended through fan-out circuits 1501—1504 and over reset leads 15RES1—15RES4 to reset the register flip-flops 15AD– in the input register.

Thus, a cycle for the peripheral function translator occurs in three steps. First a 0.5 microsecond reset pulse is received from the stored program control system over reset conductor RES and fanned out over conductors 15RES1—15RES4 to reset the input register flip-flops 15AD– before the address information is received. Secondly, a synchronous pulse, the parity bit, and the address information bits are received on leads SYNCA, SYNCB, PAR1, and AB00—AB19 0.75 microsecond after the reset pulse. This information selectively sets the input register flip-flops in accordance with the information bits received from the stored program control system. Finally, 1 microsecond after the address information is registered, an execute pulse is transmitted over conductors EXECO—EXEC4, through inverters 1505—1509 and over conductors 15G0-15G4 to gate the address information to the peripheral units. Conductors 15G0 and 15G1 enable the translator output gates in FIG. 15D while gate leads 15G2, 15G3, and 15G4 enable the binary output gates in FIGS. 15B and 15C.

As mentioned above, the output of the peripheral function translator comprises a binary output and a translated output. The binary output gates designated 15BG00—15BG19 are shown in the right-hand portion of FIGS. 15B and 15C. The inputs of the binary gates are connected directly to the outputs of the corresponding input register flip-flops 15AD00—15AD19. The gating pulse that occurred on leads 15G2, 15G3, and 15G4 enables output gates 15BG00—15BG19 in accordance with the information registered on the corresponding input register flip-flops, and output gates 15BG00—15BG19 transmit information over bus DR to peripheral units such as distributor registers.

The one out of eight translators shown in FIG. 15D provide the address information for the peripheral scanners. The first six bits stored in input registers 15AD00—15AD05 are extended double rail through cable 15B1—15D1 to the one out of eight translators 15TRO and 15TR1. The first three bits are fed into translator 15TR0 and the second three bits are fed into translator 15TR1. Depending upon the states of the three bits in each group, one of the eight 15TG- gates in each group will have all its inputs at +4.5 volts to transmit a single to its corresponding 15TGA- output gate. The 15TGA- gates are enabled by gating pulses on the 15G0 and 14G1 conductors extending to translators 15TR0 and 15TR1, respectively.

The gating pulses on conductors 15G0—15G4, which gate the information to the peripheral units, are derived from the union of the execute pulse transmitted from the stored program control system and the output on conductor 15PAR from the parity check circuit in FIG. 15A.

The inputs to the parity check circuit are fed double rail over cables 15A1-15C1, 15A2-15C2, and 15A1-15B1 directly from the output of register flip-flops 15AD-. The parity check circuit comprises ten, three-bit check circuits (15CK-) arranged in three stages. Stage one comprises check circuits 15CK0—15CK5 and checks bits 0—17. The second stage comprises check circuits 15CK6—15CK8 and checks bits 18 and 19 and the parity bit along with the six outputs of the first stage. The final stage 15CK9 checks the three outputs of the second stage and produces a 4.5 volt output on conductor 15PAR if the parity over the 21 bit input is odd.

Each check circuit, such as circuit 15CKO, comprises four gates designated 15P-. The check circuits are arranged so that if either none or two of the input register flip-flops coupled to the check circuit are set, one of the 15P- gates will have all of its input at a high potential holding the input to the inverter 15I- at ground. For example, with respect to check circuit 15CK0, if the input registers 15AD00—15AD02 contain all zeros (that is, all flip-flops were reset), the output of gate 15PO will be at ground. If the register contains "110," the output of gate 15P3 will be at ground and if the register contains "101," gate 15P2 will be at ground while "011" will place the output of gate 15P1 at ground. Conversely, if the input register contains an odd number of set flip-flops which is equivalent to an odd number of ones, none of the 15P- gates will be enabled and the common mode will remain at +4.5 volts. The remaining check circuits function in the same manner as check circuit 15CK0.

The peripheral function translator also comprises a false code generator (FIG. 15E) for generating invalid scanner addresses for diagnostic purposes. The generation of a false code requires two cycles of the peripheral function translator. During the first cycle in the first six bits of the input are gated to the false code generator by an enable pulse from the central pulse distributor of the stored program control system. The second cycle is a normal operating cycle, however, the output to the scanners is modified by information stored in the false code register.

The false code generator in FIG. 15E receives its input over cable 15D—15E from the first six stages of the input register. These bits are gated to the false code register 15FC0—15FC5 when an enable pulse and a "we-really-mean-it" pulse are received from the central pulse distributor. The enable pulse is transmitted to the enable-verify pulser 15EVP over conductor 15OEN or 151EN, depending upon which of the duplicated buses is being used.

Enable-verify pulsers, such as 15EVP, receive enable pulses from the central pulse distributor to gate information from an address bus to a particular peripheral unit. The enable-verify pulse then returns a verification pulse to the central pulse distributor indicating that the gating pulse had been received. A more detailed description of the enable-verify operation will be given subsequently and can also be found in Volume XLIII, No. 5, Part 2 of The Bell System Technical Journal, Sept. 1964.

Assuming that the processor is working on bus 0, the enable pulse will be received on conductor 15OEN to trigger enable-verify pulser 15EVP. The output of the enable-verify pulser 15EVP is transmitted over conductor 511 to partially enable gate 1512. Gate 1512 is fully enabled upon the receipt of the we-really-mean-it pulse on conductor 150WRMI. With gate 1512 enabled, a pulse is transmitted over conductor 1515, inverted by inverter 1516, and transmitted over conductor 1517 to gates 1518—1523. Flip-flops 15FC0—15FC5 will be selectively set or remain reset in accordance with the information in the input register. False code registers 15FC0—15FC3 determine which of the one out of eight translators 15TR0 or 15TR1 is to be falsely coded. If the contents of register 15FC0—15FC is "1000," gate 1524 will be enabled to permit false coding translator 15TR0. If the contents of the false code register is "0100," gate 1525 will be enabled to permit false coding translator 15TR1. If the false code registers 15FC0—15FC contain "0111," respectively, gate 1526 is enabled transmitting a signal over conductor 5CPAR. A signal on conductor 15CPAR simulates a valid parity check regardless of the input to the parity check circuit from the input registers 15AD-.

False code registers 15FC4 and 15FC5 specify whether the false code to be given to the peripheral scanners is to be a one-out-of-n or a two-out-of-n and if the extra bit in the two-out-of-n code is to be introduced in the first or second position of the translator address.

Flip-flop 15FCRES is used for resetting the false code register flip-flops 15FC-. Initially, the false code register flip-flops 15FC0—15FC5 will be reset by a pulse on conductor 15RES5. During the first cycle of the peripheral function translator the pulse from gate 1512, which gates the information from the input registers to the false code registers, is also transmitted over conductor 1527 to set flip-flop 15FCRES and flip-flop 15FCRES will remain set at the end of the first cycle. The reset pulse on conductor 15RES5 at the end of the second cycle will not enable gate 1528. However, a synchronous pulse, which occurs after the reset pulse, will reset flip-flop 15FCRES so that the false code register flip-flops 15FC0—15FC5 will be reset by the next reset pulse.

The peripheral function translator receives information from the stored program control system, checks its parity and gates the information to the peripheral scanners and distributor registers. In one case, the binary information is translated into two one out of eight words for addressing the peripheral scanners. The peripheral function translator also has the capability of generating false address codes for performing diagnostic tests on the peripheral scanners.

The peripheral function translator can also be false coded to transmit incorrect parity to the distributor registers for diagnostic reasons.

PERIPHERAL SCANNER

The peripheral scanner is the input interface buffer to the stored program control system. The peripheral scanner provides a communication path from various electromechanical units of equipment, such as decoder channels, link controllers, markers, group-busy circuits, et cetera, to gather information for use by the stored program control system in processing telephone calls.

While many different types of scanners can be employed in our invention, for illustrative purposes it has been assumed that the scanner disclosed herein is of the type shown in more detail in U.S. Pat. No. 3,254,157 to A. N. Guercio et al. of May 31, 1966.

The peripheral scanner uses a device called a ferrod sensor for detecting changes of state in equipment being monitored. The ferrod sensor has an interrogate winding, a readout winding, and two control windings. The interrogate and readout windings of the device are connected to the access and readout circuitry of the scanner, and the control windings are connected to the circuits being monitored. The ferrod sensor can be considered like a transformer whose coupling (that is, the ability to induce a signal between the interrogate and readout windings) is controlled by current flow in the control windings. A more complete description of this device can be found in U.S. Pat. No. 3,175,042 to J. A. Baldwin et al. of Mar. 23, 1965.

Turning now to FIGS. 16A through 16F, it can be seen that the peripheral scanner comprises two 20 × 32 ferrod matrix units which, for the purpose of discussion, can be considered as a single ferrod matrix having 64 rows with 20 ferrods in each row. The ferrod matrix can be addressed from either one of the address circuits designated controllers 0 and 1. Each of the 64 rows of ferrods has a discrete address and when a row is addressed by a controller, all 20 ferrods in a row are interrogated. If the scanner is functioning properly, a 20 bit answer is returned over the SCAN ANS bus to the stored program control system along with an all-seems-well indication.

Figure 16A:
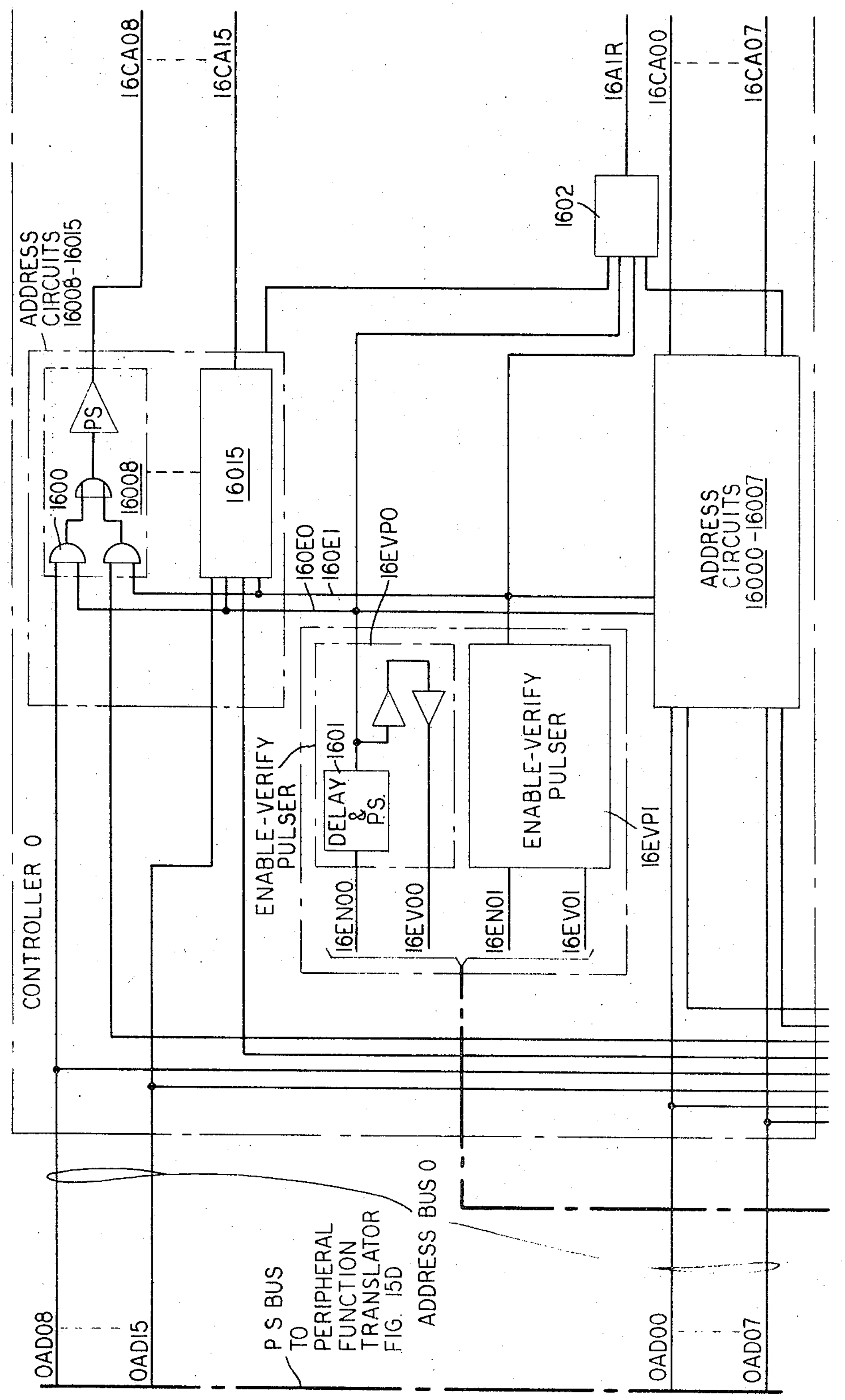
FIGS. 16A—16F, when arranged according to FIG. 16G, show a peripheral scanner.
Figure 16B:
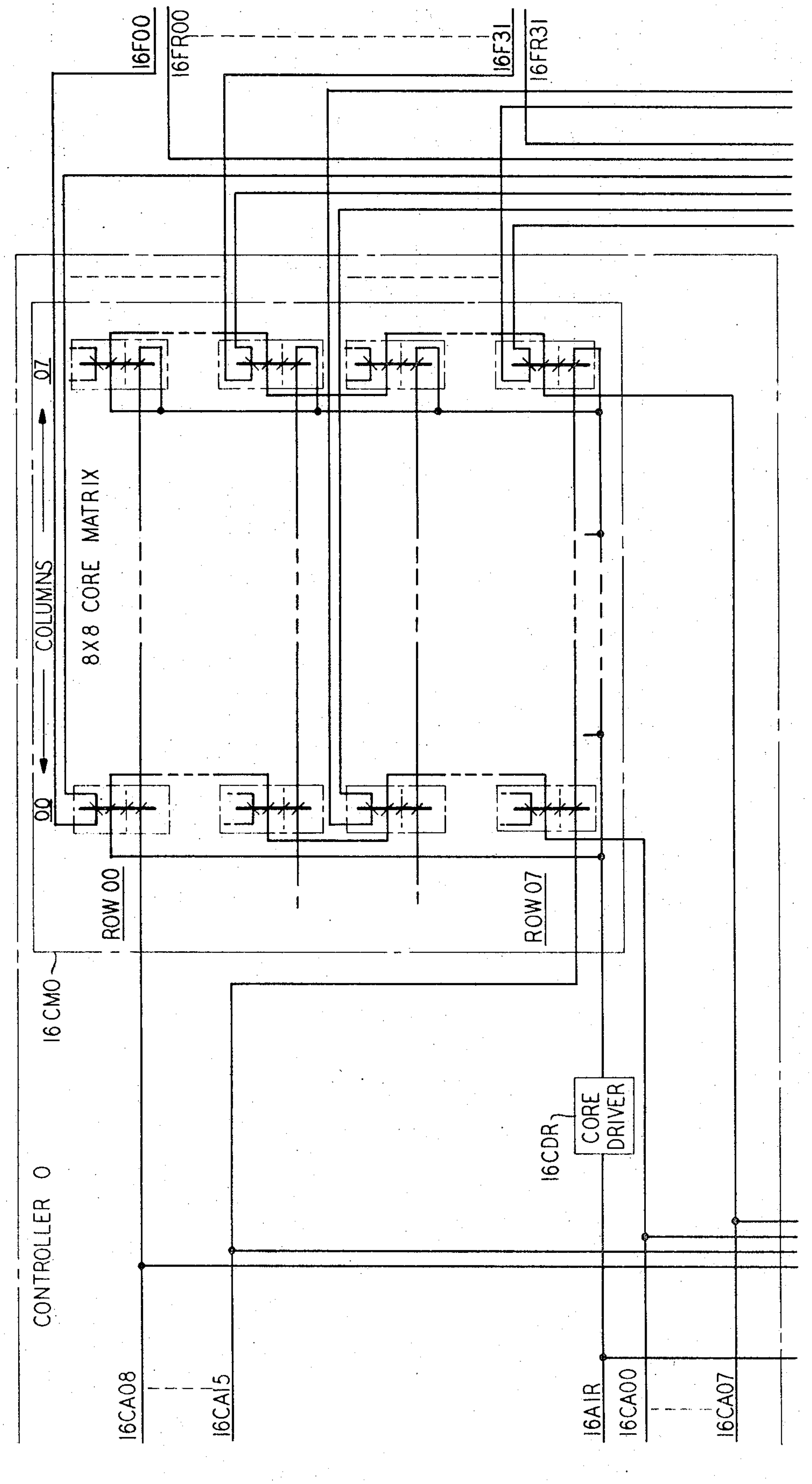
Figure 16C:
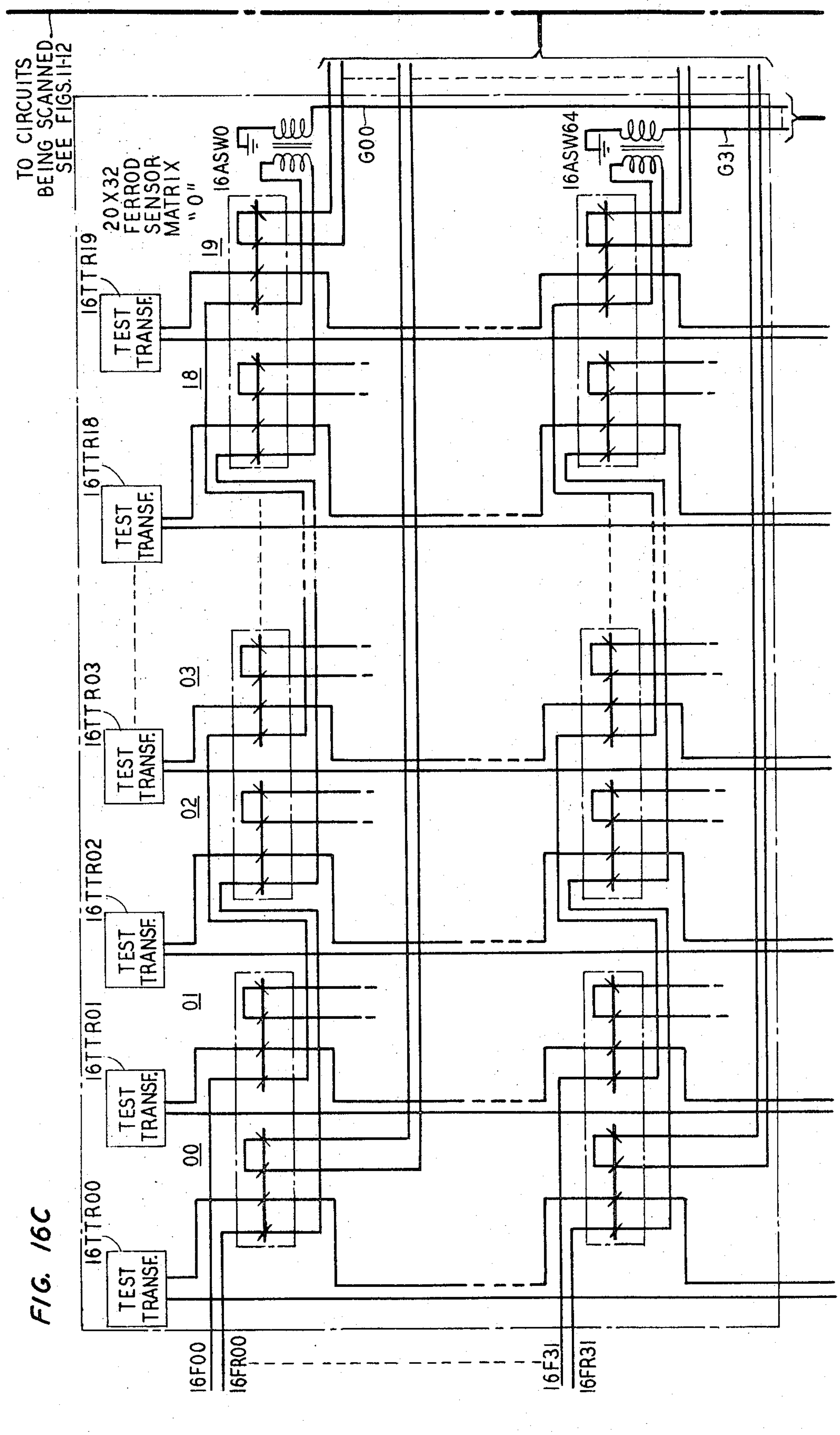
Figures 16D, 16G:
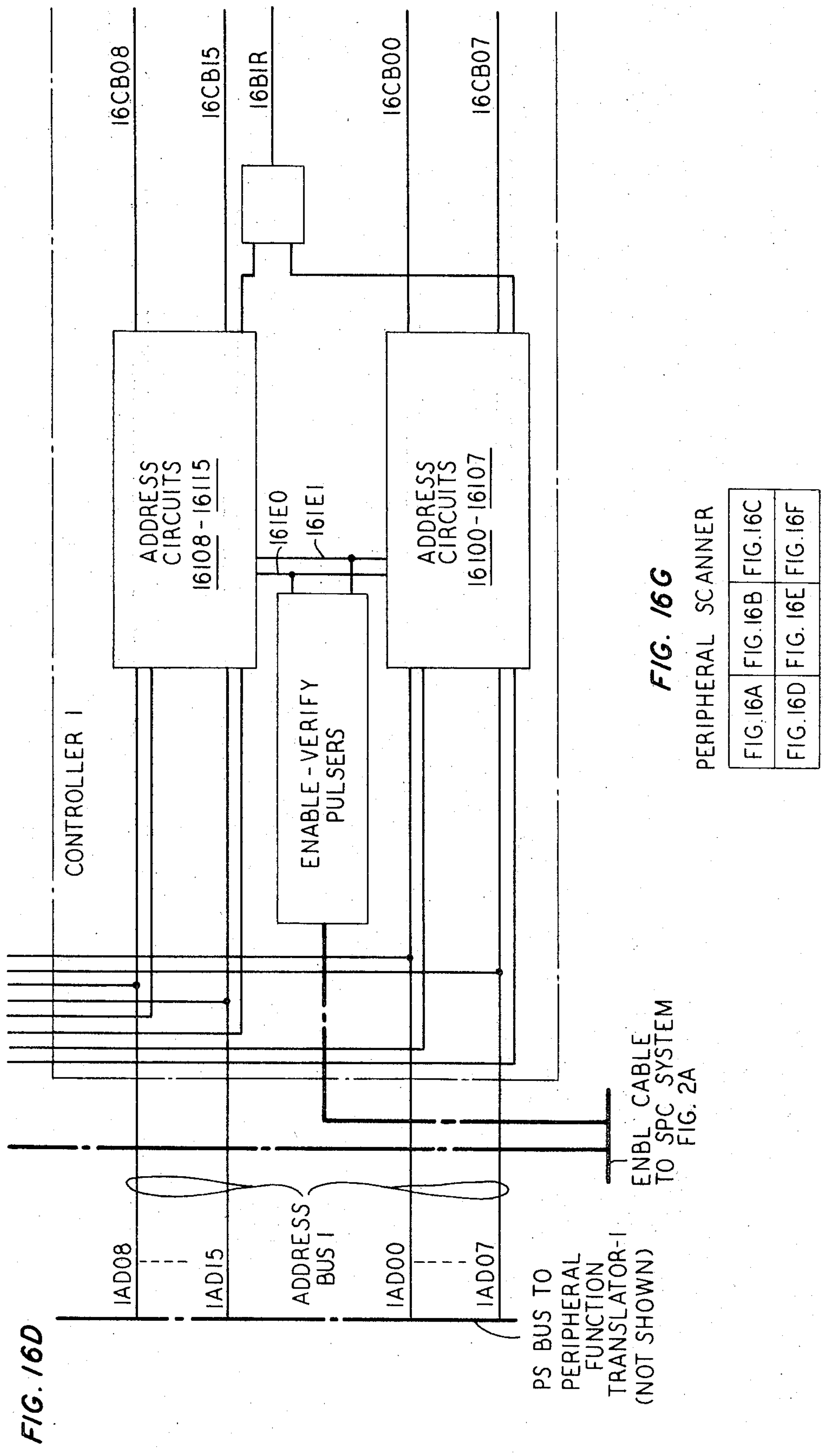
Figure 16E:
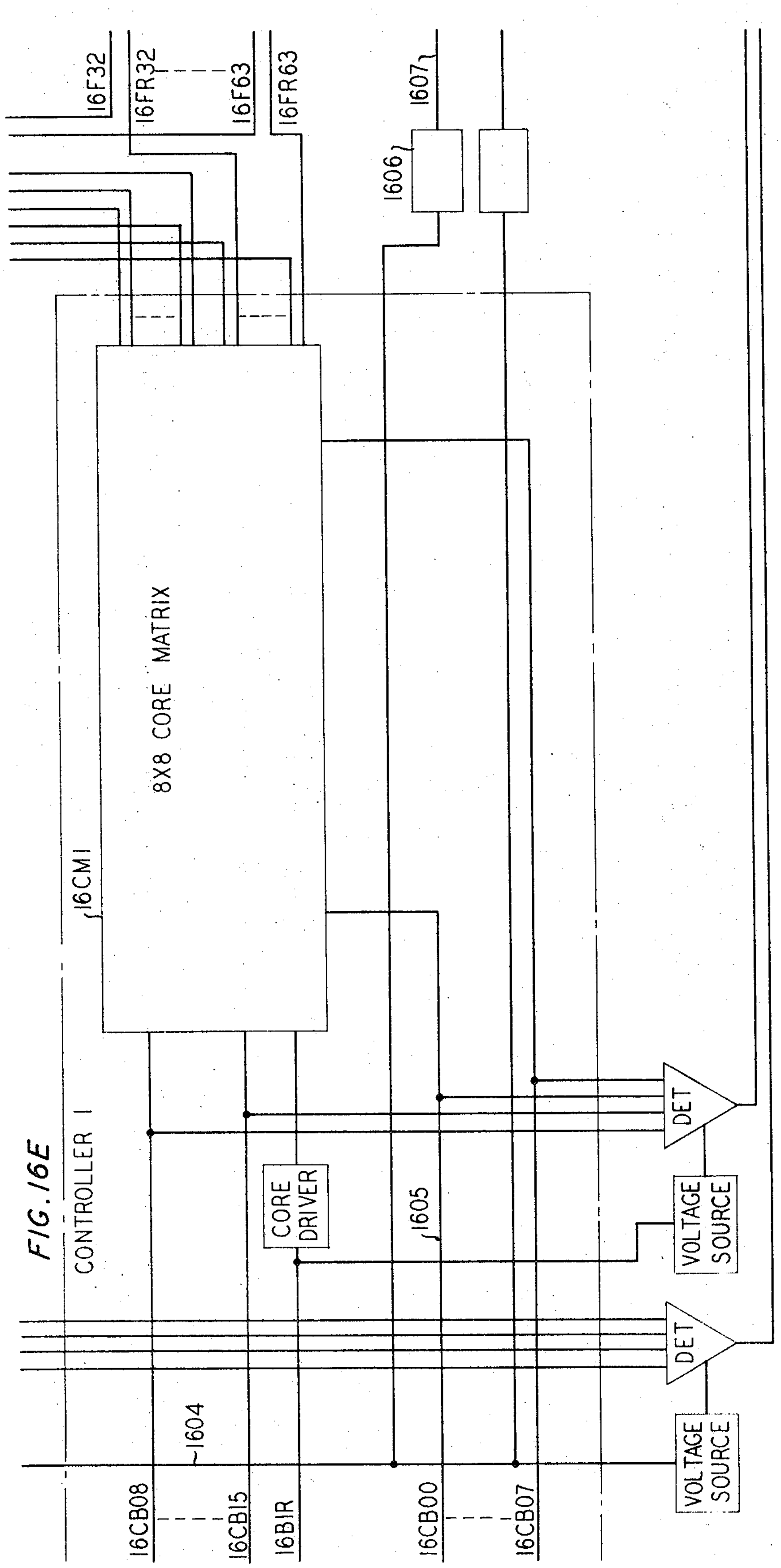

Each controller comprises access circuitry and an 8 × 8 core matrix. The controllers receive address information from the peripheral function translator over a duplicated bus system designated the PS bus. The enable pulses are received over dedicated buses from either one of the central pulse distributors in the stored program control system. For example, controller 0, which is shown in FIGS. 16A and 16B, comprises address circuits 16000-16-15 and enable-verify pulsers 15EV-PO and 16EVP1. Address circuits 16000—16015 are connected to the peripheral function translator over conductors 0AD00 through 0AD15 in address bus 0 or over conductors 1AD00 through 1AD15 in address bus 1. The address circuits in controller 1 are also connected to both address buses so that either controller can be addressed over either bus.

Two enable-verify pulsers are provided for each controller to permit the controller to receive address information from each address bus. The enable-verify pulser receives a 0.5 microsecond pulse from the central pulse distributor and stretches this pulse into a 2 microsecond pulse for gating the information from the address bus. If it is assumed that controller 0 is to receive address information over address bus 0, the 0.5 microsecond pulse is received over conductors 16EN00 and stretched by delay and pulse shaper circuit 1601 to cause a 2 microsecond pulse on output lead 160E0 which partially enables an AND gate in each of the address circuits 16000—16015 similar to AND gate 1600 and address circuit 16008. These AND gates are selectively enabled based on the address information received from the peripheral function translator over address conductors 0AD00 through 0AD15 in bus PS. The output of delay and pulse shaper circuit 1601 is delayed for 2 microsecond and returned to the stored program control system as a verify signal over conductor 16EV00 to signal the processor that the enable pulse had been received by the peripheral unit.

For discussion purposes, the address circuits can be considered as comprising two groups. Circuits 16000—16007 are in the group designated least significant while circuits 16008—16015 are in the group designated most significant. For the proper addressing of a scanner row, a one out of eight must be received in each of the address groups.

The core matrix 16CM0 for controller 0 comprises 64 ferrod cores in an 8 × 8 array. Each core has four windings. Two of the windings are considered drive windings and are connected over conductors 16CA0—16CA15 to the least significant and most significant groups of address circuits. The third winding is an output winding which drives a row of ferrods in the ferrod matrix and the fourth winding is a bias winding.

When the processor selects one address conductor in the least significant group and one address conductor in the most significant group, it is, in effect, selecting a column and row in the core matrix. Upon the activation of the address circuits, delay and pulse shaper circuit 1602 in FIG. 16A is enabled and a core driver, such as 16CDR, is activated. Core driver 16CDR transmits pulses of 3 microseconds duration to the cores and these pulses are returned back over the selected path. The current pulse in each column and row is a half drive. The core at the intersection of the driven row and column receives a full drive and switches to produce a pulse which drives a corresponding row of ferrods. Each of the other cores in a driven row or column only receives a half drive and is not switched. When the driven core switches, it provides bipolar interrogate pulses over one of the conductors 16F0—16F63 to interrogate windings of the corresponding row of ferrods in the ferrod matrix.

The interrogate windings of each 20 ferrods in a row are connected in a series circuit which includes the primary winding of an all-seems-well transformer 16ASW-. An all-seems-well signal is generated during each normal addressing cycle to indicate that the address circuits, the core matrix, and the interrogate portion of the ferrod matrix have functioned properly.

Figure 16F:
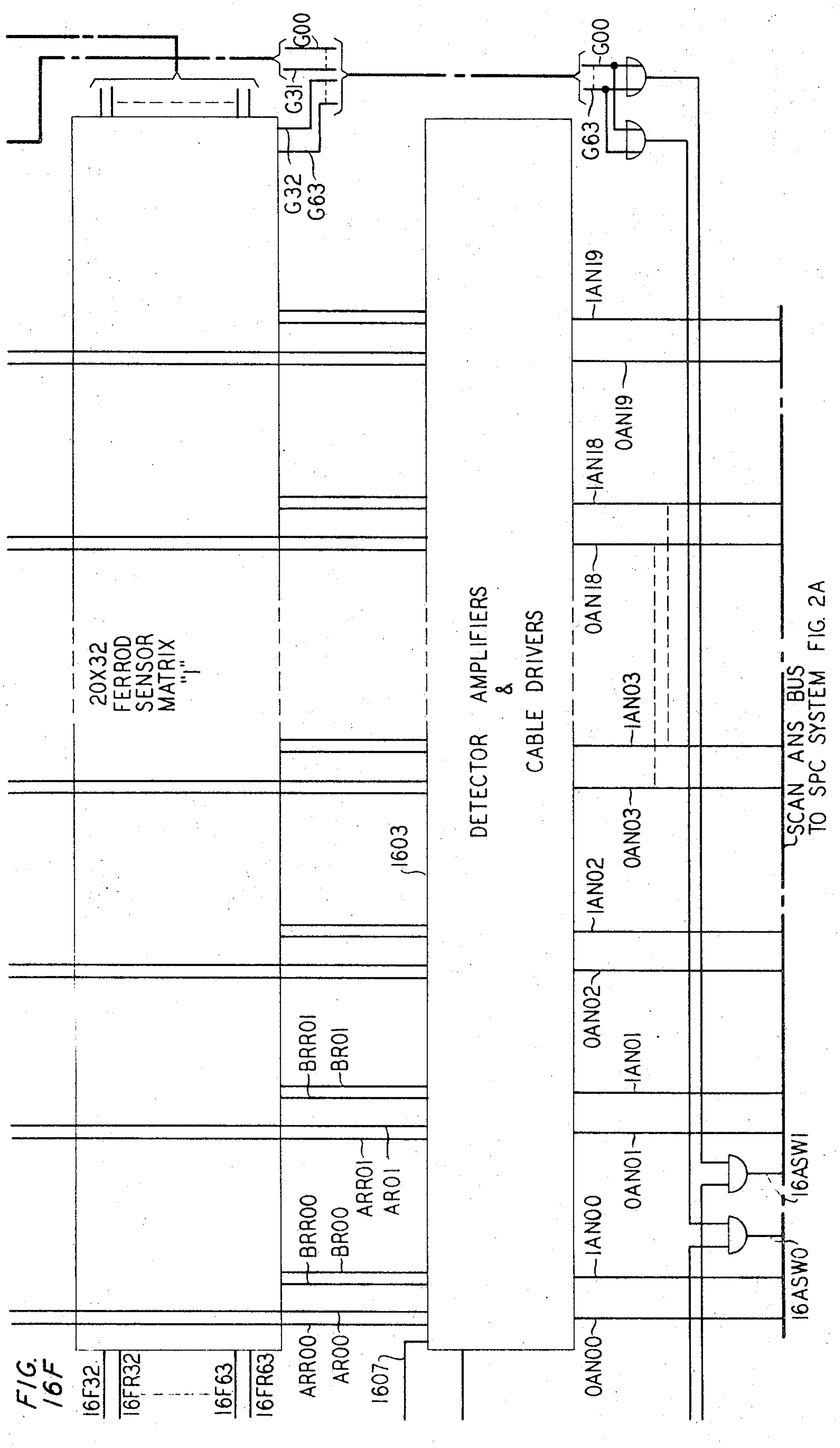

A readout loop comprises the readout windings connected in series of all ferrods in a column and these are connected to a test transformer 16TTR- and output circuitry generally shown by the block diagram 1603 in FIG. 16F.

The control windings of a ferrod are connected to the circuits being monitored and if current is flowing in the control windings of a ferrod, the interrogate pulse will not produce a bipolar pulse in the ferrod's readout winding. The output of the readout winding activates the output circuitry 1603.

The function of the output circuitry is to convert the ferrod output signals into signals which are usable by the stored program control system. The output circuitry 1603 comprises AND gate amplifiers and cable drivers associated with each column of ferrods. One input to the AND gate amplifier is supplied by the ferrod matrix while the other input is a strobe pulse applied about 0.75 microsecond after the start of the ferrod output. To generate the output strobe pulse, the output of the delay and pulse shaper 1602 is extended over conductor 16AIR and over conductors 1604 and 1605 to delay and pulse shaper circuitry 1606 which, after delaying the pulse extends it over conductor 1607 to output circuitry 1603.

Thus, through the use of peripheral scanners the processor can ascertain the status of equipment and receive input information from the other units of equipment in the telephone system.

DISTRIBUTORS REGISTER

The distributor register circuit shown in FIGS. 17A through 17E is used by the stored program control system to distribute information to the electromechanical units of equipment.

As mentioned above, the processor transmits information to the peripheral function translator which checks parity and transmits the information to the peripheral units, such as scanners and distributor registers. The central pulse distributor of the stored program control system selects the proper distributor register by an enable signal and information is gated from the peripheral function translator into the selected distributor register.

Figures 17A, 17F:
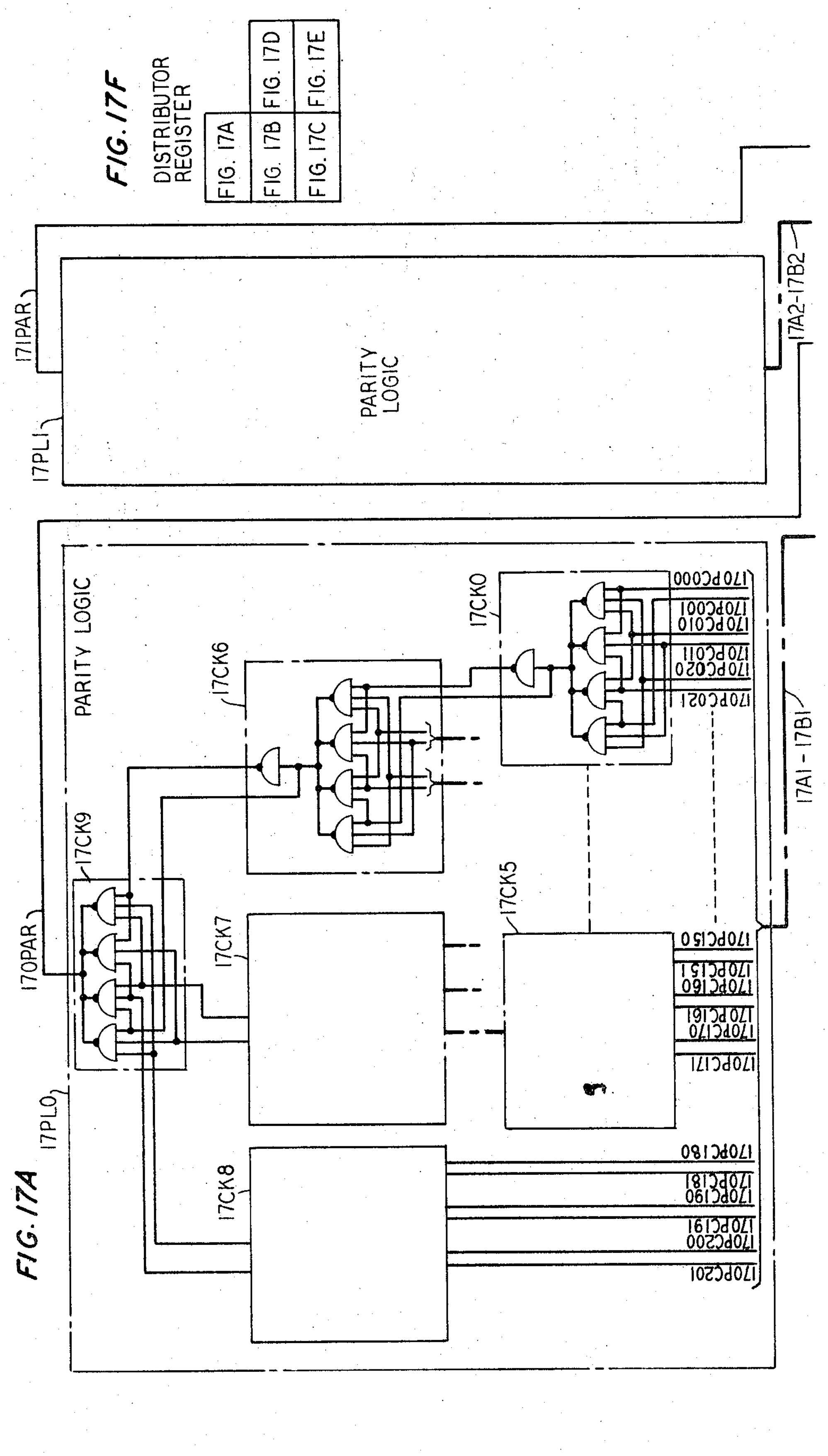
FIGS. 17A—17E, when arranged according to FIG. 17F show a distributor register.
Figure 17B:
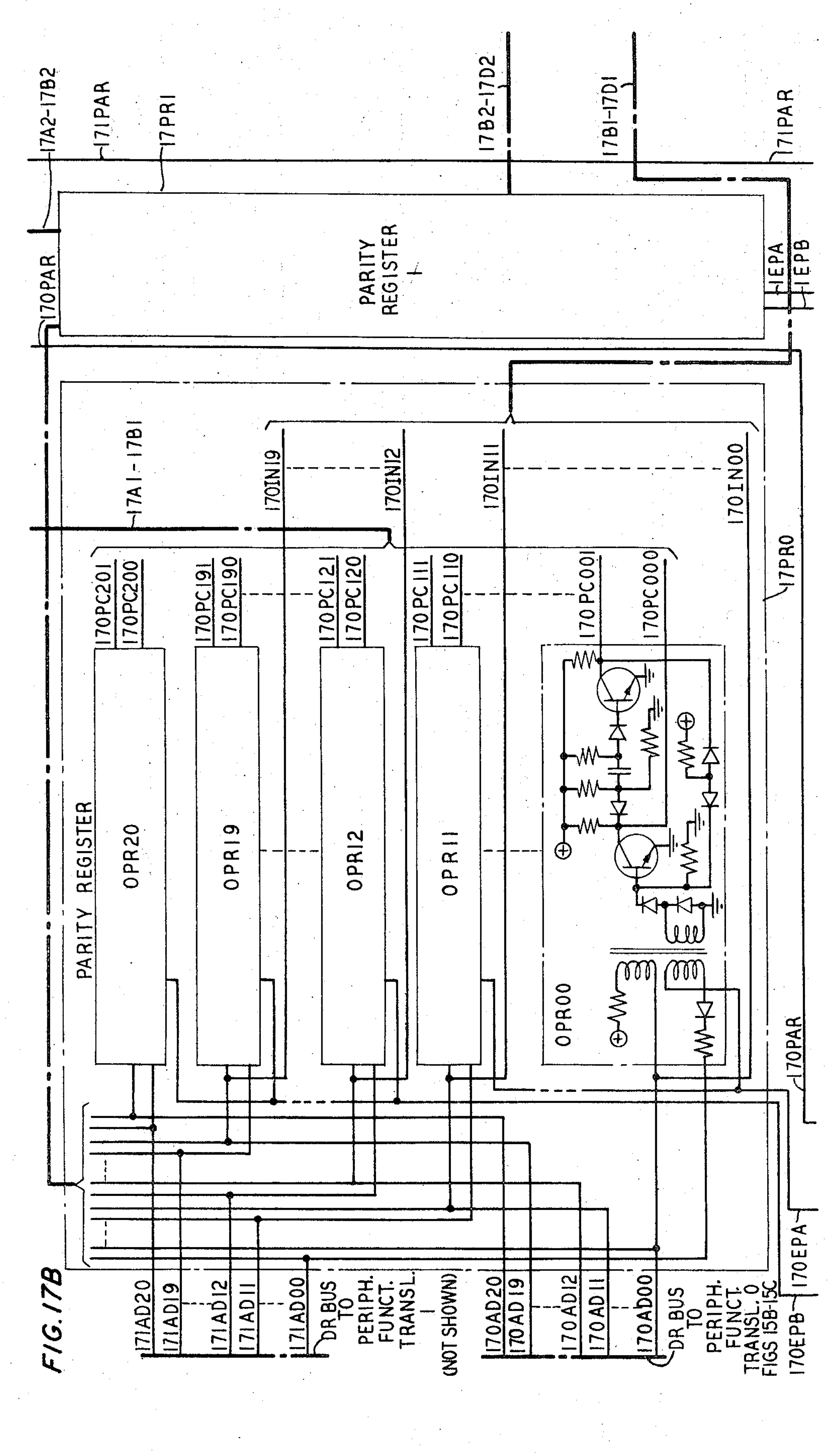
Figure 17C:
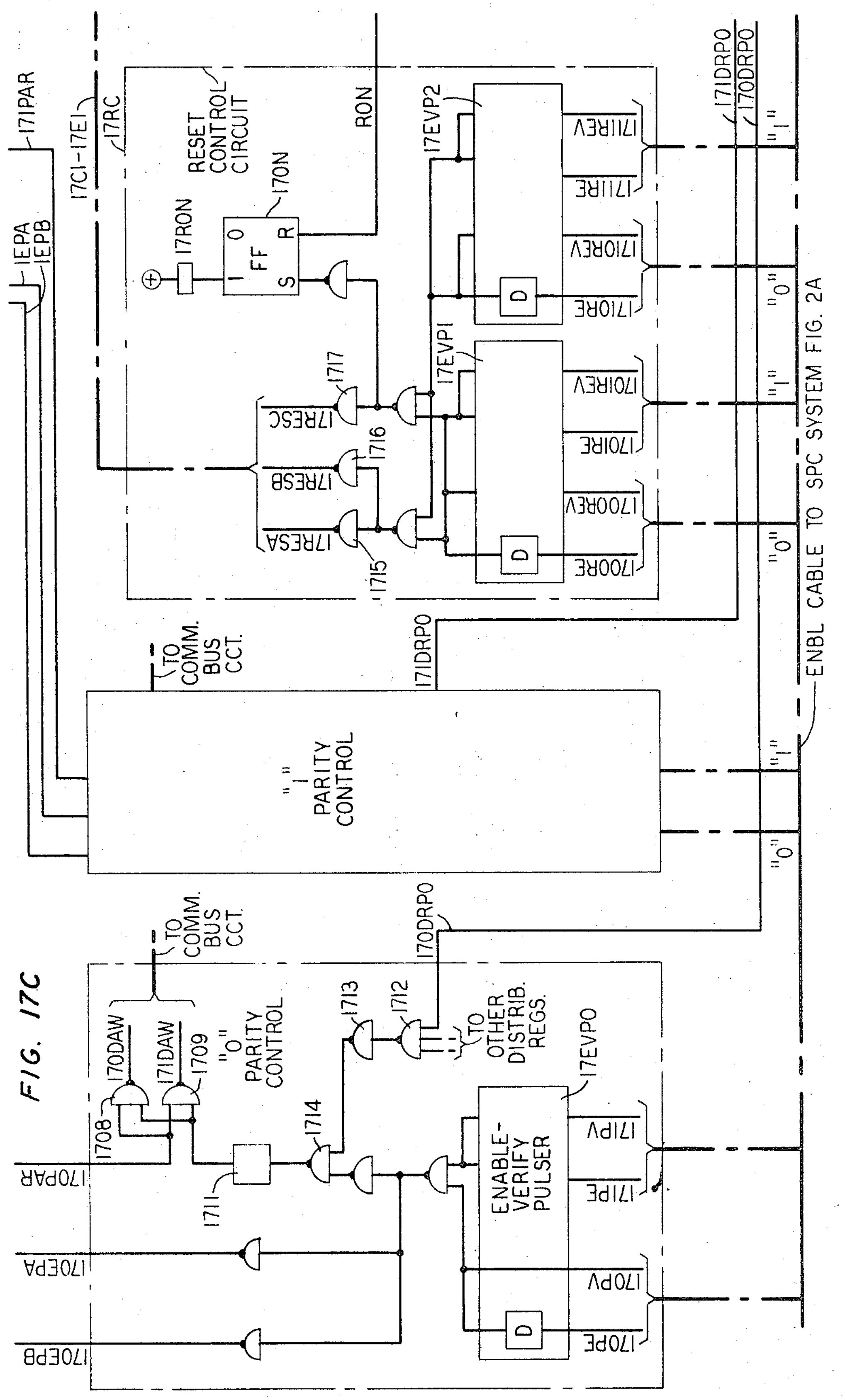

The distributor register comprises parity checking circuitry, a plurality of enable control circuits with associated output registers, and a reset control circuit. The parity circuitry in this embodiment of our invention is shown in FIGS. 17A, 17B, and 17C and comprises duplicated circuits, each designed to function with its own communication bus. The parity circuits are designed to serve up to three distributor registers and each parity circuit has the ability to check parity on the opposite communication bus for diagnostic purposes.

Figure 17D:
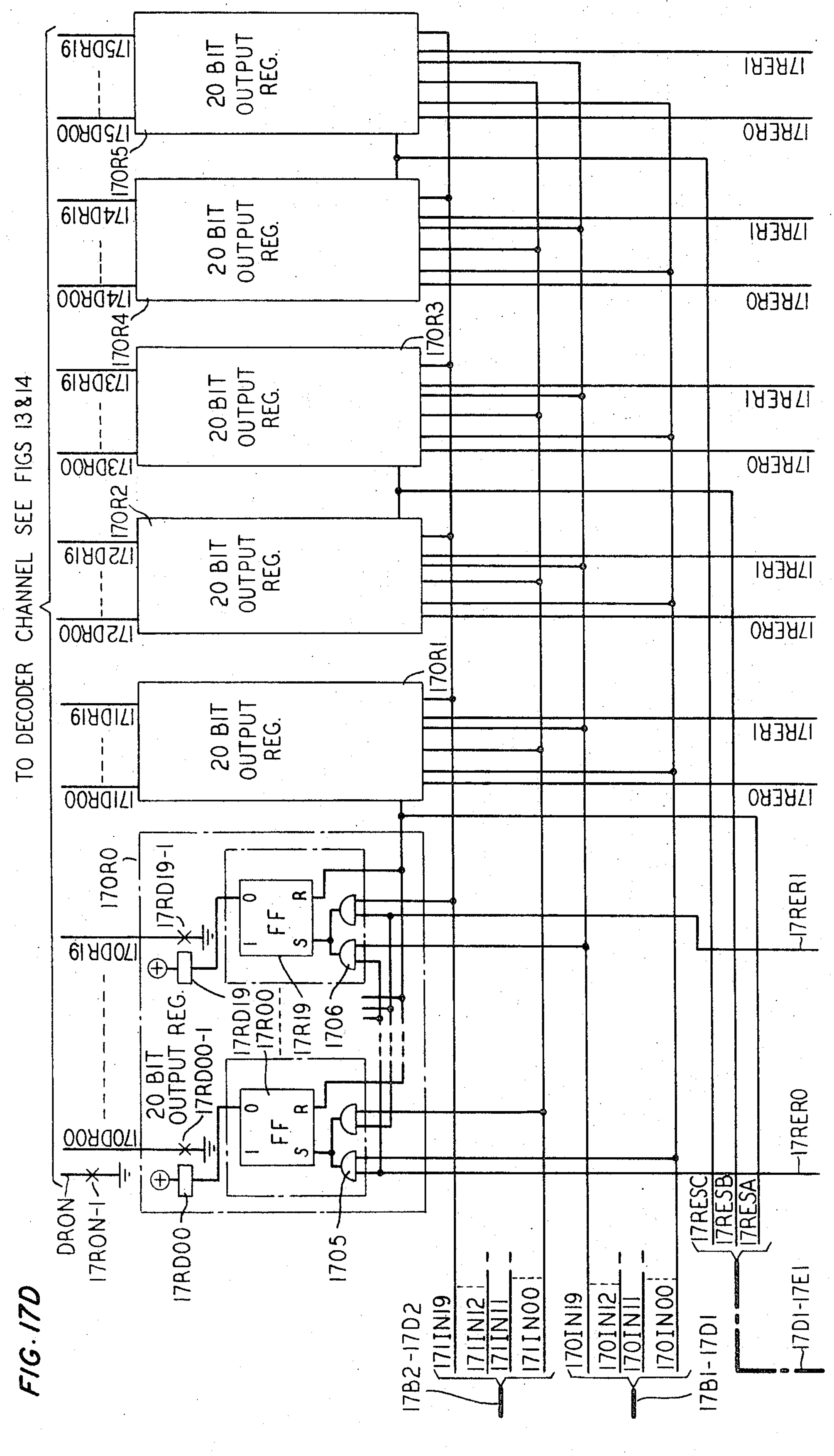
Figure 17E:
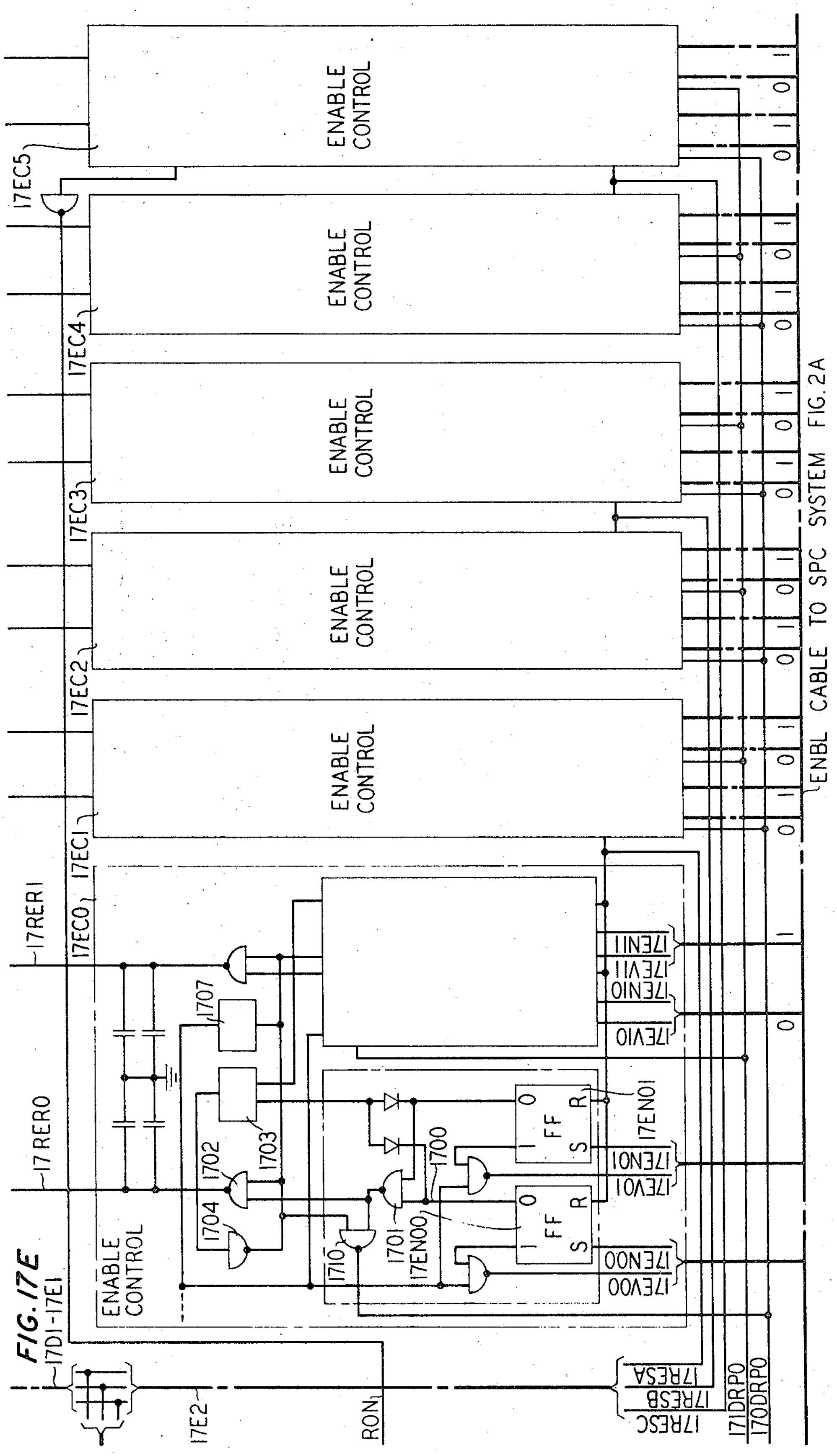

Each distributor register can be equipped with as many as six enable control circuits with associated output registered circuits, as shown in FIGS. 17D and 17E. The central pulse distributor in the stored program control system selects the desired enable control circuit by transmitting an enable pulse over a dedicated bus in the ENBL cable. Since each enable control circuit has a corresponding output register, the selection of an enable control circuit is the same as selecting an output register for distributing information. Assuming that central pulse distributor 0 is working with bus 0 and the processor determines that a distribution is required from output register 170R0, an enable pulse will be sent over conductor 17EN00 to set flip-flop 17EN00 in enable control circuit 17ECO. When flip-flop 17EN0 is set, a signal from its "0" output is transmitted over conductor 1700 and inverted by inverter 1701 to partially enable AND-NOT gate 1702. The output on conductor 1700 is also stretched by pulse stretcher 1703 and inverted by inverter 1704 to fully enable AND-NOT gate 1702. The output of AND-NOT gate 1702 appears on conductor 17RER0 and is used to gate the information from the communication bus into the associated output register. More specifically, the signal on conductor 17RER0 partially enables AND gates 1705 and 1706 and similar AND gates not shown in the 20 bit output register 170R0.

The information to be distributed is in the form of pulses received from the peripheral function translator over conductors 170AD00 through 17OAD19 in bus OR. These pulses are extended over conductors 1701N00 through 170IN19 in cable 17B1–17D1 to each of the six output registers 170R0—170R5 . In the example being described, the information is to be gated into output register 170R0. Therefore, AND gates 1705 and 1706, and similar gates not shown, will be selectively enabled in accordance with the information received from the peripheral function translator. Certain of the flip-flops 17R00 through 17R19 will be set to cause their associated distributor relays 17RD00 through 17RD19 to be operated. With the distributor relays operated, a ground is transmitted over the corresponding conductors 170DR00 through 170DR19 to actuate equipment in the electromechanical control units, such as decoder channel circuits.

It will be recalled that AND-NOT gate 1702 in enable control circuit 17ECO (FIG. 17E) was fully enabled by the output from pulse stretcher 1703 and inverter 1704. This output is also applied to differentiating circuit 1707 which delays the pulse and transmits it back to the central pulse distributor over conductor 17EV00 as a verification pulse to inform the central pulse distributor that the enable control circuit had been actuated.

During normal distributor register operation, the information received from the peripheral function translator over conductors 170AD00 through 170AD20 in bus DR is also registered in the 21 bit parity register 17PR0. Each parity register comprises a plurality of monostable multivibrators which are triggered by the input signals to provide a 4.5 microsecond output pulse. The output conductors 170PC000-—170PC201 of parity register 17PR0 are extended in cable 17A1–17B1 to parity logic circuit 17PL0. A parity logic circuit is also provided for parity register 17PR1. Each parity logic circuit in FIG. 17A comprises ten check circuits designated 17CK0—17CK9 arranged in three stages. If the parity over the 21 bit input is odd, a 24 volt output signal is transmitted over conductor 170PAR to FIG. 17C to partially enable gates 1708 and 1709. It will be recalled that when enable flip-flop 17EN0 in FIG. 17E was set, the output of inverters 1701 and 1704 enabled AND-NOT gate 1702. At this time AND-NOT gate 1710 is also enabled to transmit a signal over conductor 170DRP which fully enables AND-NOT gates 1708 and 1709. These gates transmit an all-seems-well signal over conductors 170DAW and 171DAW to the central pulse distributors in the stored program control system.

Several of the output registers shown in FIG. 17D can be individually set under control of the central pulse distributor. However, all output registers are reset simultaneously by a signal from the central pulse distributor. When the processor determines that a distributor register should be reset, an enable signal is transmitted to one of the enable-verify pulsers in the reset control circuit 17RC shown in FIG. 17C. If central pulse distributor 0 is in control, the 0.5 microsecond enable pulse will be transmitted on conductor 1700RE causing a 2 microsecond signal to occur at the output of the enable-verify pulser 17EVP1. This output is returned over conductor 1700REV to the central pulse distributor verifying that the reset control has been enabled. The enable signal is also amplified by gates 1715, 1716, and 1717 and transmitted over conductors 17RESA, 17RESB, and 17RESC (in cables 17C1–17E1, 17D1–17E1 and 17E2) to reset the 17R– flip-flops in each of the output registers 170R0—170R5 and the 17EN– flip-flop in each of the enable control circuits 17EC0-—17EC5. Whenever the reset control circuit is enabled, flip-flop 170N is set releasing relay 17RON. Relay 17RRN, when operated, provided a distributor register off normal indication over conductor DRON (FIG. 17D) to the connected receiving circuit. Relay 17RON is operated and flip-flop 17ON reset when the highest numbered output register is enabled.

Although parity is checked on each normal operation of a distributor register, the distributor register also has the ability to check parity for diagnostic purposes. A diagnostic parity check is initiated by an enable pulse from the central pulse distributor. If it has been assumed that central pulse distributor 0 is in control, the enable pulse will be received over conductors 17OPE to enable-verify pulser 17EVPO. The enable-verify pulser 17EVPO returns a verification signal to the central pulse distributor in addition to providing a pulse for gating the information to the parity register 17PRO from a communication bus. During the diagnostic sequence, however, the information is received over the opposite communication pulser In the example being described, the information will be received over conductors 171AD00—171AD20 and the gating pulse from enable-verify pulser 17EVPO will be transmitted over conductors 17OEPA and 17OEPB to selectively trigger parity registers 170PR00 through 170PR20. Parity then will be checked by parity logic circuit 17PLO in FIG. 17A, as described above.

DETAILED DESCRIPTION OF OPERATION

In order for the reader to gain a full appreciation of our invention, a detailed description of the operation of the system will be now given.

THREE-DIGIT CALL

Let it be assumed that a telephone call requiring three-digit translation has been forwarded to the toll switching system illustrated in the drawing. Incoming trunk 301 at the toll switching system responds to a signal received over trunk conductors 300 and signals over conductors 302 to sender link SL in FIG. 5. Sender link SL is used for interconnecting the incoming trunks with the appropriate type sender for receiving digits as they are outpulsed from the distant office.

Figure 5:
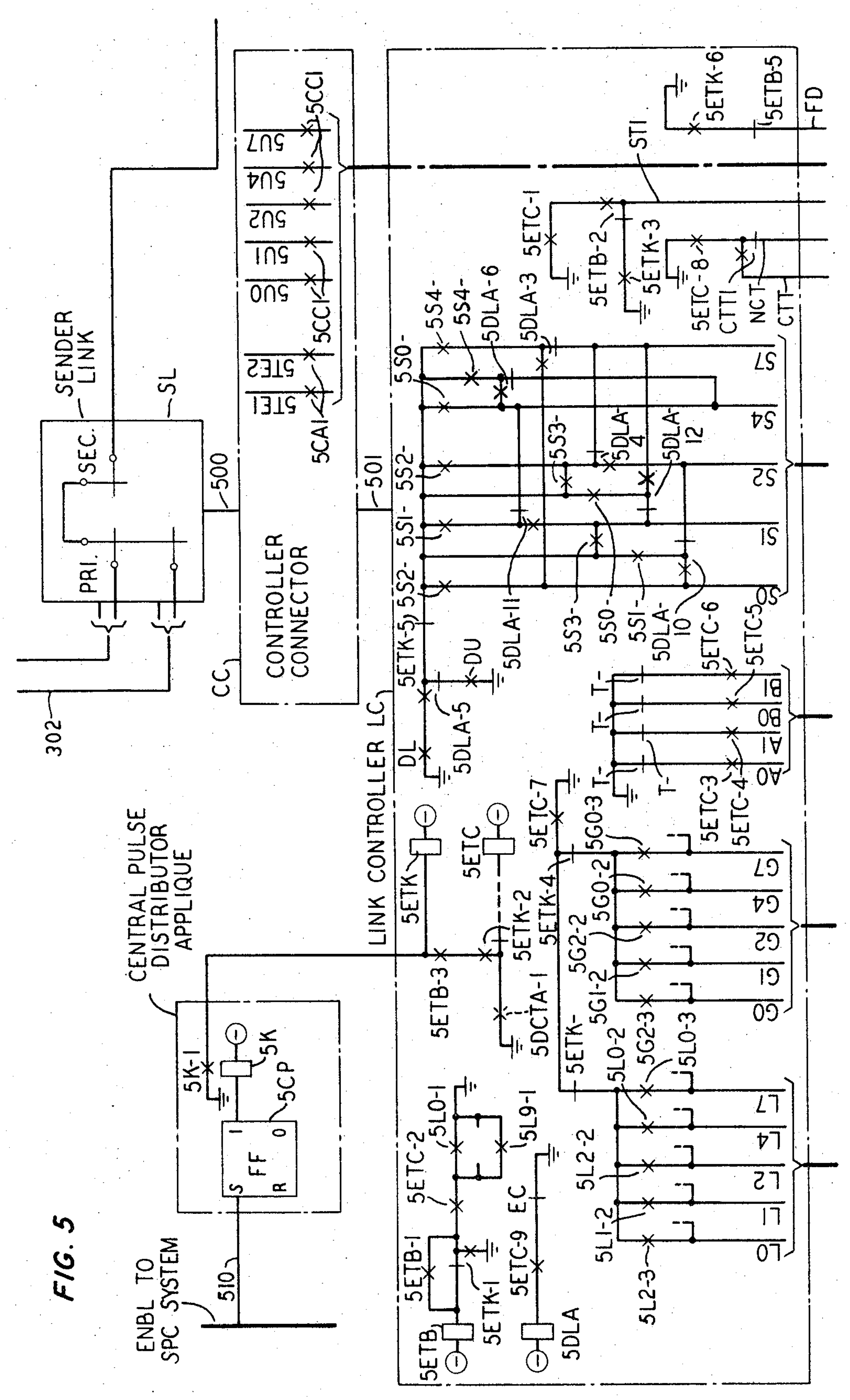
FIG. 5 shows a typical sender link and controller arrangement and part of the central pulse distributor applique as employed in the system.

Sender link SL signals over conductors 500 to select an idle controller connector CC which, in turn, signals over conductors 501 to seize an idle link controller LC. The link controllers, such as link controller LC, are used to control the establishment of connections between incoming trunks and senders on the sender link frame SL. The link controllers associated with a controller connector are arranged in a preference chain and when an associated sender link requires a link controller, the sender link energizes a start lead to the connector. A preference relay associated with the most preferred idle link controller is operated, resulting in the operation of a plurality of multicontact relays for extending conductors between the sender link frame and the selected link controller. While all multicontact relays in a relays connector have not been shown, the contacts of two of these relays, relays 5CA1 and 5CC1, are shown in FIG. 5 and these contacts extend seven conductors to ferrod sensors in the peripheral scanner circuit PS. It is over the 5TE– and 5U– conductors that the identity of the sender link frame within the link controller group is transmitted to the peripheral scanner and hence to the stored program control system.

The trunks on the sender link frame are arranged in groups and the link controller will recognize one of the groups having trunks in a calling condition and serve that group first. The link controller then identifies the trunks that are in a calling condition and blocks out all but one trunk. The links on the sender link frame are now tested to determine if idle links are available and if links are available, the link controller tests for an idle sender. Once an idle sender is located, a double test is performed to assure that no other link controller has preferred the same sender.

When the link controller progresses to the point of double test, relay 5DCTA (not shown) operates and closes its contacts 5DCTA–1 to complete a path for operating relay 5ETC in FIG. 5. The operation of relay 5ETC energizes another set of ferrods in the peripheral scanner to identify the trunk group, the secondary switch on the sender link frame, and the secondary switch level selected. More specifically, ground is extended through make contacts 5ETC–7, break contacts 5ETK–4, and a pair of make contacts of one of the 5G– relays and over the G- conductors to ferrods in the peripheral scanner PS. One of the 5G0—5G9 relays will be operated to transmit ground over two of the G- conductors to the peripheral scanner to transmit the trunk group information on a two out of five basis. The identity of the secondary switch on the sender link frame is transmitted over conductors A0, A1, B0 or B1 to the scanner and the identity of the level on the secondary switch is transmitted on a two out of five basis over conductors S0, S1, S2, S4, and S7. When relay 5ETC operates, one of the 5S0—5S4 relays operates indicating one of the five levels on the upper or lower half of the secondary switch of the sender link frame. Relay 5ETC also operates relay 5DLA through normal contacts of relay EC. If the link controller selected the lower half of the secondary switch, relay EC is normal and relay 5DLA operates, while if the upper half of the secondary switch is selected, relay EC would be operated preventing relay 6DLA from operating. Thus, the combination of one of the relays 5S– and relay 5DLA identifies one of the ten levels of the secondary switch on a two out of five basis.

The last information to be transmitted to the peripheral scanner is the trunk level information which is transmitted over leads L– on a two out of five basis. One of the relays operates when the link controller operates the select magnets on the primary switch of the sender link frame.

With the 5L– relay operated, sufficient information is available for the stored program control system to process the link controller portion of the call. Any one of the 5L–relays operated, extends ground through make contacts 5ETC–2, break contacts 5ETK–1, and through the winding of the electronic translator bid relay 5ETB, thereby operating relay 5ETB. Relay 5ETB closes its contacts 5ETB–2 to extend ground from make contacts 5ETC–1 over conductor ST1 to operate a bid ferrod in the peripheral scanner PS. In practice, the bid ferrods are generally provided in pairs with each bid ferrod of a pair appearing in a different scanner to guard against a service impairment should trouble arise in a scanner interrogate loop serving link controller bids.

Relay 5ETC also closes its contact 5ETC–8 to extend ground through normal contacts CTT1 and over conductor NCT to saturate a ferrod indicating that this is not a test call. On test calls, relay CTT1 would be operated to transmit a ground over conductor CTT, thus operating a different ferrod in the peripheral scanner.

As mentioned above, the processor in the stored program control system executes its various programs in an ordered sequence determined by an executive control program. The controller monitor program is executed periodically to determine if any link controllers are requesting the service of the stored program control system.

When an idle link controller's bid ferrod has changed state, the controller monitoring program recognizes this change by comparing the information read out of a row of bid ferrods in the peripheral scanner with information stored in a last-look memory. The controller monitor program then transfers control to the incoming trunk identification program. Using the locating of the bid ferrod, the processor consults the controller input table (FIG. 2A) which has one entry per bid ferrod, to ascertain the location of the link controller input information in the peripheral scanner. The controller input table also informs the processor how the input information is arranged (odd or even) in the scanner, the link controller's group number, and whether or not the controller is assigned for service.

The input information from the link controllers is contained in two rows of ferrods in the peripheral scanner with the trunk position information occupying only half a row which is shared with another link controller (all FIG. 2B). The processor uses the odd or even information obtained from the link controller input table to determine in which half row the trunk position of the link controller being served is found.

One of the first tasks the processor undertakes is to determine if this is a test call by examining the CTT and NCT ferrods. If it is a test call, control of the processor will be transferred to a controller test program. Since it has been assumed that the controller is handling a service call, ferrod NCT will be saturated.

Each link controller group can have up to 32 sender link frames associated with it. The sender link frame number is transmitted over the 5TE– and 5U– conductors to saturate ferrods in a three out of seven code where the 5TE1 and 5TE2 ferrods (not shown) represent the tens digit and the 5U0, 5U1, 5U2, 5U4, and 5U7 ferrods (not shown) represent the units digit.

From the link controller input table, the processor is directed to the controller group information table (FIG. 2A) which lists information for all controller groups. Using the group number, the processor indexes to the proper place in the table to ascertain the location of the sender link frame table, the location of the key frame table, and the key frame class. The processor then consults the sender link frame table (FIG. 2B) and indexes to the proper entry using the sender link frame number received from the peripheral scanner. The sender link frame table describes how the senders are arranged on the sender link frame. There is one sender link frame table for each controller group and one entry in each sender link frame table for each sender link frame in the group.

Each sender link frame can have up to 40 senders connected to it. The sender is identified in terms of its position input where the A0, A1, B0, and B1 inputs represent the secondary switch on which the sender appears and the S0, S1, S2, and S7 inputs identify the level on the switch to which the sender is connected.

Certain sender link frames in the system are designated "-key" frames and these sender link frames are the frames that have the senders connected directly to them. As other sender link frames are added to an expanding office, the sender link frames are multiplied to the key frames and assigned the number of the key frame. Thus, the key frame table (not shown) describes the assignment of senders to the key sender link frame. The appropriate entry for the key frame table for the sender being used on the call being described is a function of the key frame class and the key frame number and the sender position on the sender link frame.

Each sender link frame can have up to one hundred incoming trunks associated with it. The trunk position in the terms of its trunk group (G0—G9) and trunk level (L0—L9) is part of the information transmitted from the peripheral scanner to the processor via conductors G0, G1, G2, G4, G7 and L0, L1, L2, L4, L7. With this information, all the required data has been obtained to identify the incoming trunk and sender involved in the call. The sender's connector preference, the trunk's position on the sender link frame, the sender link frame number, and the link controller group number are then packed into the sender's memory location in the sender store (FIG. 2B) for subsequent use.

Having registered this information, the processor now addresses the central pulse distributor to send an electronic translator check (ETK) signal to the link controller so that the link controller may proceed to establish a connection on the sender link frame between the incoming trunk and the selected sender. By addressing a particular distribution point in the central pulse distributor, a signal is transmitted over conductor 510 to set flip-flop CP which operates relay 5K. Relay 5K closes its contacts 5K–1 to complete an obvious path for operating relay 5ETK in link controller LC. Relay 5ETK locks through contacts 5ETB–3 and its own contacts 5ETK–2 to ground at contacts 5DCTA–1. When relay 5ETK operates, it interrupts the operating path for relay 5ETC which releases, thus deenergizing the bid ferrod for this link controller. Sensing the removal of the bid signal, the processor is advised of the successful distribution of the ETK signal and resets the flip-flop CP in the central pulse distributor applique circuit.

It should be noted that if relay 5ETK operates when the controller has not bid for the processor, as indicated by relay 5ETB being normal, a ground is nevertheless extended over conductor ST1 to saturate the bid ferrod in the peripheral scanner. Ground is also extended through make contacts 5ETK–6, break contacts 5ETB–5 and over conductor FD to saturate a false distribution ferrod in the peripheral scanner. The processor recognizes the false distribution signal and attempts to send a reset signal to the link controller by resetting flip-flop CP in the central pulse distributor applique circuit to remove the false distribution signal.

Receipt of the ETK signal by the link controller causes the link controller to operate hold magnets on the primary and secondary switches of the sender link frame, thereby closing the crosspoints and interconnecting the incoming trunk with the sender.

The incoming trunk now returns a start dial signal to the calling office and the calling office begins outpulsing the called directory number. In the example being described, it has been assumed that sender SDR is connected to incoming trunk 301 and sender SDR receives the digital information in the form of multifrequency tones. The multifrequency tones are converted into direct-current signals by multifrequency receiver circuit MR in FIG. 6 and forwarded over conductors 600 to incoming steering circuit ISC. Steering circuit ISC receives the digits and stores them on the proper register relays in digit register DR. Digit register DR contains sets of registration relays for storing each of the digits received over the trunk buy only the contacts of register relays for digits A through F have been shown since there relays generally store the digits which are used for route translation.

When the sender registers sufficient digits for translation, it operates its associated sender preference relay SP (not shown) in decoder connector DC. The relays SP associated with the senders are arranged in a preferential chain so that the senders are served in a fixed sequence and no senders are served twice until the higher preferred senders have been served. The sender preference relay SP causes the sender connector relays SC and SC1 to operate to cut through a plurality of conductors from the sender to the connector. When a sender connector relay SC operates, it energizes a start lead to operate a decoder channel preference relay such as relay 6DP0 associated with the most preferred idle decoder channel. The details of the decoder connector circuitry have not been shown since the operation of connectors of this type is well known in the prior art and need not be reiterated herein for a full understanding of the invention.

Figure 12:
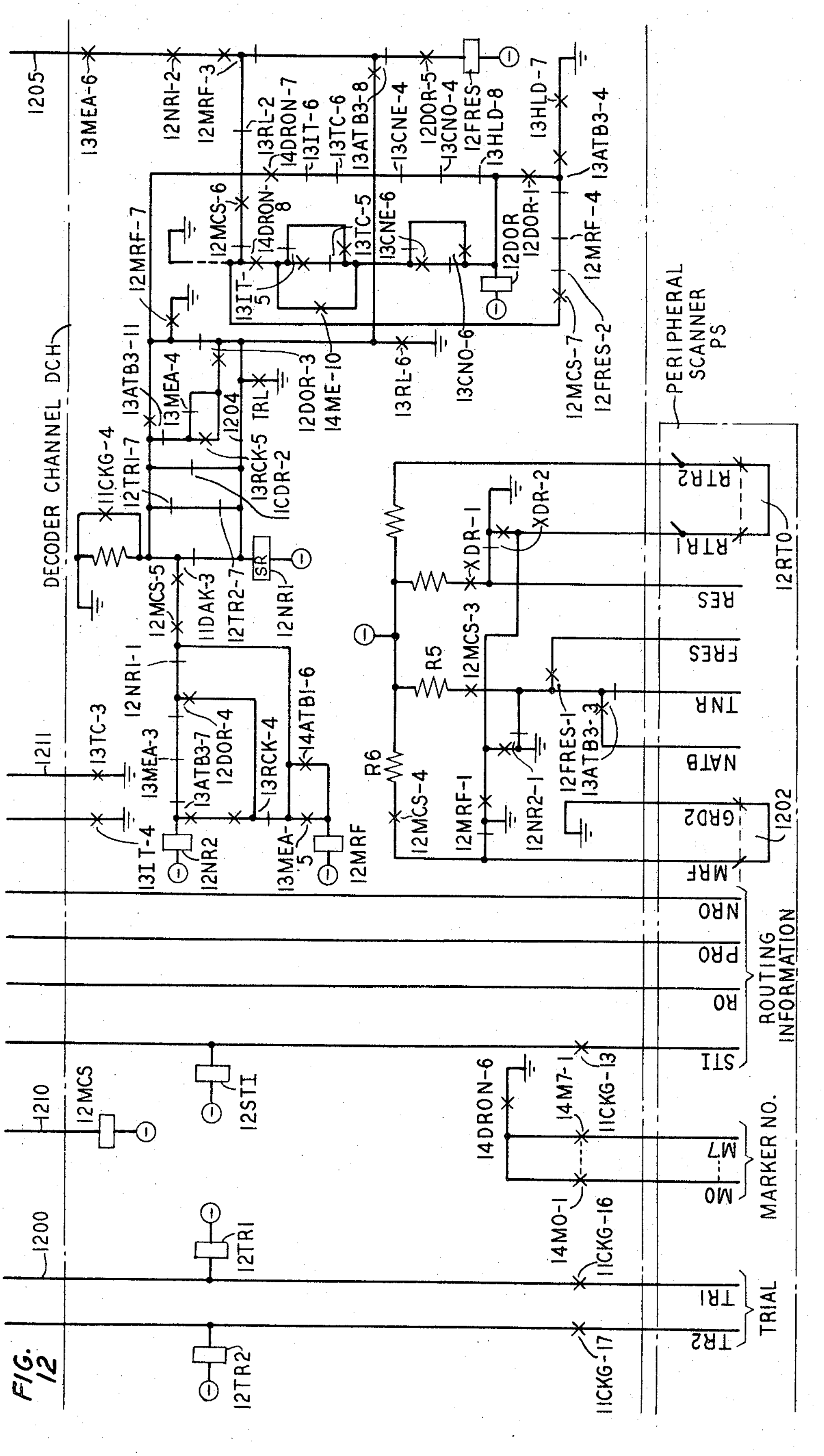

When the decoder channel preference relay 6DPO operates, it, in turn, operates a plurality of multicontact connector relays designated DC and DC1 to further extend the many leads from the sender through to the decoder channel that has been selected. Relay DC in closing its contacts DC-4 (FIG. 7) extends ground over conductor 1210 to FIG. 12 to operate relay 12MCS in the decoder channel.

The operation of relay 6DPO interrupts the ground on conductor 1100 to release the normally operated relay 11DA which provides a check of the decoder connector preference chain. Relay 6DPO also closes its contacts 6DPO-1 in FIG. 6 to extend ground from contacts SC-1 over conductor 1101 through break contacts 13R1–1, 13CB1–1, 13ATB–1, and through the winding of relay 11CKG to battery, thereby operating relay 11CKG. Relay 11CKG locks through its own contacts 11CKG–2 to the decoder connector and also operates its contacts 11CKG–1 to complete an obvious circuit for operating relay 11DAK.

Figure 11:
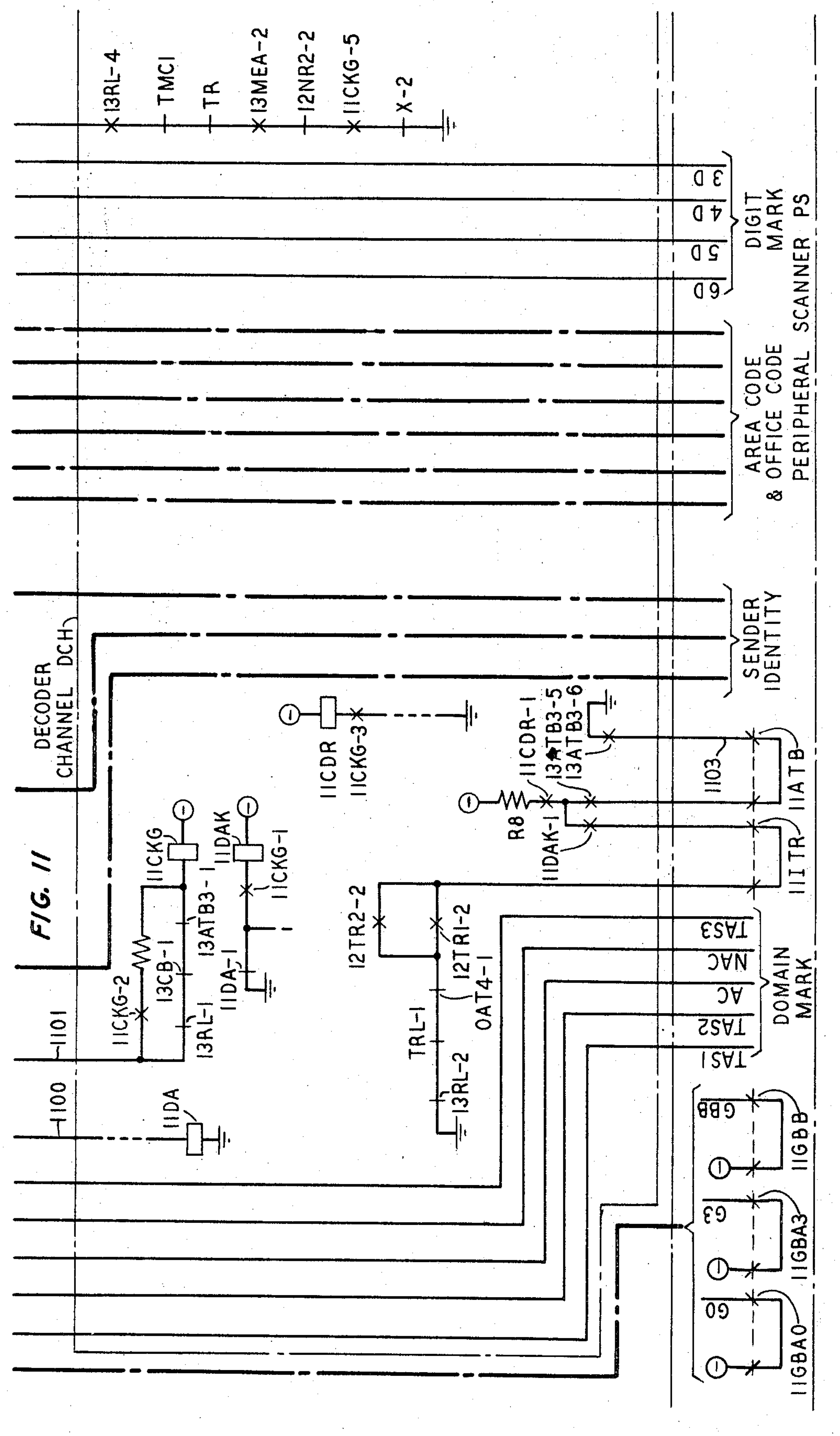
FIGS. 11—14 show part of a decoder channel.

Relay 11CKG also completes an obvious operating circuit in FIG. 11 for operating relay 11CDR. When relay 11CDR operates, it transfers distributor register output points in FIG. 13 from the false distribution check relay 13XDR to the registration relays 13CNE, 13CNO, 13HLD, et cetera.

Figure 13:
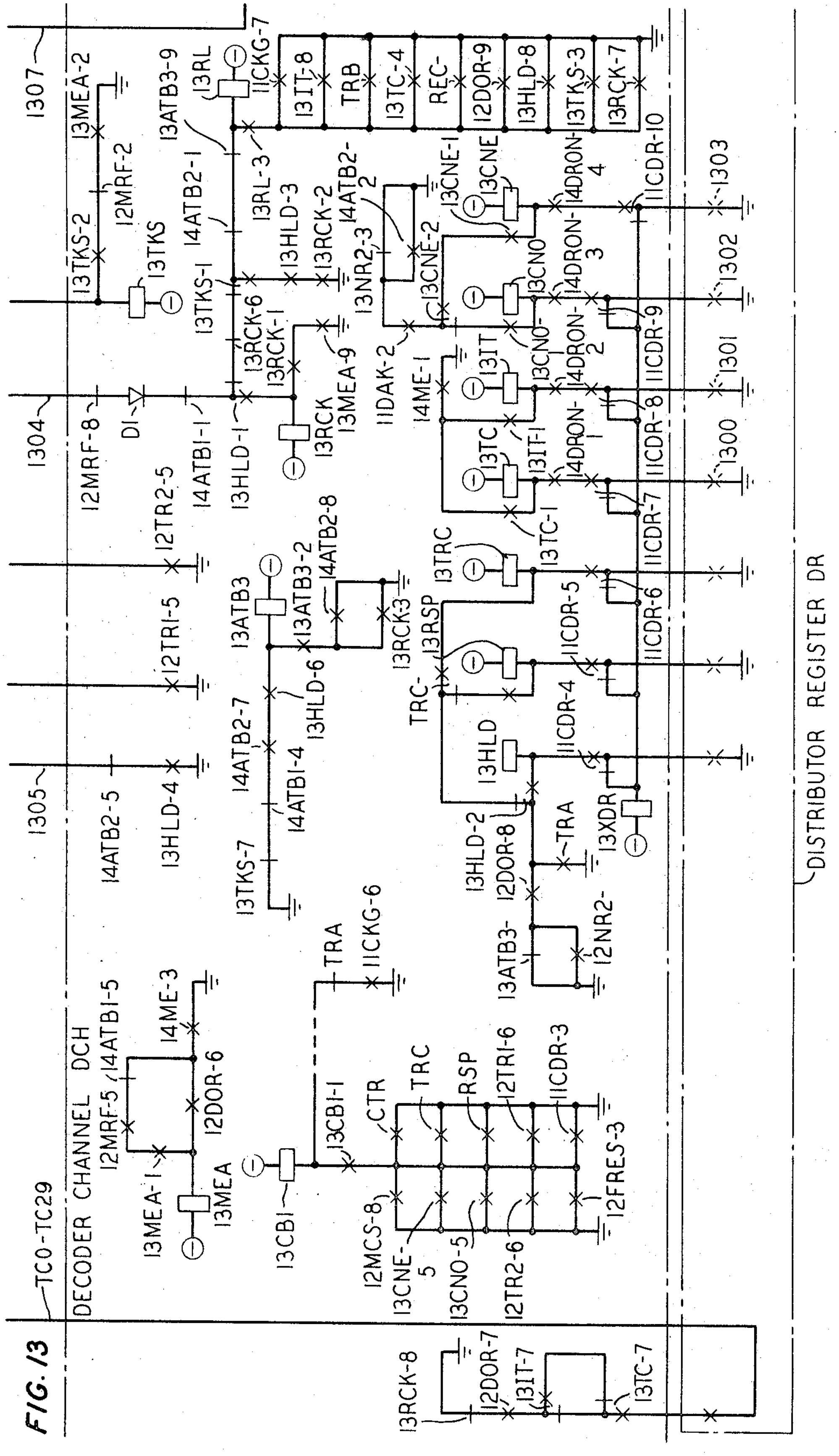

Relay 11CKG also closes its make contacts 11CKG6 in FIG. 13 to operate relay 13CB1. Relay 13CB1, in operating, makes the decoder channel busy to other senders and holds the decoder channel busy independent of the decoder connector until the channel has completely released.

Figure 7:
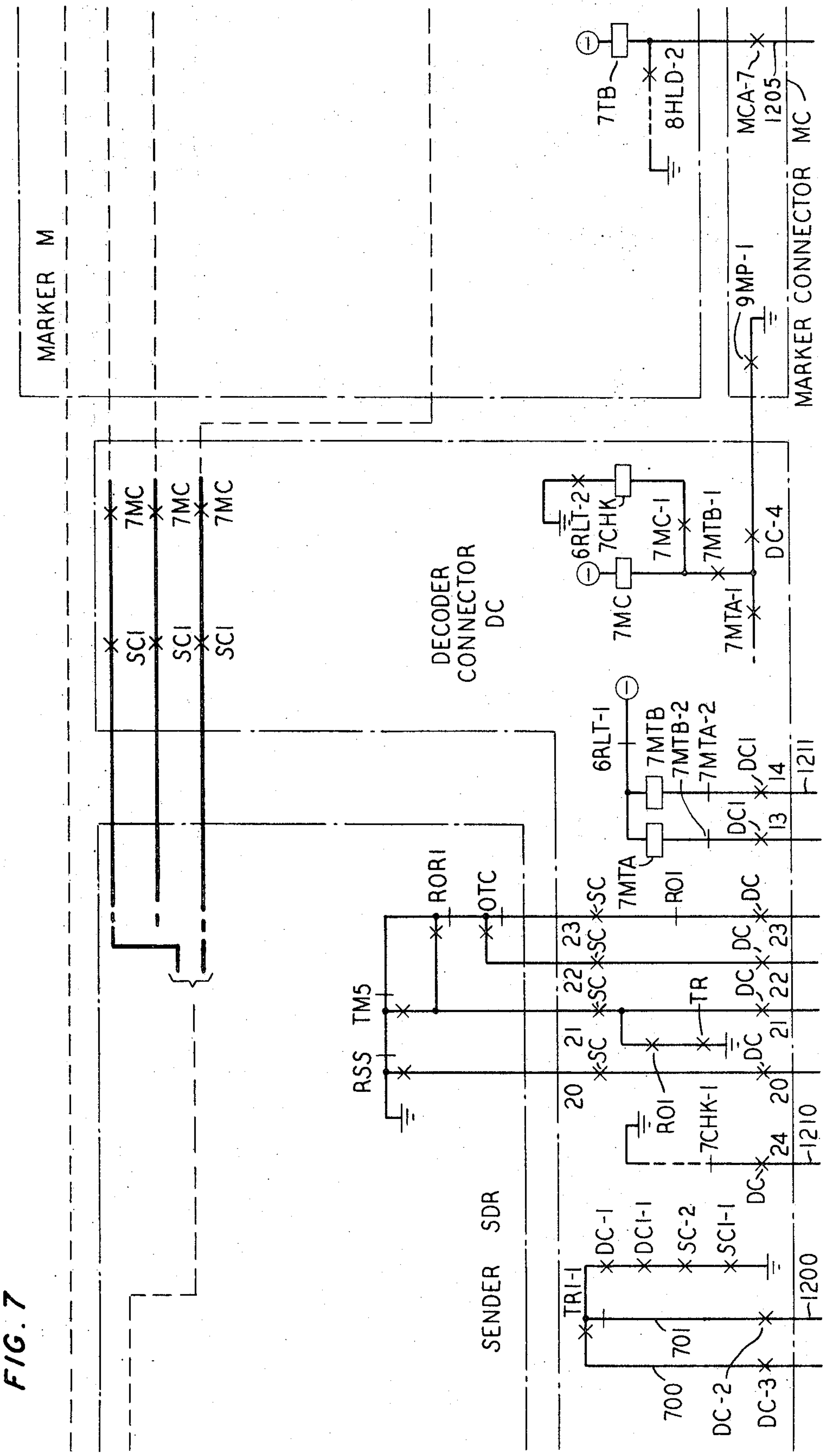

With all of the multicontact connector relays in the decoder connector operated, ground from contacts SC1–1 in FIG. 7 is extended through make contacts SC–2, DC1–1, DC–1 and through either the make or break set of contacts TR1–1 to conductor 700 or 701. Relay TR1 is normal on a first trail call and operated if the connector encounters trouble and makes a second attempt to complete the call. Assuming that this is the initial attempt for the call, the ground is extended over conductor 701 through make contacts DC–2 and over conductor 1200 to operate relay 12TR1 in the decoder channel. Relays 12TR1 and 12TR2 check that all decoder connector multicontact relays have operated. A request for route translation now can be presented to the stored program control systems.

Route translation requests are detected by the stored program control system through periodic scanning of decoder channel bid ferrods located in the peripheral scanner. An initial translation request is presented to this scanner when a bid ferrod such as 11ITR is saturated. The circuit for saturating ferrod 11ITR includes ground through break contacts 13RL–2, TRL–1, CAT4–1, make contacts 12TR1-2, the control windings of ferrod sensor 11ITR, make contacts 11DAK–1 and 11CDR–1, and battery.

Upon recognizing a saturated initial translation request ferrod, the processor consults a last-look table to determine if this is a new bid for service by a decoder channel. Having determined that this is a new bid for service, the processor consults the channel input table (FIG. 2B). By indexing according to the decoder channel bid, the processor reads out of the table the location in the peripheral scanner of the decoder channel input information. A diagram representing the decoder channel input information is shown in the right-hand portion of FIG. 2C. Control of the processor is now transferred to the code grouping program.

Figure 6:
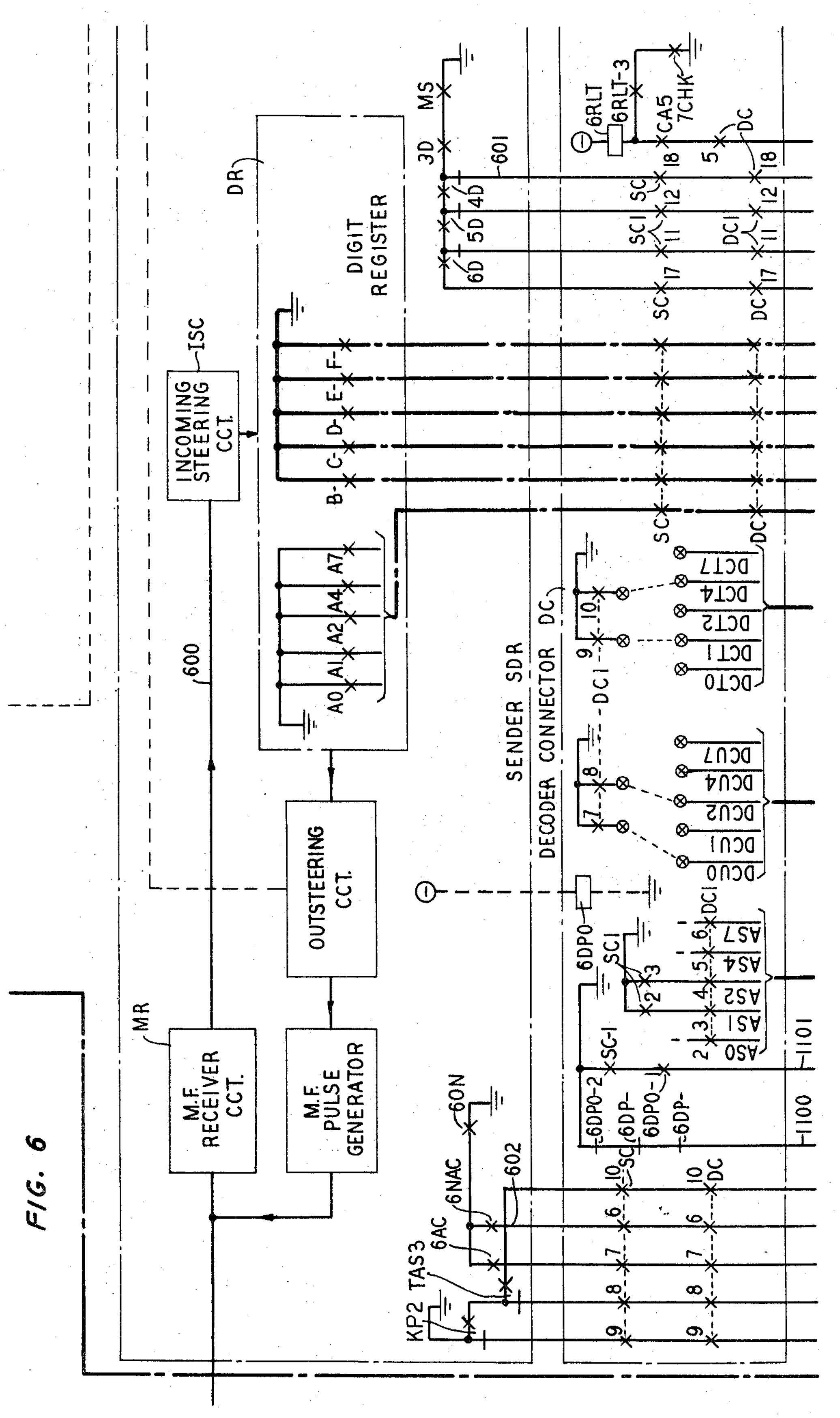
FIGS. 6 and 7 show part of a sender and decoder connector.

The code grouping program reads the first line of the decoder channel input in the peripheral scanner and determines if the call is a test call. Since it has been assumed that the call being described is a service call, the processor reads the second line of the decoder channel input to determine the sender identity in terms of the sender position in the decoder connector being used on the call. Each decoder connector is assigned a two-digit number and when the multicontact relay DC1 operates in the decoder connector, ground in FIG. 6 is extended over decoder connector tens conductors DCT0, DCT1, DCT2, DCT4, and DCT7 and decoder connector units conductors DCU0, DCU1, DCU2, DCU4, and DCU7 to transmit the decoder connector number to the peripheral scanner on a two out of five basis. The identity of the sender is transmitted to the peripheral scanner over conductors AS0, AS1, AS2, AS4, and AS7 on a two out of five basis when both decoder connector and sender connector multicontact relays DC1 and SC1 are operated. Using the decoder connector number and sender number, the processor consults the sender storage table to ascertain the identity of the incoming trunk that is connected to the sender, the sender's connector preference, and the location of the link controller group information table. It will be recalled that this information had been placed in the sender store during the link controller portion of the call.

By consulting the link controller group information table (FIG. 2A), the processor determines the location of the sender link frame table from which the location of the trunk group table can be ascertained. From the trunk group information table, the processor can determine the CAMA area of origin and screening class of the incoming trunk and the type of incoming trunk. The trunk group information table also informs the processor of the traffic separation class.

By utilizing the information temporarily stored in the sender store table during the link controller stage of this call and information from the decoder channel input, the processor has identified the incoming trunk and its characteristics and is ready to proceed with route translation.

The sender also transmits to the stored program control system via the peripheral scanner routing information by saturating a ferrod associated with one of the conductors PRO, STI, RO, and NRO.

If the sender saturates a ferrod associated with conductor RO, this indicates to the processor that the call should be routed to a reorder trunk. When the ferrod associated with conductor PRO is saturated, the incoming trunk will be set up to an announcement trunk indicating a sender overload. On the other hand, a ground on conductor STI causes the processor to record the stored information on a trouble record; while saturating the ferrod associated with conductor NRO tells the processor that normal route translation is required. On calls in which the toll charging is computed by centralized automatic message accounting (CAMA) other routing information may be transmitted to the processor from the sender.

As shown in FIGS. 6 and 11 the sender transmits an indication over one of the conductors 3D, 4D, 5D, and 6D to saturate an associated ferrod in the peripheral scanner, thereby indicating the digits in the sender which are available for translation. In the example being described, relay 3D is operated in the sender extending ground over conductor 601 through the decoder connector and over conductor 3D to saturate the corresponding ferrod (not shown) and the peripheral scanner.

The code grouping program now determines the domain mark and the ABC digits received from the decoder channel and stores them in the temporary store (FIG. 2E) associated with the decoder channel. In the case of a three-digit call, ground in FIG. 6 is extended from make contacts 6ON through break contacts 6RCF, make contacts 6NAC in sender SDR over conductor 602 and through contacts SC-6 and DC-6 of the decoder connector over conductor NAC to the peripheral scanner to saturate a corresponding domain mark ferrod therein.

The NAC ferrod (not shown) indicates to the processor that the ABC digits are not area code digits but digits representing an office code. The sender has the capability of transmitting different domain marks to the stored program control system to permit the dialed digits to be treated differently. For example, if the sender received an overseas call, a ferrod associated with conductors TAS1 or TAS2 would be saturated to indicate an overseas call destined for a local office homing on this toll center or a call to be switched through to a toll center in another country. Similarly, ground on conductor AC from the sender indicates that the ABC digits should be treated as an area code instead of an office code while ground on conductor TAS3 saturates a ferrod to inform the processor that the call is destined for an overseas operator in another country.

In a similar manner the A through F digits are transmitted from the sender to the peripheral scanner and with the NAC domain mark the ABC digits are entered into the called office section of the temporary store (FIG. 2E) associated with the decoder channel.

The processor now consults the domain mark table (FIG. 2C) to ascertain the location of the primary instruction table (FIG. 2C) for the NAC domain mark and, at the same time, a check is made to determine if this is a valid domain mark. From the primary instruction table the processor ascertains whether incoming trunk screening is required and whether a six-digit translation is required.

Each valid domain mark has a primary instruction table associated therewith and each primary instruction table is one thousand entries long providing entries for all combinations of the first three digits received by the sender over the incoming trunk. The primary instruction table provides four different types of outputs which are classified as (1) code group words, (2) code group-screening words, (3) grid primary instructions, and (4) list primary instructions.

The code group words are specified for three-digit codes which do not require six-digit translation or trunk screening. From the code group word the route index is obtained and the route index identifies the first route of the routing pattern. If the output of the primary instruction table is a code group-screening word, this indicates to the processor that the incoming trunk's screening class is necessary to complete the route translation. The grid primary instruction and the list primary instruction will be described in more detail below.

Assuming that the route index is obtained by the processor either with or without trunk class screening, control of the processor is now transferred to the call-routing program. Using the route index the call-routing program interrogates the route pattern table (FIG. 2D) and determines the traffic separation and peg count information.

The processor also obtains the trunk group table index from the route pattern table and interrogates the trunk group table (FIG. 2E) using this index. The trunk group table provides information common to the trunk groups selected for this call. From the entry in the trunk group table the processor determines the location of trunk group-busy ferrods in the peripheral scanner which are associated with the selected trunk group. The call-routing program then directs the peripheral scanner to address these ferrods in order that a trunk group having an idle trunk may be found.

Figure 4:
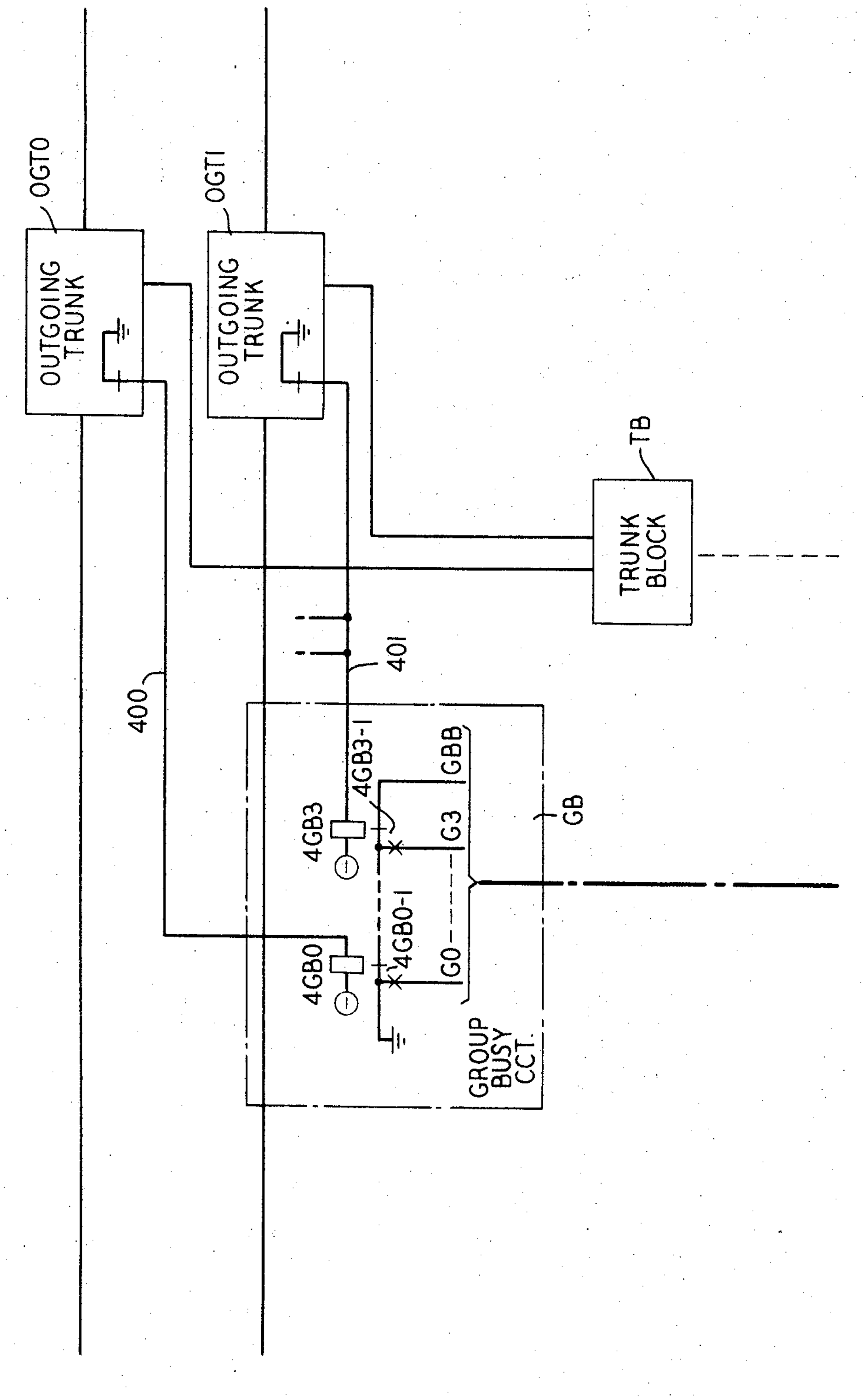

In FIG. 4 it can be seen that outgoing trunks OGTO and OGT1 are connected over conductors 400 and 401 to the group-busy relays 4GB0 and 4GB3, respectively. When any trunk in a subgroup, such as trunk OGT0 in subgroup 0 is idle, ground is extended to the group-busy circuit GB to operate a corresponding group-busy relay therein. Thus, a group-busy relay remains operated until all trunks connected thereto are busy. With a group-busy relay operated, ground is transmitted over conductor GO to FIG. 11 to saturate ferrod 11GBA0, thereby informing the processor that there is at least one idle trunk in the subgroup being scanned. If all trunks and all subgroups are busy, relays 4GB0—4GB3 will be operated transmitting ground over conductor GBB to saturate ferrod 11GBB. Under these circumstances, control will be transferred to a traffic register count control program which accumulates the appropriate traffic register's identity to be used after the marker disposes of the call. After the traffic register data has been stored, control will be transferred back to the call-routing program which will cause the routing pattern table to be interrogated in order that a new route index might be determined.

When an idle trunk is found either in the first group tested or in subsequent groups, the processor determines the routing information, such as code conversion, if required, and packs this information into the decoder channel temporary store.

Figure 14:
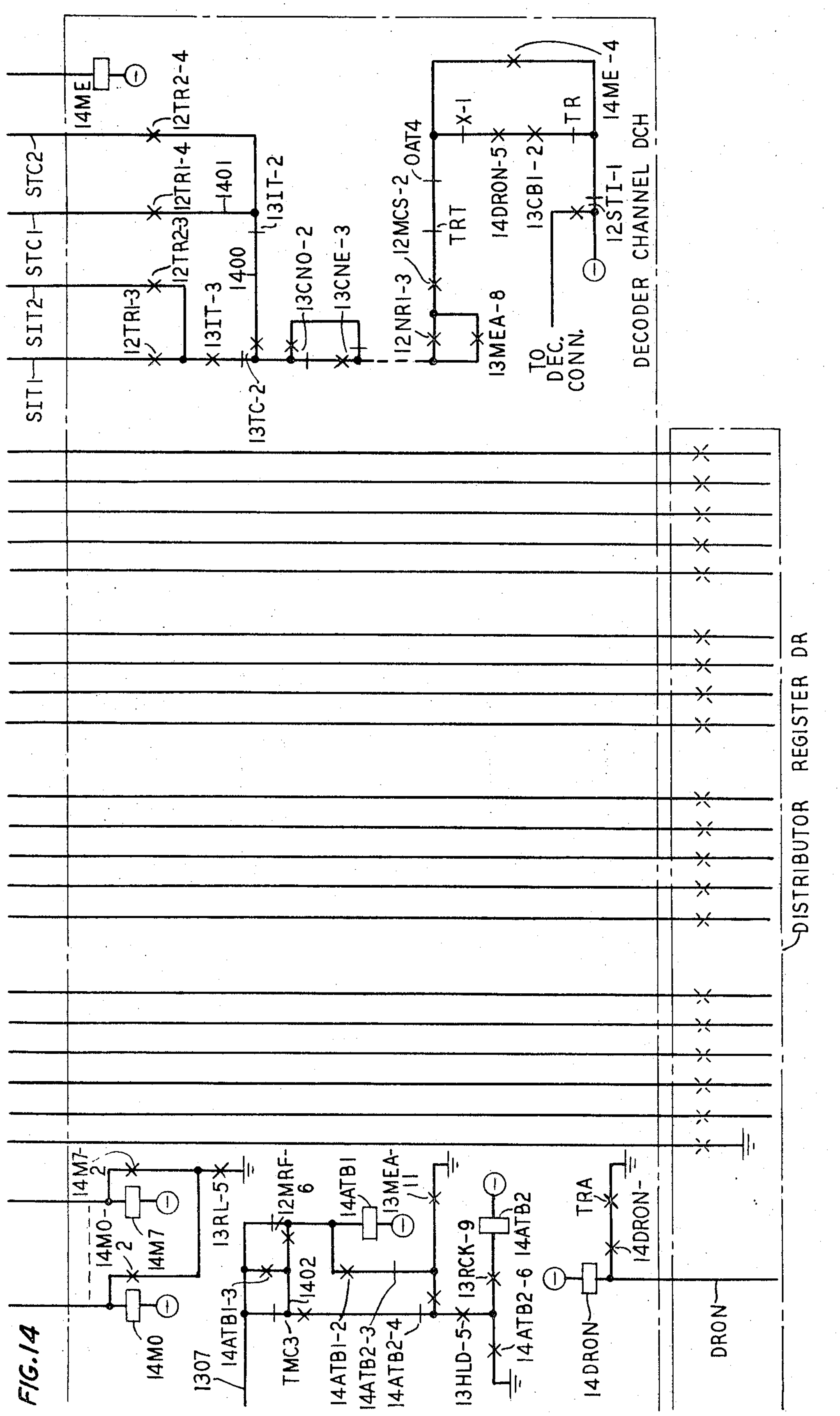

The processor now begins the task of unloading information from the trunk group table and the decoder channel temporary store and transmits the information over the peripheral unit address bus. At the same time, the processor addresses the central pulse distributor causing enable pulses to be transmitted to the distributor register associated with the decoder channel being used on this call. When the distributor register is set, ground potential is connected to various distribution points as shown in FIGS. 13 and 14. Some of these distribution points connect directly to the decoder channel while others are connected to the marker connector and will be extended to the marker when the decoder channel seizes an idle marker.

As part of the information distributed to the decoder channel, ground is transmitted from distribution points 1300 or 1301 in preparation for operating relay 13TC or 13IT in the decoder channel to tell the decoder channel to seize a toll-completing marker or an intertoll marker. Also, ground is transmitted from distribution points 1302 or 1303 in preparation for operating relay 13CN0 or 13CNE in the decoder channel to indicate an odd or even trunk block connector preference when the marker selects a trunk block in preparation for selecting an idle trunk. For illustrative purposes, it will be assumed that distribution points 1300 and 1302 are actuated and relays 13TC and 13CN0 will subsequently be operated in the decoder channel for this call.

After the stored program control system has distributed information to the distributor register, a signal is transmitted from the distributor register over conductor DRON to operate distributor register off normal relay 14DRON in the decoder channel. When relay 14DRON operates, it closes its make contacts 1 and 3 in FIG. 13 to complete the operating circuits for relays 13TC and 13CNO. Relay 13CNO locks over a circuit including its contacts 13CNO–1, normal contacts 13CNE–2, operated contacts 11DAK–2, and break contacts 13NR2–1 to ground. Relay 13TC, in operating, closes its make contacts 13TC–3 (FIG. 12) to extend ground over conductor 1211, through make contacts DC1–14, and 7MTA–2 and through the winding of relay 7MTB to operate relay 7MTB in the decoder connector.

Figure 9:
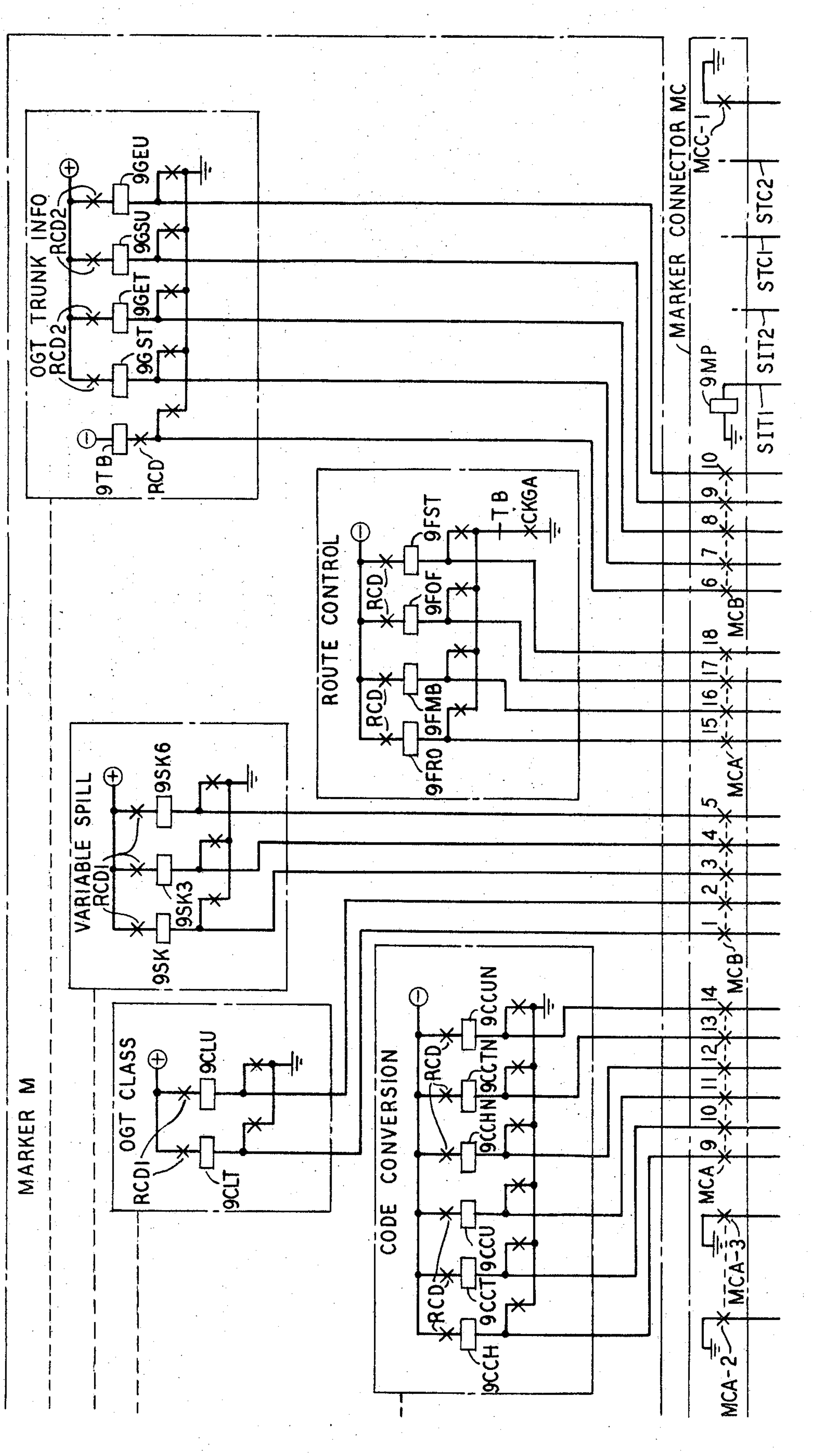
Figure 10:
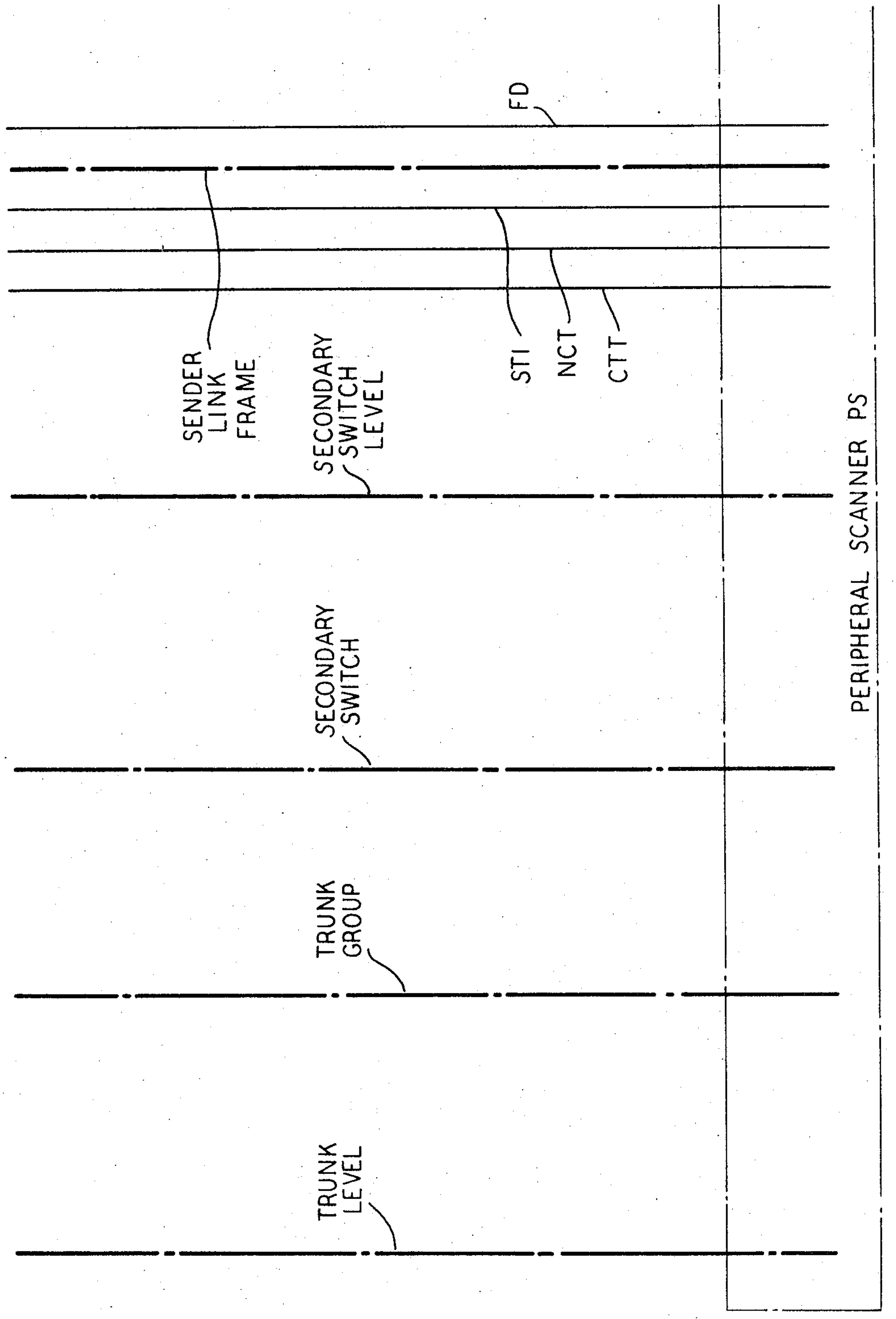
FIG. 10 shows the interconnection of the link controller with the peripheral scanner.

The decoder channel is now ready to make marker selection. To select a marker, battery is applied over a start lead to a marker preference relay chain in the marker connector. In the example being described, it has been assumed that a toll-completing marker will be selected and that this is a first trial call. A typical start lead circuit is shown in FIGS. 9 and 14, and includes battery through break contacts 12STI–1, and TR, make contacts 13CB1–2, make contacts 14DRON–5, break contacts X–1, OAT4 and TRT, make contacts 12MCS–2 and 12NR1–1, break contacts 13CNE3, make contacts 13CNO–2, 13TC–2, conductor 1400, break contacts 13IT–2, conductor 1401, make contacts 12TR1–4, and conductor STC1 to FIG. 9, and through contacts of the preference chain relays to the winding of relay 9MP in the marker connector. Relay 9MP is associated with a toll-completing marker and if the marker is idle, relay 9MP will operate. If an intertoll marker is to be selected or the call is a second trial call, the battery would be extended over one of the conductors SIT1, SIT2 or STC2 to operate another MP relay (not shown). When relay 9MP operates, it operates multicontact relays MCA, MCB, and MCC to extend a plurality of conductors from the decoder channel and its associated distributor register to the selected marker.

Relay 9MP also closes its contacts 9MP-1 in FIG. 7 to extend ground through contacts DC–4 in the decoder connector through contacts 7MTB–1 and through the winding of relay 7MC to battery, thereby operating relay 7MC. When multicontact relay 7MC operates, it interconnects the sender with the selected marker so that routing information in the marker can be transmitted to the sender and the decoder channel can release from the call.

With the marker connector multicontact relays operated, the distributor register points that were actuated in the distributor register extend their grounds over corresponding conductors to operate various registration relays in the marker. For example, if the office code received by the sender is to be converted into a different code for outpulsing certain code conversion, hundreds, tens, and units, relays 9CCH, 9CCT, and 9CCU relays would be operated to transmit the code to be outpulsed to the sender on a two-out-of-five basis. On the other hand, if no code conversion digits are required, relays 9CCHN, 9CCTN, and 9CCUN would be operated by the distributor register.

In addition, route control information is also transmitted to the marker from the distributor register as shown in FIGS. 9 and 14. One of the routing control relays shown in FIG. 9 will be operated to control the disposition of the call should the marker be unable to complete the call to a trunk in the selected route. If relay 9FRO is operated, this is translated as a follow-with-reorder indication and the marker is instructed to route the call to a reorder trunk. Relay 9FMB indicates that the marker should follow-with-make-busy and relay 9FOF instructs the marker to follow-with-overflow. If relay 9FST operates and the marker is unable to complete the call on a first trial, the marker will initiate a second trial.

By distributing variable spill information to the marker, the stored program control system can further control the number of digits to be outpulsed by the sender. For example, if relay 9SK3 or 9SK6 is operated, the sender will delete the first three or the first six digits, respectively, and outpulse the remaining digits that were received in the sender. In no digits are to be deleted, the no-skip relay 9SK would be operated.

The distributor register also transmits the class of the outgoing trunk group to the marker by selectively operating relays 9CLT– and 9CLU–.

When marker connector relay MCA operates, it also completes a path from ground at contacts 12TR1–5 in FIG. 13 and through the winding of relay 8TR1 in the marker to battery to operate a relay 8TR1. This indicates to the marker that the call is a first trial call.

In order for the marker to make a trunk selection, it must have the number of the trunk block through which the outgoing trunks can be tested and the position of the trunks in the trunk block. The trunk block connector selected for this call is indicated to the marker by operating one of the 8TC0—8T29 relays over the TCO—TC29 leads from the distributor register. Relays 8RCD, 8RCD1, and 8RCD2 also operate to supply battery to the marker registration relays. Each trunk block connector is provided with an odd and even connector. The marker can seize the trunk block connector through either connector, depending upon whether the 13CNO or 13CNE relay is operated. As described above, relay 13CNO has been operated by the stored program control system.

The trunk block has a capacity for four hundred trunks which are divided into ten groups of forty trunks each. The selected trunk group is identified by the operation of one of the trunk block relays 9TB– in the marker. Since each trunk group in the trunk block may contain outgoing trunks to different locations, the trunks selected for this call are further defined by designating the first and last trunk in the series. This information is distributed to the marker by the distributor register by selectively operating group start tens and units relays 9GST– and 9GSU– and the group and tens and units relays 9GET– and 9GEU–.

The marker now checks the receipt of the information from the distributor register and decoder channel. If sufficient information has been distributed to process the call, the marker operates its registration check relay RCKA (not shown). Relay RCKA in operating closes its contacts RCKA–1 in FIG. 8 to extend ground over conductor 800 through make contacts MCA–1 and over conductor 1304 to FIG. 13 through break contacts MRF through diode D1 and break contacts 14ATB1–1 through break contacts 13HLD–1, 13RCK–2, 13TKS–1, 14ATB2–1 and 13ATB3–9 and through the winding of relay 13RL to battery. Relay 13RL operates and locks through its own contacts 13RL–3 to ground on make contacts 13TC–4. The operation of relay 13RL begins the release of the decoder channel by deactivating the initial translation request ferrod 11ITR in FIG. 11 and by operating relay 6RLT in the decoder connector. The operating circuit for relay 6RLT includes battery, the winding of relay 6RLT, make contacts CA5, DC–1, and 13RL–4, break contacts TMC1 and TR, make contacts 13MEA–2, break contact 11CKG–4 and break contact X–2 connected to ground.

When the marker was initially selected by the decoder channel, marker connector relay MCA operated its contacts MCA–2 and MCA–3 in FIG. 9 to operate two-out-of-five relays 14MO and 14M7 in the decoder channel indicating the number of the marker selected on the call. The marker identity relays are not locked operated, however, until relay 13RL operates since under certain circumstances the marker may be changed during the progress of the call. Each of the marker identity relays is associated with a ferrod in the peripheral scanner and the identity of the marker used on a call is transmitted to the peripheral scanner over conductors M0—M7 in FIG. 12 on a two-out-of-five basis.

The stored program control system detects the change of state in the initial translation request ferrod 11ITR during the next execution of the decoder channel monitor program and finding this decoder channel "served" transfers control to the traffic register peg count program. The traffic register peg count program consults the decoder channel temporary store and retrieves the register hopper numbers for those trunk groups that have been tested busy and the last trunk group address. This information is put into a section of the marker temporary store table (FIG. 2D) corresponding to the marker identified by the M0 and M7 ferrods and the marker scan waiting (MSW) bit in this table is set to show that the marker is waiting to be scanned. Control is now returned to the decoder monitor program which causes an enable pulse to be transmitted to the reset control circuit in the distributor register. The reset control circuit resets all of the flip-flops in the output registers of the distributor register, thereby releasing the corresponding relays which apply ground to the various distribution points connected to the marker and the decoder channel.

When relay 6RLT operates in the decoder connector, it opens its break contacts 6RLT–1 to interrupt the operating circuit for relay 7MTB which releases. Relay 7MTB in releasing opens the operating circuit for decoder connector relay 7MC but relay 7MC is now held operated through a locking circuit including its own contacts 7MC-1, the winding of relay 7CHK, and contacts 6RLT–2. Relay 7CHK operates at this time.

Relay 7CHK, in operating, causes the decoder preference relay 6DPO to release to begin the release of the decoder channel by opening the operating path of relay 11CKG. Preference relay 6DPO, in releasing, causes decoder connector relays DC and DC1 to release, thereby deactivating all the input ferrods to the peripheral scanner and releasing relay 12TR1 in the decoder channel.

Relay 7CHK also opened its break contacts 7CHK–1 in FIG. 7 to open the operating path for decoder channel relay 12MCS. Relay 12MCS releases and opens its make contacts 12MCS–2 to interrupt the start lead STC1 in FIG. 14 to the marker connector. With the start lead interrupted, marker preference relay 9MP releases, thereby releasing the multicontact connector relays MCA, MCB, and MCC. When relay MCC releases, it releases relay 14ME, thereby opening the locking circuit for relay 13TC which also releases.

Relay 11CKG, in releasing, opens the operating circuit for relay 11DAK which releases. Relay 11DAK causes relay 13CNO to release.

The decoder channel is normally held busy by the operated relay 13CB1 which, in turn, causes make-busy relays to be held operated in each decoder connector so that the decoder channel tests busy to all senders. Relay 13CB1 will stay locked operated until (1) relay 12TR1 or 12TR2 has released indicating that the decoder connector multicontact relays have released, (2) the distributor register output has been transferred to relay 13XDR as indicated by the release of registration relays 13CNO and 13CNE, and (3) relay 12MCS has released to start the release of the marker connector.

The decoder monitor program also sets the decoder channel's state to "idle" in the decoder channel temporary store after sending the enable code to reset the distributor register as described above.

The marker now proceeds to seize the trunk block in order to attempt to select an idle trunk in the appropriate trunk group. When an idle trunk has been selected, the marker identifies the outgoing link on which the selected outgoing trunk appears and also the incoming link on which the incoming trunk is terminated. When both incoming and outgoing links have been identified, the marker can seize these links and select an idle channel for interconnecting the two trunks.

Some of the information which the marker received from the distributor register is utilized to control the sender. After the marker makes various checks on the channel between the incoming and outgoing trunks, the marker relinquishes control of the call to the sender, transfers the data to the sender, and releases. Thereafter, the sender outpulses the called office information to the next toll switching center.

Periodically the processor scans ferrods associated with the marker. These ferrods show the disposition of the last trunk group presented to the marker. Each time the marker is scanned, the information stored on the marker ferrods is compared with the previous scan as registered in the marker scan table (not shown). If a marker's input has changed, the processor interrogates the appropriate marker temporary store (FIG. 2D) to retrieve data about the call. Using the last trunk group table address stored in the marker temporary store, the processor goes to the trunk group table (FIG. 2E) to obtain the traffic register index. From the traffic register index, the processor determines the peg count and overflow register locations associated with the last trunk group. The program increments the registers associated with the call. The marker indicates that an idle trunk was found and selected (MTKS), all trunks were busy (MATB) or a trouble has occurred (MTBC). If a trouble has occurred no registers are incremented. On the other hand, if an MATB signal is received from the marker the peg count and overflow registers are incremented for all trunk groups tested. Otherwise, upon receipt of an MTKS signal the program increments the peg count register associated with the last trunk group and both the peg count and overflow registers for all other trunk groups tested.

For other calls, such as hold routing calls, the program receives the TKS signal from the marker before the decoder channel has released. In this case the TKS bit in the marker temporary store is set. When the marker does release, the program uses the register data to increment the appropriate peg count and overflow registers.

SIX-DIGIT CALL

A call requiring six-digit translation is processed substantially the same as a three-digit call up to the determination of the domain mark during the execution of the code-grouping program. For a six-digit translation, it will be assumed that the domain mark AC is transmitted from the sender by the peripheral scanner to the stored program control system. The code-grouping program uses the domain mark to interrogate the domain mark table to obtain the location of the primary instruction table for this domain mark. From the primary instruction table, the processor is directed to a grid area table or a list area table corresponding to the area represented by the A, B, and C digits received by the sender.

If the grid method of translation is used, the code-grouping program interrogates the grid area table (not shown) associated with the area code dialed. From this table, the processor determines the grid table (FIG. 2C) and the location of the code group table associated with the area code.

The grid table is one thousand entries long to accommodate all combinations of office codes possible using the D, E, and F digits. Since the width of a grid table is less than the full width of the available memory, several grid tables may share the same address location and still be distinguishable by their relative bit locations.

The program now causes the processor to interrogate the grid table and by using the D, E, and F digits, which represent the office code of the destination office, the processor is directed to the proper entry in the grid table and the code group index is ascertained. Using the code group index, the processor is directed to the proper address in the code group table. Control of the processor is now transferred to the call-routing program and the processing of the call proceeds as described above with respect to a three-digit call.

If the match-list technique of six-digit translation is used, the processor under control of the code-grouping program is directed to the list area table (not shown) by the information obtained from the primary instruction table. From the list area table the locations of the match-list (FIG. 2D) and the code group tables associated with this area are ascertained.

The match-list table for a given area has an entry for each office code in that area. The processor must then hunt through the table comparing the D, E, and F digits received by the sender with each entry in the table until a match is found. When a match is found, the processor reads out of that memory location the code group index and the call proceeds as described above.

HOLD ROUTING

In the prior description it was assumed that the stored program control system would select a subgroup of trunks in the appropriate route after determining that the subgroup selected had at least one idle trunk. This was accomplished by directing the peripheral scanner to interrogate ferrods associated with group-busy relays connected to the subgroups of trunks. The stored program control system then selected a subgroup of trunks having an idle trunk and distributed the proper information to the decoder channel and marker. When the marker received this information, it transmitted a registration check signal to the decoder channel and the decoder channel was permitted to release to serve other calls. When the marker attempts to select an idle trunk using the trunk block and connector, the marker may nevertheless find all trunks busy. This is possible because other markers may have seized all idle trunks in the subgroup selected during the interval between when the stored program control system and the marker test for an idle trunk. The marker will then request a second trial or route the call to an announcement trunk. Under these circumstances, the outpulsing instructions from the distributor register will be disregarded.

If the trunk group is not equipped with group-busy relays, the stored program control system cannot determine the busy-idle condition of the trunks. The marker than is required to sequentially test each trunk subgroup until an idle trunk is found.

It will be recalled from the prior description that during the execution of the call routing program, the processor interrogates the trunk group table to ascertain the location of the trunk group and the scanner location of the group-busy ferrods associated with the trunk group. Since it has been assumed that there are no group-busy relays associated with the trunk group being used on this call, the processor determines that the group-busy ferrod information is not available and goes to the route pattern table. From the route pattern table the processor determines the routing instruction which, in this case, is a "hold routing" instruction. The processor then stores in the decoder channel temporary store the last trunk group table address, the last route pattern entry address, and the trunk subgroup to which the marker is to attempt to establish a connection. The processor also enters in the "next sub" portion of the decoder channel temporary store an indication of the next subgroup of trunks to be tested in the event that the marker does not find an idle trunk in the first subgroup. The processor makes an entry in the last line of the decoder channel temporary store to indicate the channel state which, in the example being described, is referred to as "initial hold routing."

The processor is now ready to distribute directive information to the decoder channel and marker by way of the distributor register circuit. The nature of the information distributed is similar to that described above and also includes a hold-routing indication to inform the decoder channel not to release the marker should the marker encounter an all-trunk-busy condition. The hold-routing indication is transmitted to the decoder channel by the operation of relay 13HLD in FIG. 13.

The decoder channel proceeds as before and selects an idle marker. Upon the operation of the marker connector, the information from the distributor register is forwarded to the marker and registered therein. The decoder channel also forwards the hold-routing instruction to the marker by operating relay 8HLD in the marker. This relay is operated over a circuit including a battery through contacts 8RCD-1, the winding of relay 8HLD, contacts MCA-4, conductor 1305, break contacts 14ATB2-5 and make contacts 13HLD–4 to ground. When the information has been registered in the marker, the marker operates a registration check relay RCKA transmitting a ground over the previously traced circuit to conductor 1304 in FIG. 13 through break contacts MRF, diode D1, break contacts 14ATB–1, through operated contacts 13HLD–1 and through the winding of decoder channel relay 13RCK to battery. Relay 13RCK operates and locks through its own contacts 13RCK–1 and contacts 13MEA–1. Relay 13RCK also opens its break contacts 13RCK–2 in FIG. 13 to prevent relay 13RL from operating at this time, and it will be recalled that when relay 13RL operates, this begins the release of the decoder channel. The decoder channel now waits further action by the marker.

Figure 8:
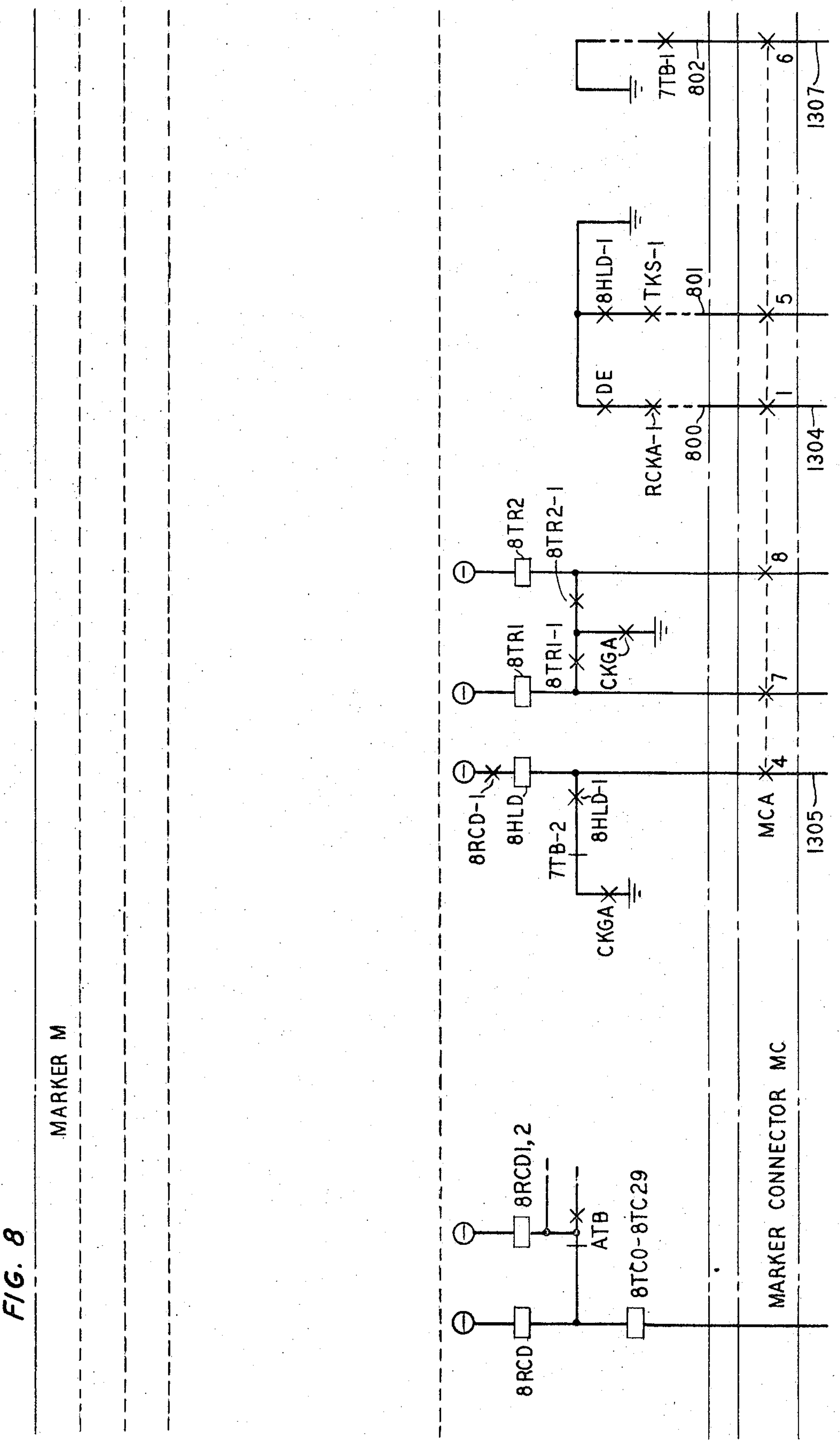
FIGS. 8 and 9 show a portion of the marker and marker connector.

If the marker is successful in selecting an idle trunk from the subgroup being tested, a trunk select relay TKS (not shown) operates in the marker closing its contacts TKS–1 in FIG. 8 and extending ground over conductor 801 through contacts MCA–5 over conductor 1306 and through the winding of relay 13TKS to battery. Relay 13TKS operates and locks through its own contacts 13TKS–2, break contacts 13MRF–2, and make contacts 13MEA–2 to ground. With relay 13TKS operated, release relay 13RL is permitted to operate in the decoder channel to begin the release of the decoder channel. The circuit for operating relay 13RL includes battery through its winding through break contacts 13ATB3–9 and 14ATB2–1, make contacts 13TKS–1 13HLD–3, to ground at make contacts 13RCK–2. Thus, the decoder channel was prevented from releasing until the marker transmitted a trunk select signal to the decoder channel by the operation of relay 13TKS. The decoder channel is now permitted to release as previously described.

If the marker encounters an all-trunks-busy condition in the first subgroup trunks tested, its relay 7TB will be operated to extend ground over conductor 802, through contacts MCA–6, over conductor 1307, through normal contacts 13MRF–1 in FIG. 14 and through the winding of all-trunks-busy relay 14ATB1 to battery, thereby operating relay 14ATB1. When relay 14ATB1 operates, it closes its contacts 14ATB1–3, thereby extending its operating ground over conductor 1402, through make contacts TMC3, through break contacts 14ATB2-4, make contacts 13HLD-5, and make contacts 13RCK-9, and through the winding of relay 14ATB2 to operate relay 14ATB2.

Relay 14ATB2 locks operated to its own contacts 14ATB2–6 in FIG. 14 and in FIG. 13 contacts 14ATB2–5 open to interrupt the operating circuit for hold relay 8HLD in the marker. The release of the hold relay in the marker acknowledges that the all-trunks-busy signal from the marker has been received and relay 8HLD in releasing opens the operating circuit for relay 7TB in the marker. Marker relay 7TB releases and releases relay 14ATB1 in the decoder channel. With relay 14ATB1 released and relay 14ATB2 operated, relay 13ATB3 in FIG. 13 operates. The circuit for operating relay 13ATB3 includes break contacts 13TKS–7 and 14ATB1–4, and make contacts 14ATB2–7 and 13HLD–6. Relay 13ATB3 locks operated in the circuit including its own contacts 13ATB3–2 and contacts 14ATB2–8.

When relay 13ATB3 operates, it extends battery through resistance R8 in FIG. 11 through make contacts 11CDR–1 and 13ATB3–5 to the peripheral scanner through the control windings of an all-trunks-busy ferrod 11ATB, b ack over conductor 1103 and through make contacts 13ATB3–6, thereby saturating ferrod 11ATB.

The stored program control system, when under control of the decoder channel monitor program interprets the change of state in the all-trunks-busy ferrod as a request from the decoder channel to reset the distributor register. The processor then sends a reset signal to the distributor register which is recognized by the decoder channel upon the release of relays 13HLD and 14DRON. The 13IT OR 13CT and 13CNO or 13CNE relays do not release at this time since they were previously locked operated to hold the marker attached.

When relays 13HLD and 13ATB3 release, the locking circuit for previously operated relay 12DOR is interrupted and relay 12DOR releases. Relay 12DOR releases relay 13MEA and relay 13MEA opens the locking circuit for relay 13RCK which releases. When relay 13RCK releases, it opens the locking circuit for relay 14ATB2 and relay 14ATB2 releases to release relay 13ATB3. Relay 14ATB3, in releasing, deactivates the all-trunks-busy ferrod in the peripheral scanner.

With the initial translation request ferrod (11ITR) saturated and the all-trunks-busy ferrod (11ATB) unsaturated, the processor recognizes this as a request by the decoder channel for more routing information. Control is then transferred to the call processing program which causes the processor to look at the "subgroup" and "next subgroup" information in the decoder channel temporary store. The "subgroup" portion of the decoder channel temporary store contains the identity of the last subgroup of trunks tested by the marker while the "next subgroup" portion of the decoder channel temporary store has an indication as to whether or not another subgroup of trunks is available in the route for testing.

If another subgroup is available, the processor goes to the trunk group tab le to determine if the next subgroup of trunks to be tested is the last subgroup or if additional subgroups are available. If the next subgroup to be tested is the last subgroup, the processor places an entry in the NEXT SUB portion of the decoder channel temporary store to indicate that no additional subgroups of trunks are to be tested if an idle trunk cannot be found in the last subgroup. The processor also enters the identity of the last subgroup to be tested in the SUB portion of the decoder channel temporary store.

If more than one subgroup of trunks are available, the processor places the identity of the next subgroup to be tested in the SUB portion of the decoder channel temporary store and also places an indication in the NEXT SUB portion of the store indicating that additional subgroups can be tested if the marker is unable to find an idle trunk in the subgroup under test. The processor also places an entry in the CHANNEL'S STATE portion of the decoder channel temporary store indicating that the decoder channel is "holding served." A distribution of the new trunk block information is now made to the marker and decoder channel through the distributor register.

The stored program control system will continue to distribute new sets of directive information to the marker and the decoder channel as long as additional subgroups in the selected trunk route are available and an all-trunks-busy indication is received from the marker. If the marker tests all subgroups in the selected trunk route and cannot find an idle trunk, it returns an all-trunks-busy signal to the stored program control system. Recognizing the all-trunks-busy signal, the processor consults the NEXT SUB portion of the decoder channel temporary store and learns that all subgroups in the selected group have been tested. The processor then reads the routing instruction portion of the decoder channel temporary store to determine if alternate routes are available. The processor determines whether additional code conversion data is necessary or whether code conversion data for a previously selected route is still applicable before reentering route pattern and trunk group tables associated with the next routes.

RETRIAL

The toll switching system is arranged so that a record will be made during the processing of calls if the system should encounter trouble. The equipment, similar to that used in this system for producing a trouble record, is well known in the prior art and need not be described or shown herein for a complete understanding of this invention. The trouble record produced as a result of equipment failure shows the identities of the various units of equipment that were used on the call that failed. Through the use of test equipment the maintenance personnel can reproduce the call that encountered trouble and select the same equipment used on that call in order to pin point the exact unit of equipment that failed.

In the toll system being described, however, the stored program control system may introduce errors or a transient condition may produce momentary failures that may not be reproducible by the use of test equipment. Rather than produce trouble records for every call processed that encounters a momentary failure, the decoder channels are designed to request a retrial from the stored program control system under various conditions. For example, the decoder channel will request a retrial from the stored program control system if a request for information is not answered within a predetermined interval or if an invalid or incomplete output is received from the distributor register.

Two bid ferrods are provided in the peripheral scanner to recognize requests for a retrial from all decoder channels. One ferrod is associated with all even numbered decoder channels while the other ferrod is associated with all odd numbered channels. These ferrods are scanned periodically by the stored program control system and are duplicated in a second peripheral scanner for reliability. Associated with each decoder channel are a plurality of information ferrods which inform the stored program control system of the type of retrial and which decoder channel is requesting a retrial.

In order to illustrate the retrial feature of the system, let it be assumed that the decoder channel has put in a bid for a route translation but has not received routing information from the stored program control system. When the decoder channel is seized, relays 11DAK, 11CDR, and 11TRI operate as previously described. These relays open the operating circuit for relay 12NR1 which begins to release. Relay 12NR1 is a slow release relay and takes approximately 110 milliseconds to release. If a valid distribution is not received by the decoder channel, as indicated by the operation of relay 12DOR within this interval, relay 12NR1 releases completing a circuit for operating relay 12NR2. The circuit for operating relay 12NR2 includes battery through its winding through break contacts 13ATB3–7, 13MEA–3, 12DOR–4, and 12NR1–1, make contacts 12MCS–5, 11DAK–3, and 11CKG–4 to ground. When relay 12NR2 operates, it actuates its contacts 12NR2–1 transferring the ground from one side of resistance R5 and extending that ground over conductor RTR1 in FIG. 12 through the control windings of retrial bid ferrod 12RTO and back over conductor RTR2 to battery. Ferrod 12RTO is saturated. When ground is removed from one side of resistance R5, the battery on the other side of resistance R5 is extended through make contacts 12MCS–3, break contacts 12FRES–1 and 13ATB–3, and over conductor TNR to saturate an associated "translation nonreceived" ferrod in the peripheral scanner.

As mentioned above, the processor periodically scans the retrial request bid ferrods common to the decoder channels and compares their present state with information stored in a last-look table in memory. If a new retrial request is recognized, the processor first determines whether the request is from an odd or even numbered decoder channel. The processor then scans the various retrial request ferrods in the odd or even group to determine the nature of the retrial request and which decoder channel is requesting a new retrial. Since it has been assumed that ferrod 12RT0 is saturated, the retrial request ferrods for the odd decoder channels are scanned and the identity of the decoder channel requesting a retrial is ascertained from the scanner location of the saturated retrial request ferrods.

Figure 2E:
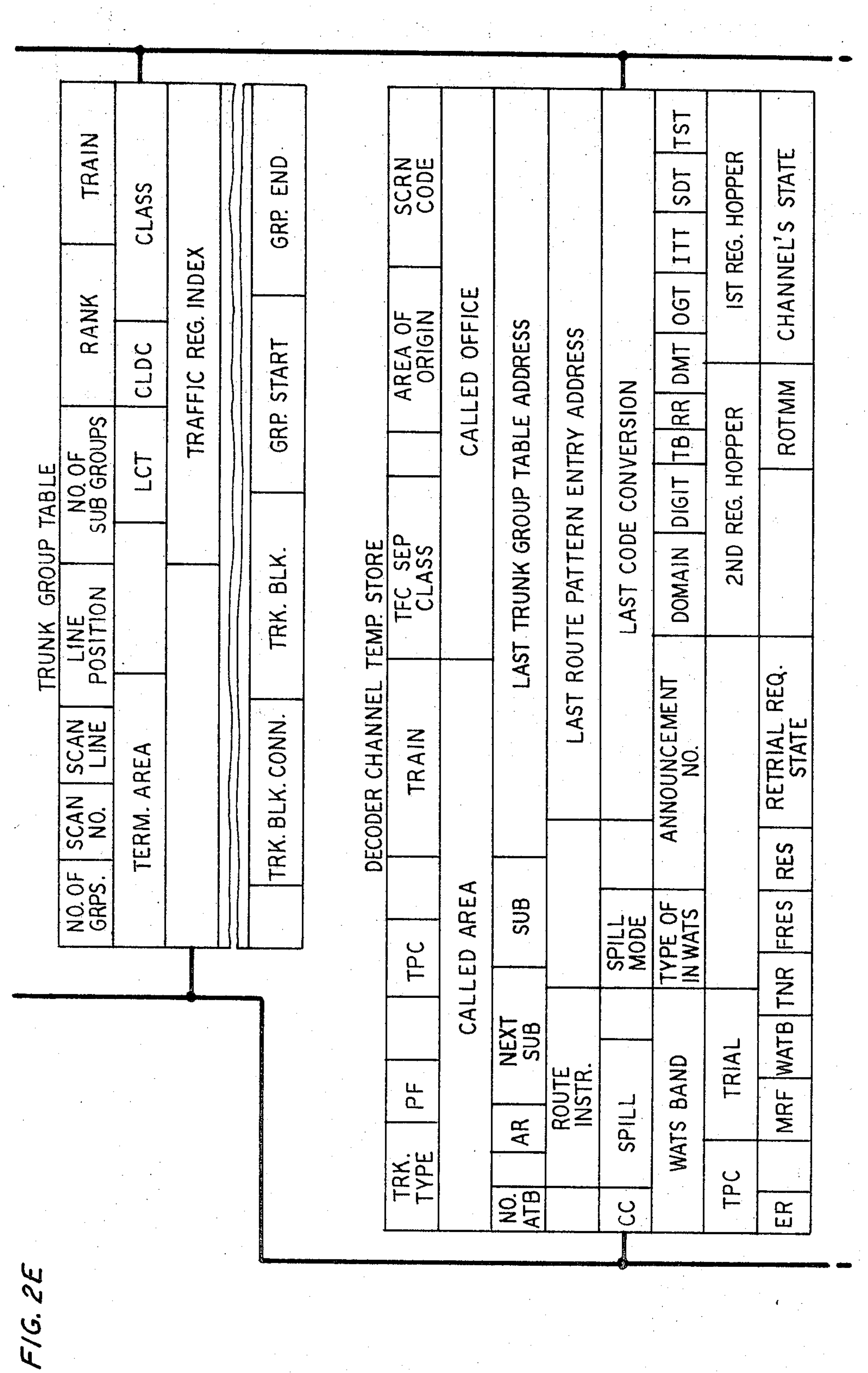
Figures 3, 18:
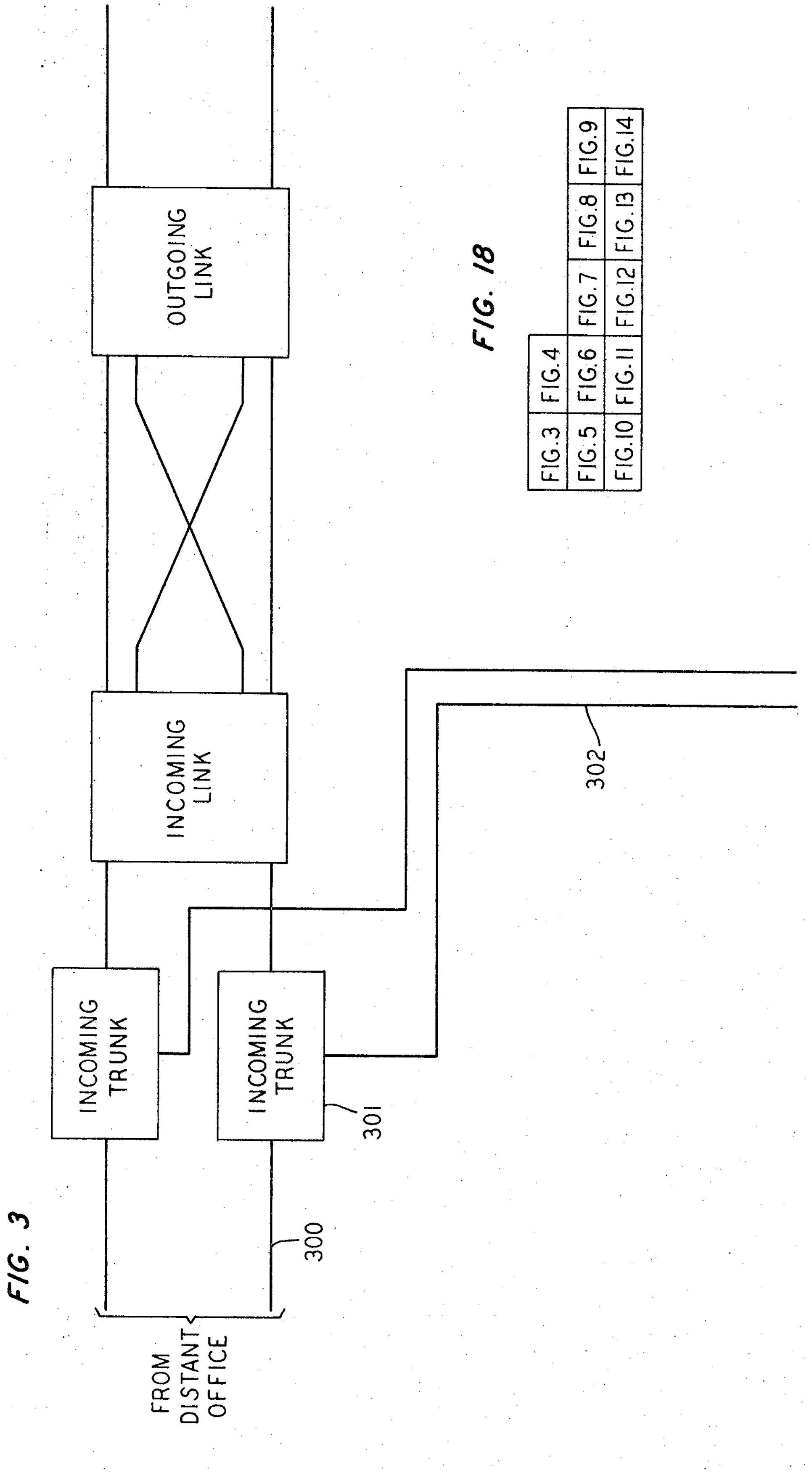
FIGS. 3 and 4 show a portion of the trunks and the switching network of the toll switching system.
FIG. 18 shows the arrangement of FIGS. 3—14.

At this time, the processor checks that only one type of retrial request is present for this decoder channel and if a valid check is made, the processor examines the decoder channel's retrial request state in the decoder channel temporary store (FIG. 2E). In the example being described, it will be assumed that the decoder channel has just presented a new retrial request and, therefore, the retrial request state would be zero.

Since the retrial was requested as the result of no translation being received, the processor now directs the scanner to examine the initial translation request ferrod (11ITR) associated with this decoder channel to make sure that this is a valid retrial request. In response to a valid request, the processor resets the distributor register. With its distributor register reset, control of the processor is turned over to the code grouping program.

All retrial requests are counted and an entry is made by the processor in a register portion of the store. A threshold value has been established for each type of retrial and the count of a register is compared with the appropriate threshold during the processing of a retrial request. Where a register count exceeds the threshold value, no further retrial requests of that type are honored for any decoder channel until the trouble has been corrected.

A retrial request similar to the translation not-received request, which has been described above, is made if the decoder channel is in a hold-routing state and has received an all-trunks-busy signal from the marker but has not been reset from the previous distribution or has not received additional trunk location information from the stored program control system. It will be recalled that when the decoder channel is in a hold-routing condition, it can receive from the marker an all-trunks-busy signal indicating that there were no idle trunks in the subgroup tested or it can receive a trunk select signal indicating that the marker has selected an idle trunk. If the decoder channel receives an all-trunks-busy signal, it saturates its all-trunks-busy ferrod 11ATB in the peripheral scanner requesting additional trunk information from the stored program control system. If the previous output from the distributor register to the decoder channel is not removed within a prescribed interval, relay 12NR1 releases and a circuit is closed for operating relay 12NR2. This circuit includes battery through the winding of relay 12NR2, make contacts 13ATB3–7, 13RCK–4, and 12DOR–4, break contacts 12NR1–1, make contacts 12MCS–5, 11DAK–3, and 11CKG–4 to ground. With the relay 12NR2 operated, retrial request bid ferrod 12RT0 is once again saturated and ground is removed from one side of resistance R5. The negative battery connected to the other side of resistance R5 is now extended through make contacts 12MCS–3, break contacts 12FRES–1, make contacts 13ATB–3, and over conductor NATB to saturate a corresponding ferrod in the peripheral scanner. The ferrod associated with conductor NATB informs the stored program control system the nature of the retrial request and causes the processor to scan the ATB ferrod and, if saturated, reset the distributor register. If the distributor register has been reset but translation information is not forthcoming then a TNR retrial request is entered. This retrial request is processed substantially the same as the retrial request when no initial translation information was received by the decoder channel.

The decoder channel will also initiate a retrial request if the marker receives an invalid or incomplete output from the distributor register. It will be recalled from the prior description that relay 13MEA operates after an idle marker is seized by the decoder channel. When relay 13MEA operates, it opens its break contacts 13MEA–4 to open the operating path for slow release relay 12NR1. If relays 13RCK or 13RL do not operate before the release interval of relay 12NR1, relay 12NR1 releases and closes a path for operating marker registration failure relay 12MRF. The operating path for relay 12MRF includes battery through its winding, make contacts 13MEA–5, break contacts 13RCK–4, make contacts 12DOR–4, break contacts 12NR1–1, make contacts 12MCS–5, make contacts 11DAK–3 and 11CKG–4 to ground. Relay 12MRF actuates its contacts 12MRF–1 in FIG. 12 to connect ground to the control windings of retrial request bid ferrod 12RT0, thereby saturating this ferrod. In addition, ground is removed from one side of resistance R6 and a negative potential on the other side of resistance R6 is extended through contacts 12MCS–4 and over conductor MRF to saturate a corresponding marker registration failure ferrod in the peripheral scanner.

The processor first determines that this is a valid retrial request by looking at the decoder channel's state in the decoder channel temporary store (FIG. 2E). That is, the marker registration failure should not occur unless the decoder channel has just been served as denoted by a "served" or "holding served" indication in the decoder channel temporary store. Also, the processor checks the initial translation request and all-trunks-busy ferrods associated with the decoder channel since the decoder channel should not yet have been released and the decoder channel could not have properly presented an all-trunks-busy signal which indicates that the marker had already registered routing information and searched the selected trunk group. Thus, ferrod 11ITR should be saturated and 11ATB unsaturated.

Recognizing a valid retrial request, the stored program control system resets the distributor register associated with the decoder channel. A redistribution of information will not be made, however, until the marker registration failure ferrod 1202 is unsaturated. When the distributor register is reset, all of the outputs to the marker are removed and relay 12DRON in decoder channel is released. Relay 13DRON opens its contacts 13DRON-7 in FIG. 13 and releases relay 12DOR. With relay 12MRF operated and relay 12DOR released, a circuit is completed for reoperating relay 12NR1. This circuit includes battery through the winding of relay 12NR1, conductor 1204, break contacts 12DOR–3, and ground through make contacts 12MRF–2. Relay 12NR1 in the decoder channel operates relay 7TB in the marker over a circuit including battery through the winding of relay 7TB, equipment in the marker not shown, make contacts MCA–7, conductor 1205, make contacts 13MEA–6, 12NR1–2, and 12MRF–3, break contacts 13RL2, make contacts 12MCS–6, break contacts 14DRON-8, and through decoder channel equipment not shown to ground. It will be remembered from the prior description that relay 7TB in the marker operated if the marker could not find an idle trunk in the subgroup selected. With relay 7TB operated in the marker, the marker responds by releasing its previous routing information, including the trunk block associated with the selected trunk group if a trunk block had been seized.

Relay 7TB in the marker also causes an all-trunks-busy signal to be sent to the decoder channel over conductor 1307 to operate relay 14ATB1. Relay 14ATB1 opens its break contacts 14ATB1–5 in FIG. 13 to interrupt the locking circuit for relay 13MEA and relay 12MEA releases. Relay 12MEA in releasing releases marker relay 7TB and relay 7TB releases decoder channel relay 13ATB. With relays 13MEA and 14ATB1 released, marker registration failure relay 12MRF releases. Ferrods 12RT0 and 1202 are now unsaturated, thus removing the retrial request. The processor recognizes the removal of the marker registration failure retrial request and a new distribution of the same routing information is attempted.

A decoder channel may experience an unexpected reset of the distributor register, as evidenced by the premature release on relay 14DRON. A retrial is not immediately requested, however, since a marker may have been selected and have registered the routing information necessary to process the call. When relay 14DRON is released by the premature resetting of the distributor register, a circuit is completed for operating false reset relay 12FRES. This circuit includes battery through the winding of relay 12FRES, make contacts 12DOR–5, break contacts 13ATB3–8, 12MRF–3, and 13RL–2, make contacts 12MCS–6, and break contacts 14DRON–8 to ground through decoder channel equipment not shown. When relay 12FRES operates, it opens break contacts 12FRES–2 to interrupt the locking circuit for relay 12DOR and relay 12DOR releases. Relay 13DOR in releasing opens its contacts 12DOR–6 in FIG. 13 to release relay 13MEA. Relay 12DOR also opens its break contacts 12DOR–3 in FIG. 12 to interrupt the operating circuit for relay 12NR1 which begins to release. The release interval for relay 12NR1 allows sufficient time for the marker to attempt to complete the connection if the marker received the necessary information from the SPC system. If the marker has not completed its function and the decoder channel has not released before this interval, relay 12NR1 releases completing the start lead in FIG. 14 for selecting a marker. With relay 12NR1 released, relay 12NR2 operates and a circuit is once again completed for energizing retrial bid ferrod 12RT0. The battery source connected to resistance R5 is also extended to make contacts 12FRES–1 and over conductor FRES to a corresponding ferrod in the peripheral scanner.

In response to this request, the processor orders the appropriate distributor register reset and under control of the code grouping program attempts a retranslation of the area code and office code stored in the decoder channel temporary store for this call.

We claim:

1. A telephone switching office comprising incoming trunks, outgoing trunks, a plurality of sender means for registering digital information received over said incoming trunks for each call requesting a connection through said switching office to a desired call destination, control means responsive to directive information for selecting an idle one of said outgoing trunks for connection to said incoming trunks requesting service, and a stored program control system common to said sender and control means comprising means for translating said digital information into sets of directive information associated with each said call, means for distributing one at a time each said set of directive information to said control means, and means for recording for each call the identity of the last distributed information set.

2. The invention defined in claim 1 wherein said sender means comprises a plurality of senders and sender links for interconnecting said incoming trunks requesting service with said senders, and wherein said stored program control system comprises means responsive to a service request from one of said incoming trunks for recording the identities of said one trunk and said sender prior to their interconnection.

3. The invention defined in claim 2 wherein said sender links comprise a switching network and link controller means for actuating said network to interconnect said incoming trunks and said senders, and wherein said stored program control system further comprises means effective when said trunk and sender identifies are recorded for enabling said link controller means.

4. The invention defined in claim 3 wherein said link controller means comprises means for identifying said trunks and senders, means for transmitting said trunk and sender identities to said stored program control system and means for sending a bid signal to said stored program control system when said trunks and senders have been identified and wherein said stored program control system comprises means responsive to said bid signal for interrogating said transmitting means.

5. The invention defined in claim 4 wherein said means for enabling said link controller means also includes means for disabling said bid signal sending means.

6. The invention defined in claim 1 wherein said stored program control system comprises a data processor, an input buffer for transmitting said digital information from said sender means to said processor, and an output buffer for transmitting said directive information from said processor to said control means, and wherein said control means comprises a plurality of decoders actuated by said sender means to enable said input buffer when said sender means has received said digital information and a plurality of markers actuated by said decoders to control the interconnection of said trunks when said directive information has been distributed by said output buffer.

7. The invention defined in claim 6 wherein said output buffer comprises a plurality of output register means associated with a particular one of said decoders and means associated with each said register means for selectively actuating said register under control of said processor.

8. The invention defined in claim 7 wherein each said register means comprises a plurality of bistable devices, wherein said actuating means includes means for simultaneously enabling a plurality of said devices in accordance with said directive information transmitted by said processor, and wherein said output buffer also comprises reset means common to said register means and effective when actuated for disabling each said device in each said register means.

9. The invention defined in claim 8 wherein said stored program control system also comprises a pair of communication bus circuits interconnecting said processor and said output buffer and wherein said output buffer also comprises a pair of parity check circuits each normally associated with a corresponding bus circuit and a parity control circuit for interchanging said normally associated bus and parity check circuits.

10. A toll switching office comprising incoming trunks, outgoing trunks divided into subgroups, means for registering digital information received over said incoming trunks requesting a connection through said office to a desired call destination, a plurality of markers each responsive to directive information for selecting an idle outgoing trunk for connection with one of said incoming trunks requesting service, an electronic data processor for translating said digital information into sets of directive information, and a plurality of decoder channels each responsive to a request for service by said register means for requesting service by said electronic data processor and responsive to said directive information from said processor for seizing one of said markers, said electronic data processor comprising means for interrogating said trunk subgroups to ascertain which of said subgroups contains an idle trunk and means for distributing a first one of said sets of directive information to one of said markers and one of said decoder channels.

11. The invention defined in claim 10 wherein said first information set distributed to said decoder channel includes a hold routing signal indicating to said decoder channel that additional information sets are available.

12. The invention defined in claim 10 wherein a said marker comprises means for testing individual ones of said outgoing trunks in a particular trunk subgroup and means for transmitting to said decoder channel a trunk-select signal and an all-trunk-busy signal, and wherein said decoder channel comprises means responsive to an all-trunk-busy signal from said marker for requesting said processor to distribute additional information sets to said marker.

13. The invention defined in claim 12 wherein said processor comprises a memory store associated with each said decoder channel and means for recording the last information set distributed to a particular decoder channel in its corresponding store.

14. The invention defined in claim 13 wherein said decoder channel comprises separate means for requesting service by said processor if additional sets of directive information are not distributed within a predetermined interval.

15. A telephone switching office comprising incoming trunks, outgoing trunks, means for registering digital information received over said incoming trunks requesting a connection through said office to a desired call destination, control means responsive to directive information for selecting outgoing trunks for connection to said incoming trunks requesting service, and an electronic data processor common to said register means and said control means comprising means for translating said digital information into directive information, means responsive to a first bid signal from said control means for distributing said directive information to said control means, and means in said control means effective when said processor fails to distribute directive information within a predetermined interval for resetting said distributing means.

16. A telephone switching office comprising incoming trunks, outgoing trunks, means for registering digital information received over said incoming trunks requesting a connection through said office to a desired call destination, a plurality of relatively slow speed control means responsive to directive information for selecting outgoing trunks for connection to said incoming trunks, distributing means associated with each said control means and effective when enabled for storing directive information for said control means while said control means is processing a trunk connection, and a relatively high speed data processor common to said register means and said control means comprising means for translating said digital information into directive information for transmission to said distributor means and means for disabling said distributor means, said control means comprising circuit means for requesting a retransmission of directive information from said processor and means for delaying the actuation of said circuit means for a predetermined interval when said distributing means is prematurely disabled.

17. In a telephone switching system for interconnecting incoming and outgoing trunks, a plurality of controller means including registers and means for connecting said registers with said incoming trunks requesting service; a plurality of marker means responsive to directive information for establishing a connection between incoming trunks and outgoing trunks to a desired call destination; a data processor common to said controller means and said marker means comprising means for translating digital information received over said incoming trunks into directive information and means for distributing said directive information to said marker means; and a plurality of decoder channel circuits responsive to said registers for requesting service by said processor and responsive to directive information for selecting an idle one of said markers; said data processor also including means for interrogating said controller means to ascertain the identity of an incoming trunk and register associated with a particular call, means for interrogating said decoder channel circuits to ascertain the digital information received over said incoming trunks, and means for interrogating said marker means to ascertain if a marker has established a trunk connection.

18. A telephone switching system for completing calls between incoming and outgoing trunk comprising means for registering digital information received over said incoming trunks; a plurality of markers each responsive to directive information for selecting an idle one of said outgoing trunks for connection with one of said incoming trunks requesting service; an electronic data processor common to said registers and said markers including means for translating said digital information into directive information and means for distributing said directive information to said marker means; and decoder means comprising means responsive to said register means for requesting translations by said processor, means for selecting an idle one of said markers and means for identifying the selected marker to said processor; said processor also including means for interrogating said marker to determine the disposition of each said call.